(12) United States Patent
Allen et al.

(10) Patent No.: US 11,059,969 B2
(45) Date of Patent: *Jul. 13, 2021

(54) POLYMER COMPOSITIONS AND METHODS

(71) Applicant: Saudi Aramco Technologies Company, Dhahran (SA)

(72) Inventors: Scott D. Allen, Ithaca, NY (US); Christopher A. Simoneau, Oxford, CT (US); Jay J. Farmer, Ithaca, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 162 days.

This patent is subject to a terminal disclaimer.

(21) Appl. No.: 16/151,576

(22) Filed: Oct. 4, 2018

(65) Prior Publication Data

US 2019/0100648 A1     Apr. 4, 2019

Related U.S. Application Data

(63) Continuation of application No. 14/116,675, filed as application No. PCT/US2012/037117 on May 9, 2012, now Pat. No. 10,138,369.

(Continued)

(51) Int. Cl.
*C08L 69/00* (2006.01)
*C08G 64/02* (2006.01)
(Continued)

(52) U.S. Cl.
CPC ........ *C08L 69/00* (2013.01); *B32B 17/10036* (2013.01); *B32B 17/10733* (2013.01);
(Continued)

(58) Field of Classification Search
None
See application file for complete search history.

(56) References Cited

U.S. PATENT DOCUMENTS 4,066,630 A    1/1978   Dixon et al.
4,267,120 A    5/1981   Cuscurida et al.
(Continued)

FOREIGN PATENT DOCUMENTS

CN    101309799 A    11/2008
CN    101405315 A    4/2009
(Continued)

OTHER PUBLICATIONS

U.S. Appl. No. 16/429,472, Allen et al.
(Continued)

*Primary Examiner* — Rachel Kahn
*Assistant Examiner* — Ha S Nguyen
(74) *Attorney, Agent, or Firm* — Choate, Hall & Stewart LLP; John P. Rearick; Nicholas J. Pace

(57) ABSTRACT

The present invention encompasses polymer compositions comprising aliphatic polycarbonate chains containing functional groups that increase the polymer's ability to wet or adhere to inorganic materials. In certain embodiments, chain ends of the aliphatic polycarbonates are modified to introduce silicon-containing functional groups, boron-containing functional groups, phosphorous-containing functional groups, sulfonic acid groups or carboxylic acid groups.

29 Claims, 3 Drawing Sheets

Related U.S. Application Data

(60) Provisional application No. 61/483,949, filed on May 9, 2011.

(51) Int. Cl.

| | | |
|---|---|---|
| *C08G 64/42* | (2006.01) | |
| *B32B 17/10* | (2006.01) | |
| *C08G 18/44* | (2006.01) | |
| *C08K 7/14* | (2006.01) | |
| *C08L 61/06* | (2006.01) | |

(52) U.S. Cl.
CPC ......... *C08G 18/44* (2013.01); *C08G 64/0208* (2013.01); *C08G 64/0216* (2013.01); *C08G 64/0225* (2013.01); *C08G 64/0266* (2013.01); *C08G 64/42* (2013.01); *C08K 7/14* (2013.01); *C08L 61/06* (2013.01); *Y10T 428/31518* (2015.04)

(56) References Cited

U.S. PATENT DOCUMENTS

| | | | |
|---|---|---|---|
| 4,816,529 | A | 3/1989 | Harris |
| 5,637,739 | A | 6/1997 | Jacobsen et al. |
| 5,663,393 | A | 9/1997 | Jacobsen et al. |
| 5,665,890 | A | 9/1997 | Jacobsen et al. |
| 5,929,232 | A | 7/1999 | Jacobsen et al. |
| 6,130,340 | A | 10/2000 | Jacobsen et al. |
| 6,309,997 | B1 | 10/2001 | Fujita et al. |
| 6,639,087 | B2 | 10/2003 | Larrow et al. |
| 6,844,448 | B2 | 1/2005 | Jacobsen et al. |
| 6,884,750 | B2 | 4/2005 | Kim et al. |
| 6,903,043 | B2 | 6/2005 | Kim et al. |
| 7,145,022 | B2 | 12/2006 | Luinstra et al. |
| 7,244,805 | B2 | 7/2007 | Park et al. |
| 7,304,172 | B2 | 12/2007 | Coates et al. |
| 7,674,873 | B2 | 3/2010 | Coates et al. |
| 7,723,256 | B2 | 5/2010 | Coates et al. |
| 7,867,619 | B2 | 1/2011 | Jucker et al. |
| 8,163,867 | B2 | 4/2012 | Lee et al. |
| 8,207,365 | B2 | 6/2012 | Zheng et al. |
| 8,232,267 | B2 | 7/2012 | Groves |
| 8,247,520 | B2 | 8/2012 | Allen et al. |
| 8,252,955 | B2 | 8/2012 | Gao et al. |
| 8,278,239 | B2 | 10/2012 | Coates et al. |
| 8,461,290 | B2 | 6/2013 | Carpentier et al. |
| 8,470,956 | B2 | 6/2013 | Allen et al. |
| 8,507,733 | B2 | 8/2013 | Ok et al. |
| 8,575,245 | B2 | 11/2013 | LaPointe et al. |
| 8,580,911 | B2 | 11/2013 | Allen et al. |
| 8,592,550 | B2 | 11/2013 | Frijns et al. |
| 8,598,309 | B2 | 12/2013 | Jeong et al. |
| 8,604,155 | B2 | 12/2013 | Allen et al. |
| 8,642,721 | B2 | 2/2014 | Ok et al. |
| 8,748,555 | B2 | 6/2014 | Allen |
| 8,758,591 | B2 | 6/2014 | Adeloju |
| 8,785,591 | B2 | 7/2014 | Allen et al. |
| 8,791,274 | B2 | 7/2014 | Ok et al. |
| 8,921,508 | B2 | 12/2014 | Allen et al. |
| 8,952,104 | B2 | 2/2015 | Allen |
| 9,029,498 | B2 | 5/2015 | Allen et al. |
| 9,102,800 | B2 | 8/2015 | Allen et al. |
| 9,376,531 | B2 | 6/2016 | Allen et al. |
| 9,422,397 | B2 | 8/2016 | Allen et al. |
| 9,453,100 | B2 | 9/2016 | Allen et al. |
| 9,512,259 | B2 | 12/2016 | Allen et al. |
| 9,809,678 | B2 | 11/2017 | Allen et al. |
| 9,884,937 | B2 | 2/2018 | Allen et al. |
| 9,994,760 | B2 | 6/2018 | Allen et al. |
| 10,047,188 | B2 | 8/2018 | Allen et al. |
| 10,138,369 | B2 | 11/2018 | Allen et al. |
| 10,301,426 | B2 | 5/2019 | Allen et al. |
| 10,351,654 | B2 | 7/2019 | Allen et al. |
| 10,392,556 | B2 | 8/2019 | Allen et al. |
| 10,428,173 | B2 | 10/2019 | Allen et al. |
| 10,836,859 | B2 | 11/2020 | Allen et al. |
| 2005/0260401 | A1 | 11/2005 | Bachon et al. |
| 2007/0111009 | A1 | 5/2007 | Morris et al. |
| 2010/0256329 | A1 | 10/2010 | Nozaki et al. |
| 2010/0311941 | A1 | 12/2010 | Coates et al. |
| 2011/0171465 | A1* | 7/2011 | Yasuda ................. C08G 18/42 428/355 N |
| 2011/0218127 | A1 | 9/2011 | Allen et al. |
| 2011/0230580 | A1 | 9/2011 | Allen et al. |
| 2011/0257296 | A1 | 10/2011 | LaPointe et al. |
| 2011/0281048 | A1 | 11/2011 | Yoon et al. |
| 2012/0156410 | A1 | 6/2012 | Allen |
| 2012/0219802 | A1 | 8/2012 | Hilgers et al. |
| 2013/0066044 | A1 | 3/2013 | Allen et al. |
| 2013/0172482 | A1 | 7/2013 | Allen et al. |
| 2013/0244864 | A1 | 9/2013 | Allen et al. |
| 2013/0281633 | A1 | 10/2013 | Allen |
| 2013/0303724 | A1 | 11/2013 | Allen et al. |
| 2014/0031453 | A1 | 1/2014 | Allen et al. |
| 2014/0046008 | A1 | 2/2014 | Allen et al. |
| 2014/0072806 | A1 | 3/2014 | Allen et al. |
| 2014/0249279 | A1 | 9/2014 | Williams et al. |
| 2015/0166734 | A1 | 6/2015 | Allen et al. |
| 2015/0299386 | A1 | 10/2015 | Allen et al. |
| 2015/0307660 | A1 | 10/2015 | Allen et al. |
| 2016/0115288 | A1 | 4/2016 | Waddington |
| 2016/0264728 | A1 | 9/2016 | Allen et al. |
| 2016/0319064 | A1 | 11/2016 | Allen et al. |
| 2017/0145147 | A1 | 5/2017 | Allen et al. |
| 2017/0198203 | A1 | 7/2017 | Allen et al. |
| 2018/0022869 | A1 | 1/2018 | Allen et al. |
| 2018/0305605 | A1 | 10/2018 | Allen et al. |
| 2018/0334525 | A1 | 11/2018 | Allen et al. |
| 2018/0340038 | A1 | 11/2018 | Allen et al. |
| 2019/0233586 | A1 | 8/2019 | Allen et al. |
| 2019/0322802 | A1 | 10/2019 | Eagan et al. |
| 2020/0048399 | A1 | 2/2020 | Allen et al. |
| 2020/0062900 | A1 | 2/2020 | Farmer |
| 2020/0087436 | A1 | 3/2020 | Allen et al. |
| 2020/0095375 | A1 | 3/2020 | Allen et al. |
| 2020/0095494 | A1 | 3/2020 | Allen et al. |
| 2020/0325296 | A1 | 10/2020 | Waddington |

FOREIGN PATENT DOCUMENTS

| | | | |
|---|---|---|---|
| EP | 2146977 B1 | 11/2012 | |
| EP | 2257559 B1 | 10/2014 | |
| JP | 57-205345 A | 12/1982 | |
| JP | 2006-328224 A | 12/2006 | |
| JP | 2010-202711 A | 9/2010 | |
| JP | 2011-518250 A | 6/2011 | |
| JP | 2012-502143 A | 1/2012 | |
| JP | 2012-508294 A | 4/2012 | |
| JP | 2012-532233 A | 12/2012 | |
| JP | 2014-508834 A | 4/2014 | |
| WO | WO-98/04538 A1 | 2/1998 | |
| WO | WO-2010/022388 A2 | 2/2010 | |
| WO | WO-2010/028362 A1 | 3/2010 | |
| WO | WO-2010028362 A1 * | 3/2010 | ............. C08G 18/44 |
| WO | WO-2010/041667 A1 | 4/2010 | |
| WO | WO-2010041667 A1 * | 4/2010 | ......... C08G 18/4866 |
| WO | WO-2010/062703 A1 | 6/2010 | |
| WO | WO-2010/075232 A1 | 7/2010 | |
| WO | WO-2011/005664 A2 | 1/2011 | |
| WO | WO-2011/163133 A1 | 12/2011 | |
| WO | WO-2012/027725 A1 | 3/2012 | |
| WO | WO-2012/071505 A1 | 5/2012 | |
| WO | WO-2012/094619 A1 | 7/2012 | |

OTHER PUBLICATIONS

U.S. Appl. No. 16/458,354, Allen et al.
U.S. Appl. No. 16/541,253, Allen et al.
U.S. Appl. No. 16/683,820, Allen et al.
Pluddemann, E.P., Interfaces in polymer matrix composites, Academic Press, p. 185 (1974). English Translation.
International Search Report for PCT/US12/37117 (dated Oct. 2, 2012).

(56) References Cited

OTHER PUBLICATIONS

Peng, et al., Thermal degradation kinetics of uncapped and end-capped poly(propylene carbonate), Polymer Degradation and Stability, 80: 141-147 (2003).
Xie, D. et al., End-capping and Thermal Degradation of Poly(propylene carbonate) with different molecular weight, Journal of Wuhan Ligong Daxue Xuebao, 29(8): 5-9 (2007).
U.S. Appl. No. 17/095,827, filed Nov. 12, 2020, Allen et al.

* cited by examiner

POLYMER COMPOSITIONS AND METHODS

CROSS REFERENCE TO RELATED APPLICATIONS

The present application is a continuation of U.S. patent application Ser. No. 14/116,675, filed Nov. 8, 2013 (now U.S. Pat. No. 10,138,369), which is a national phase application under 35 U.S.C. § 371 of international application number PCT/US2012/037117, filed May 9, 2012, which claims priority to U.S. provisional application Ser. No. 61/483,949, filed May 9, 2011, the entire contents of each of which are hereby incorporated herein by reference.

GOVERNMENT SUPPORT

This invention was made with government support under grant number DE-FE0002474, awarded by the Department of Energy. The government has certain rights in the invention.

FIELD OF THE INVENTION

This invention pertains to the field of polymers. More particularly, the invention pertains to polymer compositions comprising aliphatic polycarbonates suitable for use in the production of glass laminates, coated glass, composite materials, particularly those comprising polymer-inorganic mixtures.

BACKGROUND

The synthesis of useful materials from $CO_2$ is an area of increasing interest and importance as the potential negative consequences of anthropogenic increases in atmospheric $CO_2$ become more fully understood. One particularly promising use of waste $CO_2$ is its application as a monomer for the production of polycarbonate polymers. This use has a dual benefit since it not only sequesters $CO_2$ into the backbone of a long-lived polymer, but also displaces a portion of the petroleum derivatives currently used to make commodity polymers. Novomer has developed catalysts to efficiently copolymerize $CO_2$ with aliphatic epoxides to produce aliphatic polycarbonate polymers (APCs) with a range of commercial applications.

Because APCs as a class have unique thermal and physical properties, it has been a challenge to utilize them as drop in replacements for petroleum-derived thermoplastics. As such, one of the most promising commercial markets for $CO_2$-based polymers involves their use in applications where the physical and thermal properties of the polymer are complemented by the strength of other materials. Such applications include composites and glass laminates where the strength of the polymer is enhanced by the rigidity of glass plates or fibers. A potential challenge in using APCs for these applications arises is the requirement that the polymers have good adhesion to glass and other inorganic materials. As such, there is a need for APC formulations with enhanced adhesion to glass and related inorganic materials. The present invention provides, among other things, epoxide-$CO_2$ copolymers containing chemical modifications to enhance their adhesion to glass and other inorganic materials such as those used in composite formulations.

SUMMARY OF THE INVENTION

In one aspect, the present invention encompasses polymer compositions comprising aliphatic polycarbonate chains. In certain embodiments the aliphatic polycarbonate chains incorporate chemical functionality that increases adhesion or wetting of glass, ceramics, and related inorganic materials. In certain embodiments, such functionality is introduced by modifying the chain-ends of the aliphatic polycarbonate chains. In certain embodiments, such functionality comprises a moiety selected from the group consisting of silicon-containing functional groups, carboxylic acid groups, sulfonic acid groups, ammonium groups, and combinations of two or more of these.

The invention provides, among other things, an epoxide $CO_2$ copolymer composition wherein the polymer chains comprise one or more adhesion enhancing functional groups. In certain embodiments, the aliphatic polycarbonate chains of such compositions contain a primary repeating unit having a structure:

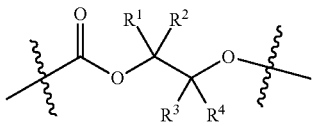

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, such aliphatic polycarbonate chains are derived from the copolymerization of carbon dioxide with one or more epoxide substrates. Such copolymerizations are exemplified in published PCT applications WO/2010/028362 and WO2010/022388 the entirety of each of which is incorporated herein by reference. In some embodiments, the aliphatic polycarbonate chains are derived from ethylene oxide, propylene oxide, optionally substituted $C_{3-30}$ aliphatic epoxides, or mixtures of two or more of these.

In some embodiments, the aliphatic polycarbonate chains have a number average molecular weight (Mn) less than about 20,000 g/mol. In some embodiments, the aliphatic polycarbonate chains have an (Mn) between about 20,000 g/mol and about 60,000 g/mol. In some embodiments, the aliphatic polycarbonate chains have an (Mn) greater than about 60,000 g/mol. In some embodiments, the aliphatic polycarbonate chains have an (Mn) between about 80,000 g/mol and about 250,000 g/mol.

The functionality that increases adhesion or wetting may be present in one or more of several regions of the aliphatic polycarbonate chains. The functionality may be present on the ends of the chains, on substituents present on repeating units within the chains or on polyfunctional initiator moieties embedded within the polycarbonate chains. In some cases, the aliphatic polycarbonate chains may include two or more of these features, either in single chains or the aliphatic polycarbonate compositions may comprise mixtures of chains having different arrangements of functionality that enhances the wetting or adhesion properties of the polycarbonates or their derivatives.

In certain embodiments, the functionality in the aliphatic polycarbonate chains that increases adhesion or wetting is present at the chain ends. In some embodiments such functionality may be introduced in a post-polymerization step such as by alkylating, esterifying, oxidizing or carbamoylating the hydroxyl end groups of the aliphatic polycarbonate chains. In other embodiments, such functionality may be introduced by conducting a copolymerization of carbon dioxide and one or more epoxide monomers polymerization in the presence of polymer initiators having suitable functional groups.

In certain embodiments, the functionality to increase the adhesion or wetting properties of the aliphatic polycarbonate compositions is present on a sidechain of one or more the repeating units of the polymer chains. In some embodiments such groups may be introduced by conducting a copolymerization of carbon dioxide and a mixture of epoxide monomers where some of the epoxide monomers have sidechains containing suitable functional groups or chemical precursors to such functional groups. In certain embodiments the epoxides bearing sidechains containing such functional groups are glycidyl esters, glycidyl ethers, or epichlorohydrin and its derivatives. In certain embodiments, the functional groups comprise moieties or precursors of moieties selected from the group consisting of silicon-containing functional groups, carboxylic acid groups, sulfonic acid groups, boron-containing groups, phosphorus-containing functional groups, ammonium groups, and combinations of two or more of these.

In certain embodiments, polymer compositions of the present invention comprise aliphatic polycarbonate polyols with a high percentage of —OH end groups as described in WO/2010/028362. In other embodiments, polymer compositions of the present invention comprise aliphatic polycarbonate polyols having chain ends modified with olefin-containing groups such as acrylates or styrenes capable of participating in olefin polymerizations to make cross-linked or chain-extended polymer compositions.

In some embodiments, polymer compositions of the present invention comprise high molecular weight aliphatic polycarbonates with thermoplastic properties. In certain embodiments, such high molecular weight aliphatic polycarbonates have a substantial proportion of chain ends comprising AEF groups.

In another aspect, the present invention encompasses methods of producing aliphatic polycarbonates containing functional groups that increase their ability to wet or adhere to glass and other inorganic materials. In certain embodiments, these methods include the step of modifying hydroxyl groups at the ends of the aliphatic polycarbonate chains. In some embodiments, these methods comprise the step of treating an epoxide $CO_2$ copolymer with a reagent to convert at least a portion of the free —OH end groups of the epoxide $CO_2$ copolymer to moieties comprising a functional group selected from the group consisting of: carboxylic acid groups, silicon-containing functional groups, sulfonic acid groups, boron-containing functional groups, phosphorus-containing functional groups, ammonium groups, and combinations of two or more of these. In some embodiments, these methods include the step of copolymerizing carbon dioxide, one or more $C_{2-40}$ epoxides and a glycidyl ether or glycidyl ester wherein the glycidyl compounds contain one or more functional groups that increase wetting or adherence properties. In certain embodiments, the methods include copolymerizing carbon dioxide and one or more $C_{2-30}$ epoxides in the presence of initiators and/or chain transfer agents wherein the initiator or chain transfer agents contain one or more functional groups that increase wetting or adherence properties. In some embodiments, the methods include combinations of two or more of these steps.

In another aspect, the present invention encompasses higher polymers derived from the aliphatic polycarbonate chains by reaction with cross-linking agents, chain-extending agents, or reactive diluents (e.g., reactive olefins). In certain embodiments such agents are selected from the group consisting of isocyanates, polyisocyanates, melamines, phenol-formaldehyde resins, epoxy resins, acrylates, styrenes, vinyl ethers, and substituted vinyl benzene compounds. In certain embodiments, the present invention also encompasses methods for performing such copolymerizations and cross-linking reactions.

In another aspect, the present invention encompasses resins formulated from aliphatic polycarbonate compositions that have been modified to increase their ability to wet or adhere to glass.

In another aspect, the present invention comprises composites, glass-laminates, polymer-inorganic mixtures, and articles of manufacture derived from compositions containing aliphatic polycarbonate chains having functional groups that increase their ability to wet or adhere to glass and other inorganic materials.

Definitions

Definitions of specific functional groups and chemical terms are described in more detail below. For purposes of this invention, the chemical elements are identified in accordance with the Periodic Table of the Elements, CAS version, Handbook of Chemistry and Physics, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. Stereochemistry of Carbon Compounds (McGraw-Hill, N Y, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used herein

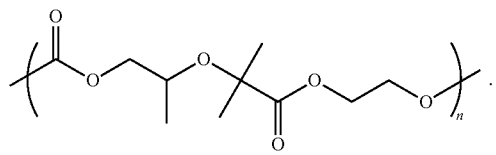

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenanthridinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quatemized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or +NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R$^\circ$; —(CH$_2$)$_{0-4}$OR$^\circ$; —O—(CH$_2$)$_{0-4}$C(O)OR$^\circ$; —(CH$_2$)$_{0-4}$CH(OR$^\circ$)$_2$; —(CH$_2$)$_{0-4}$SR$^\circ$; —(CH$_2$)$_{0-4}$Ph, which may be substituted with R$^\circ$; —(CH$_2$)$_{0-4}$O(CH$_2$)$_{0-1}$Ph which may be substituted with R$^\circ$; —CH═CHPh, which may be substituted with R$^\circ$; —NO$_2$; —CN; —N$_3$; —(CH$_2$)$_{0-4}$N(R$^\circ$)$_2$; —(CH$_2$)$_{0-4}$N(R$^\circ$)C(O)R$^\circ$; —N(R$^\circ$)C(S)R$^\circ$; —(CH$_2$)$_{0-4}$N(R$^\circ$)C(O)NR$^\circ$$_2$; —N(R$^\circ$)C(S)NR$^\circ$$_2$; —(CH$_2$)$_{0-4}$N(R$^\circ$)C(O)OR$^\circ$; —N(R$^\circ$)N(R$^\circ$)C(O)R$^\circ$; —N(R$^\circ$)N(R$^\circ$)C(O)NR$^\circ$$_2$; —N(R$^\circ$)N(R$^\circ$)C(O)OR$^\circ$; —(CH$_2$)$_{0-4}$C(O)R$^\circ$; —C(S)R$^\circ$; —(CH$_2$)$_{0-4}$C(O)OR$^\circ$; —(CH$_2$)$_{0-4}$C(O)N(R$^\circ$)$_2$; —(CH$_2$)$_{0-4}$C(O)SR$^\circ$; —(CH$_2$)$_{0-4}$C(O)OSiR$^\circ$$_3$; —(CH$_2$)$_{0-4}$OC(O)R$^\circ$; —OC(O)(CH$_2$)$_{0-4}$SR$^\circ$, SC(S)SR$^\circ$; —(CH$_2$)$_{0-4}$SC(O)R$^\circ$; —(CH$_2$)$_{0-4}$C(O)NR$^\circ$$_2$; —C(S)NR$^\circ$$_2$; —C(S)SR$^\circ$; —SC(S)SRO, —(CH$_2$)$_{0-4}$OC(O)NR$^\circ$$_2$; —C(O)N(OR$^\circ$)R$^\circ$; —C(O)C(O)R$^\circ$; —C(O)CH$_2$C(O)R$^\circ$; —C(NOR$^\circ$)R$^\circ$; —(CH$_2$)$_{0-4}$SSR$^\circ$; —(CH$_2$)$_{0-4}$S(O)$_2$R$^\circ$; —(CH$_2$)$_{0-4}$S(O)$_2$OR$^\circ$; —(CH$_2$)$_{0-4}$OS(O)$_2$R$^\circ$; —S(O)$_2$NR$^\circ$$_2$; —(CH$_2$)$_{0-4}$S(O)R$^\circ$; —N(R$^\circ$)S(O)$_2$NR$^\circ$$_2$; —N(R$^\circ$)S(O)$_2$R$^\circ$; —N(OR$^\circ$)R$^\circ$; —C(NH)NR$^\circ$$_2$; —P(O)$_2$R$^\circ$; —P(O)R$^\circ$$_2$; —OP(O)R$^\circ$$_2$; —OP(O)(OR$^\circ$)$_2$; SiR$^\circ$$_3$; —(C$_{1-4}$ straight or branched alkylene)O—N(R$^\circ$)$_2$; or —(C$_{1-4}$ straight or branched alkylene)C(O)O—N(R$^\circ$)$_2$, wherein each R$^\circ$ may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^\circ$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R$^\circ$ (or the ring formed by taking two independent occurrences of R$^\circ$ together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R$^\circ$)$_2$; —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^\circ$ include ═O and ═S.

Suitable divalent substituents on a saturated carbon atom of an "optionally substituted" group include the following: ═O, ═S, ═NNR*$_2$, ═NNHC(O)R*, ═NNHC(O)OR*, ═NNHS(O)$_2$R*, ═NR*, ═NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R$^\dagger$)S(O)$_2$R$^\dagger$; wherein each R$^\dagger$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of $R^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of $R^†$ are independently halogen, —$R^●$, -(halo$R^●$), —OH, —$OR^●$, —O(halo$R^●$), —CN, —C(O)OH, —C(O)$OR^●$, —$NH_2$, —$NHR^●$, —$NR^●_2$, or —$NO_2$, wherein each $R^●$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

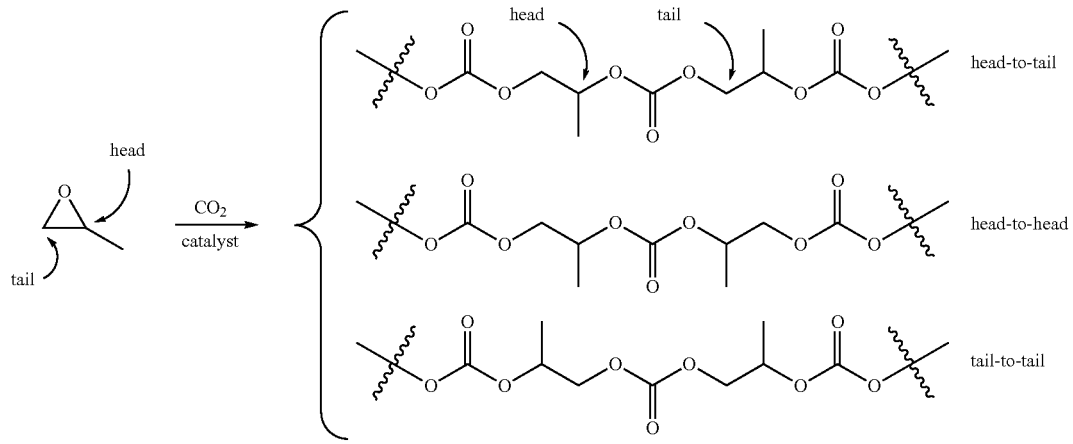

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the specific regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

In some chemical structures depicted herein, substituents are shown attached to a bond that crosses a bond of a ring or carbon chain of the depicted molecule. This convention indicates that one or more of the substituents may be attached to the ring or chain at any available position (usually in place of a hydrogen atom of the parent structure). In cases where an atom of a ring or chain so substituted has two substitutable positions, two groups may be present on the same atom. Unless otherwise indicated, when more than one substituent is present, each is defined independently of the others, and each may have a different structure. In cases where the substituent shown crossing a bond of the ring is —R, this has the same meaning as if the ring were said to be "optionally substituted" as described in the preceding paragraph.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

DETAILED DESCRIPTION OF CERTAIN EMBODIMENTS

Figure 1:
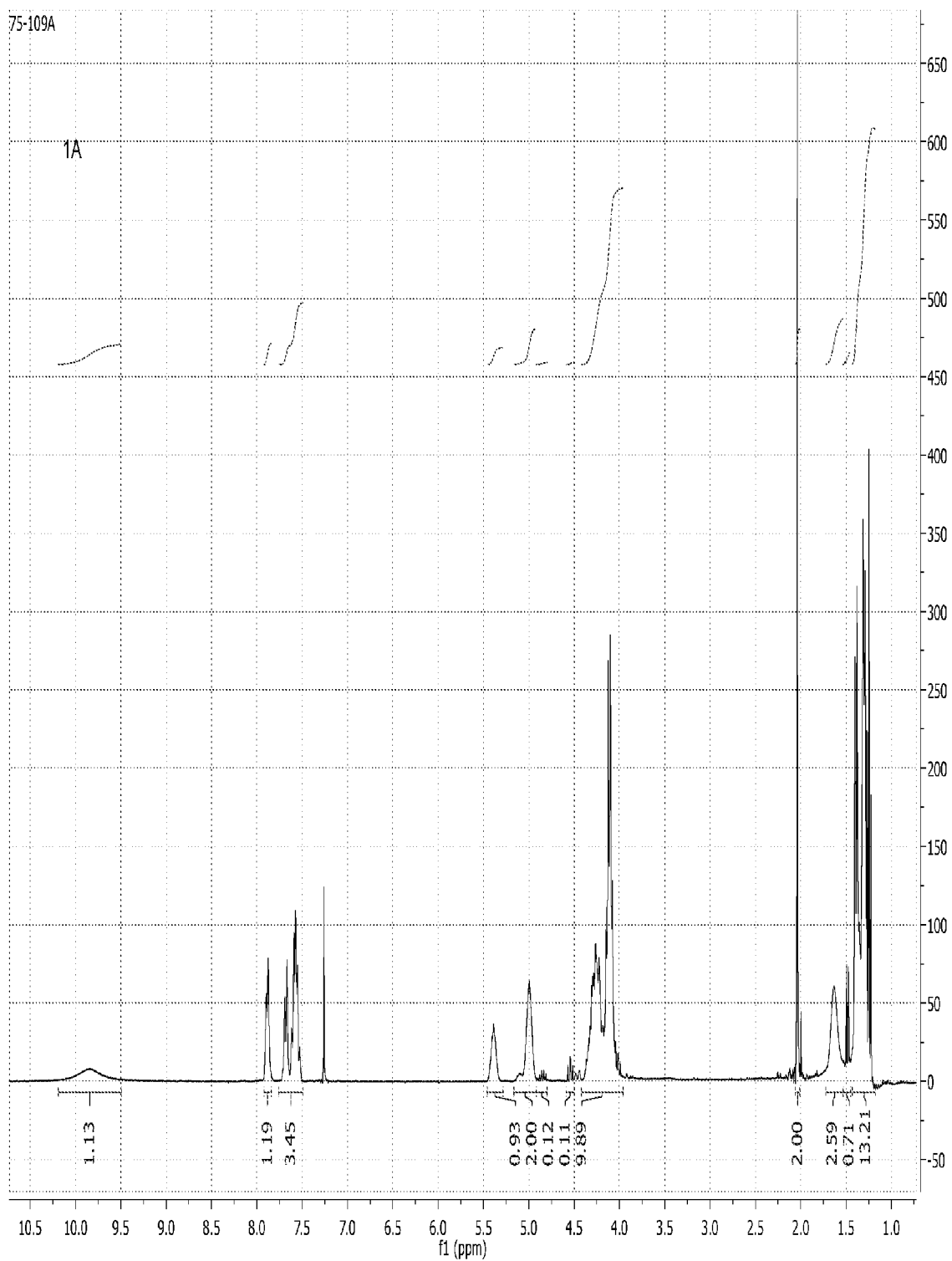
FIG. 1 shows the $^1$H NMR spectrum of a poly(propylene carbonate) composition of the present invention wherein the majority of chain ends comprise phthalate AEF groups.

The present invention encompasses polymer compositions comprising aliphatic polycarbonate chains. In certain embodiments the aliphatic polycarbonate chains comprise functionality that increases adhesion and/or wetting of materials such as glass, ceramics, minerals, and other inorganic materials. Hereinafter, such functionality is referred to as 'Adhesion-Enhancing Functional groups' or simply 'AEF' groups, it is to be understood that the acronym also encompasses groups may increase the wetting of inorganic materials by the polymers (or of course both wetting and adhesion). In certain embodiments, such AEF groups comprise moieties selected from the group consisting of silicon-containing functional groups, sulfonic acid groups, carboxylic acid groups, ammonium groups, boron-containing functional groups, phosphorous-containing functional groups and combinations of two or more of these.

I) Aliphatic Polycarbonates with AEF Groups at the Chain Ends

In certain embodiments, the present invention encompasses polymer compositions containing aliphatic polycarbonate polymers comprising AEF groups at one or more chain ends. In certain embodiments, AEF groups are introduced by modifying hydroxyl end-groups on aliphatic polycarbonate chains in a post-polymerization step. In other embodiments, AEF end-groups are introduced during polymerization by initiating aliphatic polycarbonate chains with reagents containing the combination of i) a functional group that can initiate copolymerization of carbon dioxide and epoxides, and ii) one or more AEF groups (or one or more suitable AEF group precursors). In some embodiments, aliphatic polycarbonate chains may be derived by a combination of both of these approaches.

Turning first to compounds derived from post-polymerization modification, in certain embodiments, aliphatic polycarbonate chains containing at least one hydroxyl end-group are chemically modified in a post-polymerization reaction to introduce AEF groups:

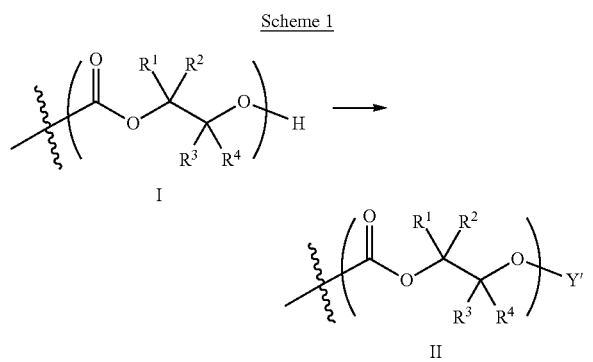

As depicted in Scheme 1, structure I represents a portion of an aliphatic polycarbonate chain (each chain may have more than one such end) and structure II represents a modified analog of I with an end group Y', wherein:

$R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms and/or one or more sites of unsaturation; and each Y' is independently a moiety comprising one or more AEF groups.

In certain embodiments, the AEF groups in Y' are selected from the group consisting of carboxylic acid groups, silicon-containing functional groups, sulfonic acid groups, boron-containing functional groups, phosphorus-containing functional groups, ammonium groups, and combinations of two or more of these. In certain embodiments, Y' comprises one or more carboxylic acid groups. In certain embodiments, Y' comprises one or more silicon-containing functional groups. In certain embodiments, Y' comprises one or more sulfonic acid groups. In certain embodiments, each Y' contains one AEF group. In other embodiments, each Y' contains two or more AEF groups each of which may be the same or different.

In certain embodiments, Y' in structure II comprises a bifunctional or multifunctional moiety which links the aliphatic polycarbonate chain end to one or more AEF groups. In certain embodiments, such compounds conform to a formula:

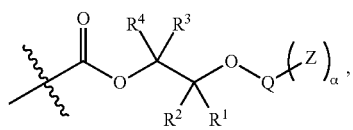

where, each of $R^1$, $R^2$, $R^3$, and $R^4$ is as defined above and in the classes and subclasses herein
-Q- is a bivalent or multivalent moiety,
each Z comprises an AEF group as defined above and in the classes and subclasses herein, and
α is an integer from 1 to 4 inclusive.

For the sake of clarity, in the example above, the group —Q-(Z)$_α$, corresponds to a Y' group in structure II, where Q is a bivalent or multivalent moiety which acts as a linker between the terminal oxygen atom of a polycarbonate chain and the AEF group(s) which are represented by —Z. In typical cases, —Q- groups correspond to the carbon-containing skeleton of a reagent having a combination of i) a functional group reactive toward the terminal —OH group at a polymer chain end, and ii) one or more AEF groups (or precursors thereof). More specific examples of such bivalent or multivalent moieties are described in the classes, subclasses and examples below.

In certain embodiments, the bi- or multivalent moiety Q comprises one or more carbon atoms and optionally one or more heteroatoms. The carbon and/or heteroatoms in a Q group may be optionally substituted with suitable groups such as those described in the definitions hereinabove. Q groups may optionally contain sites of unsaturation, carbocyclic rings, and/or heterocyclic rings. Q groups may also comprise oligomeric or polymeric structures.

In certain embodiments, Q comprises a bivalent $C_{1-8}$ saturated or unsaturated, straight or branched, hydrocarbon chain.

In certain embodiments, the structure of a —Q- group is dictated by the availability of suitable reagents comprising the combination of —OH-reactive groups and AEF groups described above. For example, if succinic anhydride were used to introduce the AEF group, then —Q- would be —C(O)CH$_2$CH$_2$—, —Z would be —CO$_2$H, α would be 1, and the resulting product would be an aliphatic polycarbonate with one or more chain ends having a structure:

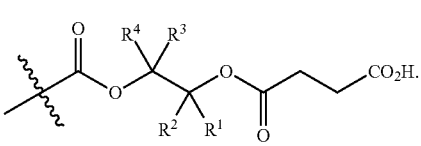

There are a large number of reagents possessing the required combination of —OH reactive groups and AEF groups available commercially and/or disclosed in the literature; examples include, but are not limited to, reagents with —OH reactive functional groups such as acid anhydrides, acid halides, sulfonic acid halides, alkyl halides, isocyanates, silyl chlorides, esters, ortho esters, acetals, and the like. Using the present disclosure and the teachings herein, it will be apparent to the skilled artisan that a large number of such reagents can be obtained or prepared and that the selection of a specific reagent will dictate the structure of the -Q- group of the resulting composition. Such methods and the consequent compositions are specifically encompassed within the present invention.

In certain embodiments, the AEF moiety —Z is independently selected from the group consisting of: silicon-containing functional groups, phosphorous-containing functional groups, —SO$_3$H, —CO$_2$H, and —NR$_{3+}$ where each R is independently selected from —H, C$_{1-10}$ aliphatic and optionally substituted aryl. In certain embodiments, the AEF moiety —Z is —SO$_3$H. In certain embodiments, the AEF moiety —Z is —CO$_2$H. In certain embodiments, the AEF moiety —Z is a silicon-containing functional group.

In certain embodiments, -Q-(Z)$_\alpha$ comprises a single AEF moiety (i.e. a is one). In certain embodiments, a plurality of AEF groups (i.e. a is greater than 1). In certain embodiments, α is two. In certain embodiments, α is three or four. In certain embodiments, where α is greater than 1, each —Z group in a —Y moiety is the same. In other embodiments, where α is greater than 1, two or more Z groups in a —Y moiety are different.

I(a) Ester-Linked AEF Groups at Chain Ends

In certain embodiments, Y' in structure II represents an ester-linked moiety. Such esters can be generated by acylating the —OH end group of a polycarbonate chain with a suitable reagent such as an acid chloride, an acid anhydride or under transesterification conditions with an ester of a lower alcohol. In certain embodiments, such an ester-linked compound has a formula IIa:

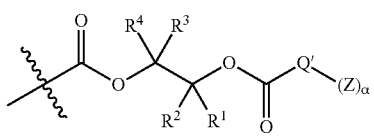

wherein each of R$^1$, R$^2$, R$^3$, R$^4$, Z, and α is as defined above and described in classes and subclasses herein; and Q' is a multifunctional organic moiety optionally containing one or more heteroatoms.

In certain embodiments, Q' is an optionally substituted bivalent C$_{1-8}$ saturated or unsaturated, straight or branched, hydrocarbon chain.

In certain embodiments, Q' is an optionally substituted ring. In certain embodiments, Q' is an optionally substituted aryl ring. In certain embodiments, Q' is an optionally substituted phenyl ring.

In certain embodiments, where Y' comprises an ester-linked moiety, inventive compounds of the present invention have a formula conforming to IIa-1:

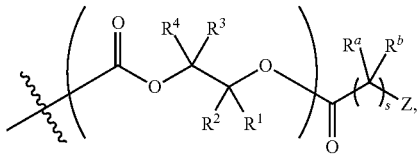

where each of R$^1$, R$^2$, R$^3$, R$^4$, and Z is as defined above and described in classes and subclasses herein;

R$^a$, and R$^b$ are, at each occurrence, independently selected from the group consisting of —H, halogen, an optionally substituted C$_{1-20}$ aliphatic group, an optionally substituted C$_{1-20}$ heteroaliphatic group, an optionally substituted C$_{6-14}$ aryl group, an optionally substituted acyloxy group, an optionally substituted acyl group, an optionally substituted alkoxy group, an optionally substituted 3- to 14-membered carbocyclic group, and an optionally substituted 3- to 12-membered heterocyclic group, where any two or more R$^a$ and R$^b$ groups may optionally be taken together with intervening atoms to form one or more optionally substituted, optionally unsaturated rings optionally containing one or more heteroatoms, where any two or more R$^a$ and R$^b$ groups on adjacent carbon atoms may optionally be taken together with intervening atoms to form an optionally substituted aryl ring, where an R$^a$ or R$^b$ on one carbon atom and an R$^a$ or R$^b$, on an adjacent carbon may optionally be taken together with the bond between the adjacent carbons to represent a double bond between the two carbon atoms, and where an R$^a$ and R$^b$ group on the same atom may be taken together to form an optionally substituted moiety selected from the group consisting of: alkene, imine, oxime, and hydrazone; and s is an integer from 1 to 12 inclusive.

In certain embodiments, where Y' comprises an ester-linked moiety, inventive compounds of the present invention have a formula conforming to IIa-1':

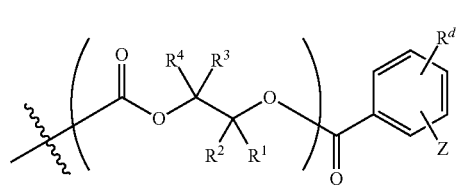

where each of R$^1$, R$^2$, R$^3$, R$^4$, and Z is as defined above and described in classes and subclasses herein; and one or more R$^d$ groups are optionally present, and if present are, independently at each occurrence, selected from the group consisting of: halogen, —NO$_2$, —CN, —SR, —S(O)R, —S(O)$_2$R, —NRC(O)R, —OC(O)R, —CO$_2$R, —NCO, —N$_3$, —OR, —OC(O)N(R)$_2$, —N(R)$_2$, —NRC(O)R, —NRC(O)OR; or an optionally substituted radical selected from the group consisting of C$_{1-20}$ aliphatic, C$_{1-20}$ heteroaliphatic, a 3- to 14-membered carbocycle, a 3- to 12-membered heterocycle, a 5- to 12-membered heteroaryl, and 6- to 10-membered aryl; where two or more adjacent R$^d$ groups can be taken together to form an optionally substituted saturated, partially unsaturated, or aromatic 5- to 12-membered ring containing 0 to 4 heteroatoms;

where each occurrence of R is independently —H, or an optionally substituted moiety selected from the group consisting of $C_{1-6}$ aliphatic, $C_{1-6}$ heteroaliphatic, 3- to 7-membered heterocyclic, 3- to 7-membered carbocyclic 6- to 10-membered aryl, and 5- to 10-membered heteroaryl.

In certain embodiments, where Y' in structure II represents an ester-linked moiety, the Z group comprises a free carboxyl group. In certain embodiments, such an ester has a formula IIa-1a:

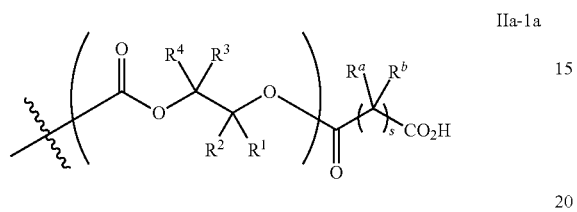

IIa-1a wherein each of $R^a$, $R^b$, s, $R^1$, $R^2$, $R^3$, and $R^4$ is as defined above and described in classes and subclasses herein.

In certain embodiments, esters of formula IIa-1a are selected from the group consisting of:

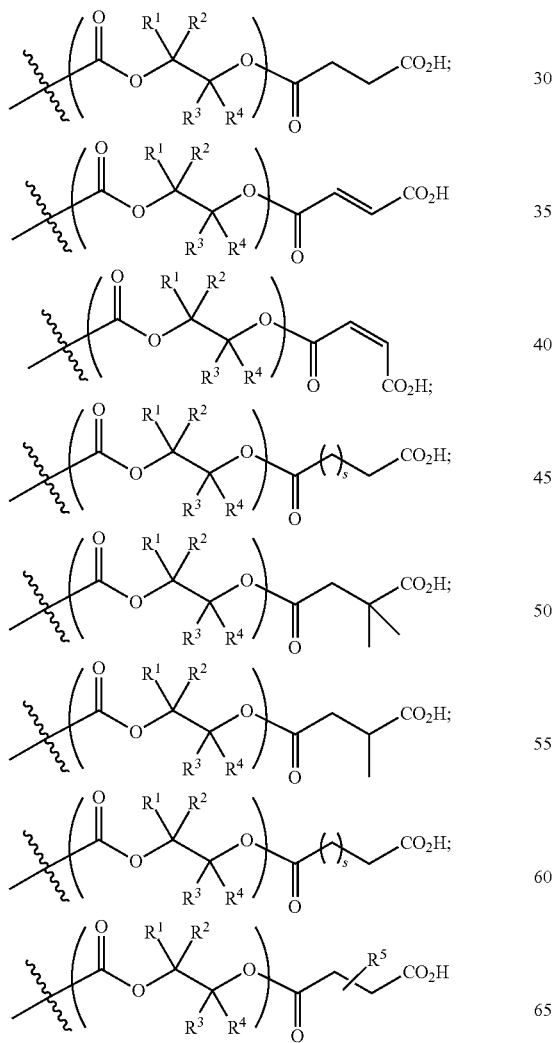

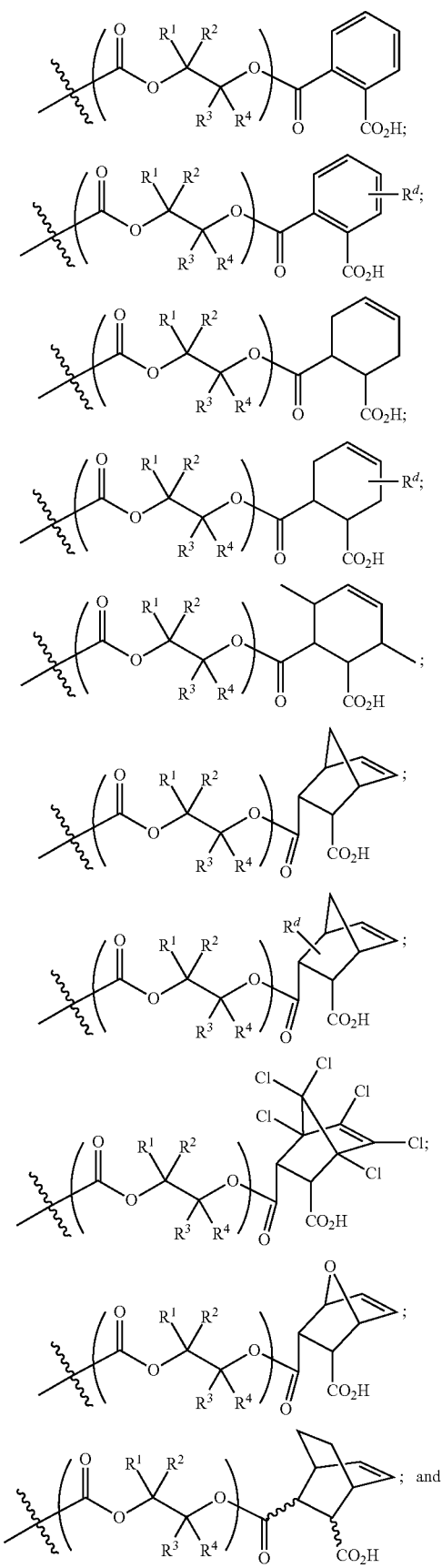

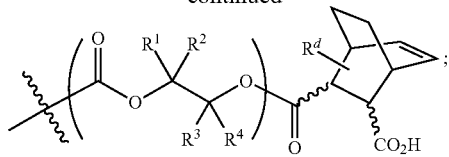

wherein each of s, $R^1$, $R^2$, $R^3$, and $R^4$ is as defined above and described in classes and subclasses herein;
$R^5$ is, at each occurrence, independently selected from the group consisting of —$CH_3$, -Ph, and —$SO_3H$
$R^d$ is, at each occurrence, independently selected from the group consisting of: halogen, —$NO_2$, —CN, —SR, —S(O)R, —S(O)$_2$R, —NRC(O)R, —OC(O)R, —$CO_2$R, —NCO, —$N_3$, —OR, —OC(O)N(R)$_2$, —N(R)$_2$, —NRC(O)R, —NRC(O)OR; or an optionally substituted radical selected from the group consisting of $C_{1-20}$ aliphatic, $C_{1-20}$ heteroaliphatic, a 3- to 14-membered carbocycle, a 3- to 12-membered heterocycle, a 5- to 12-membered heteroaryl, and 6- to 10-membered aryl; where two or more adjacent $R^d$ groups can be taken together to form an optionally substituted saturated, partially unsaturated, or aromatic 5- to 12-membered ring containing 0 to 4 heteroatoms; where each occurrence of R is independently —H, or an optionally substituted moiety selected from the group consisting of $C_{1-6}$ aliphatic, $C_{1-6}$ heteroaliphatic, 3- to 7-membered heterocyclic, 3- to 7-membered carbocyclic 6- to 10-membered aryl, and 5- to 10-membered heteroaryl.

In certain embodiments, esters of formula IIa-1a are selected from the group consisting of:

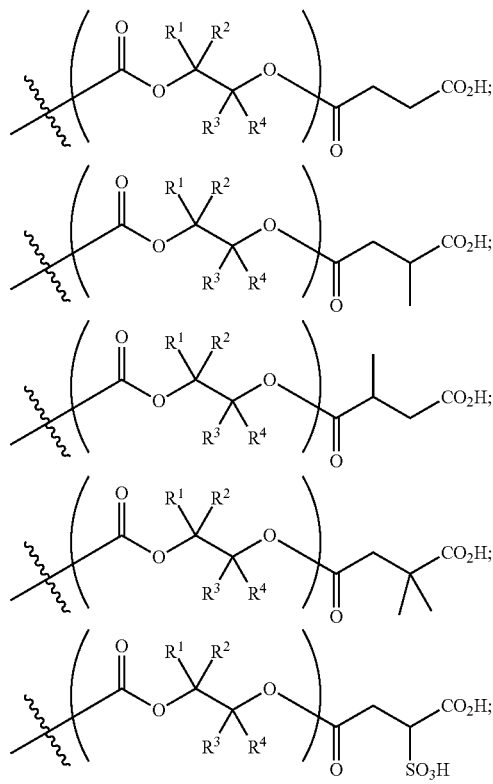

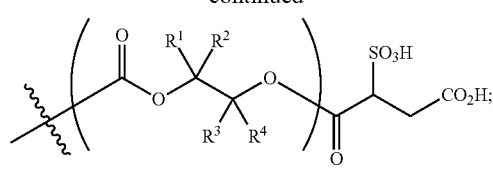

and combinations of any two or more of these, wherein each of $R^1$, $R^2$, $R^3$, and $R^4$ is as defined above and described in classes and subclasses herein.

In certain embodiments, esters of formula IIa-1a are selected from the group consisting of:

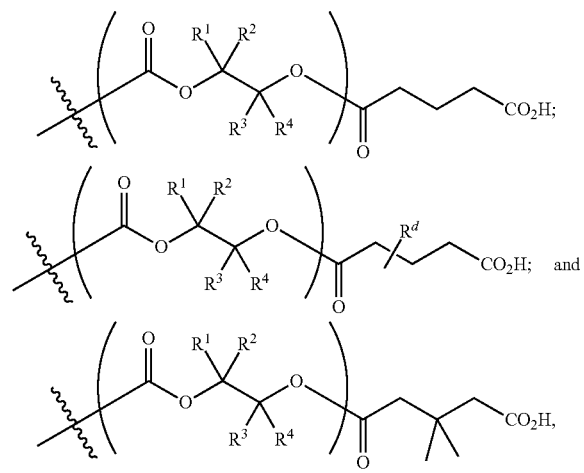

wherein each of $R^d$, $R^1$, $R^2$, $R^3$, and $R^4$ is as defined above and described in classes and subclasses herein.

In certain embodiments, where Y' in structure II represents an ester-linked moiety, and the Z group comprises a free carboxyl group, such an ester has a formula IIa-1a':

IIa-1a'

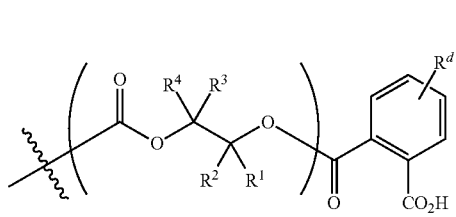

wherein each of $R^d$, $R^1$, $R^2$, $R^3$, and $R^4$ is as defined above and described in classes and subclasses herein.

In certain embodiments, esters of formula IIa-1a' are selected from the group consisting of:

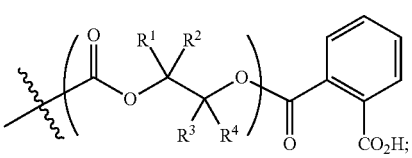

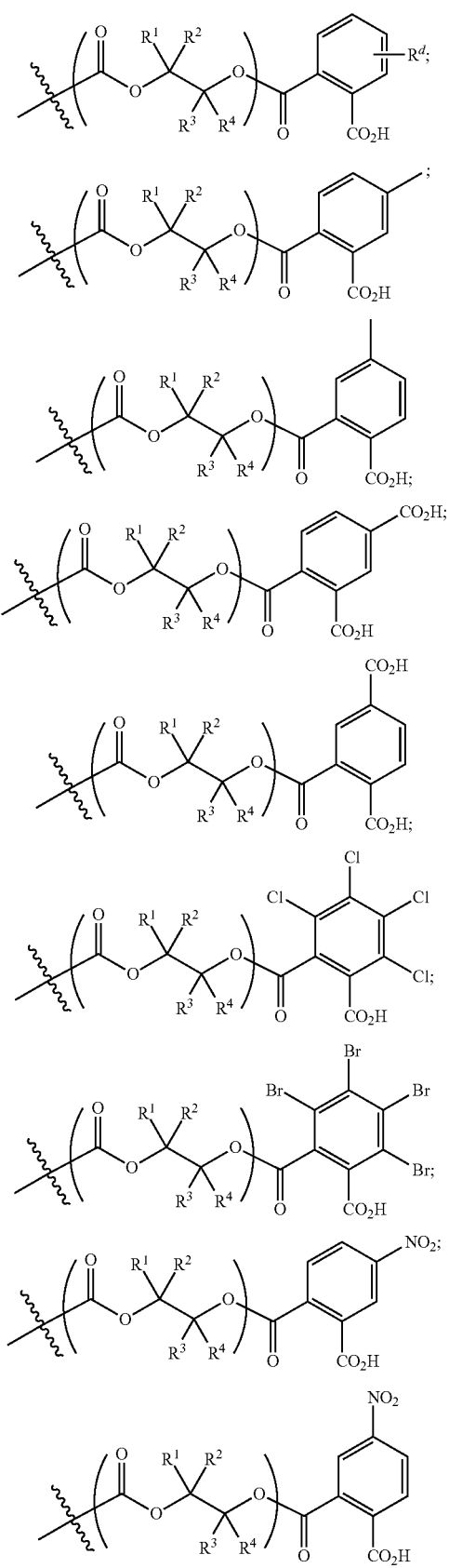

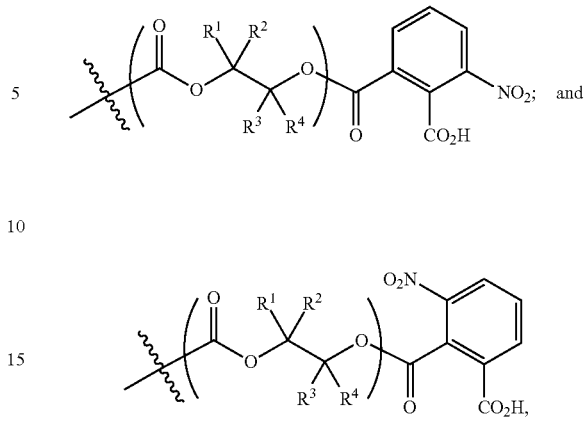

wherein each of $R^d$, $R^1$, $R^2$, $R^3$, and $R^4$ is as defined above and described in classes and subclasses herein.

In certain embodiments, where Y' in structure II represents an ester-linked moiety, the Z group comprises a silicon-containing functional group. In certain embodiments, such an ester has a formula IIa-2a:

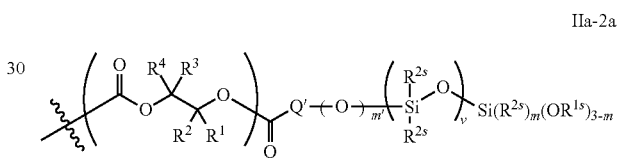

IIa-2a where each of $R^1$, $R^2$, $R^3$, $R^4$, Q', $R^{1s}$, $R^{2s}$, m, and v is as defined above and in the classes and subclasses herein, each $R^{2s}$ is independently H, optionally substituted $C_{1-6}$ aliphatic, or optionally substituted phenyl;

each $R^{1s}$ is independently a $C_{1-6}$ aliphatic group or optionally substituted aryl group, m is 0, 1, 2, or 3 v is 0 or an integer from 1 to about 20; and m' is 0 or 1.

In certain embodiments, where Y' in structure II represents an ester-linked moiety and the Z group comprises a silicon-containing functional group, such an ester has a formula IIa-2b:

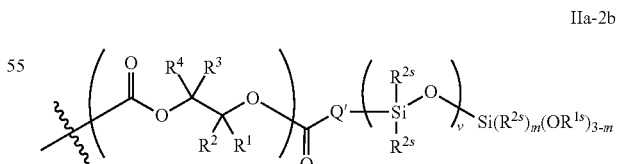

IIa-2b where each of $R^1$, $R^2$, $R^3$, $R^4$, Q', $R^{1s}$, $R^{2s}$, m, and v is as defined above and in the classes and subclasses herein.

In certain embodiments, where Y' in structure II represents an ester-linked moiety and the Z group comprises a silicon-containing functional group, such an ester has a formula IIa-2c:

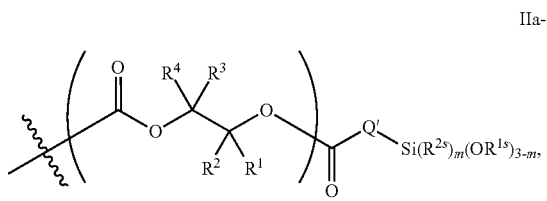

IIa-2c where each of $R^1$, $R^2$, $R^3$, $R^4$, Q', $R^{1s}$, $R^{2s}$, and m is as defined above and in the classes and subclasses herein.

In certain embodiments, where Y' in structure II represents an ester-linked moiety and the Z group comprises a silicon-containing functional group, such an ester has a formula IIa-2d:

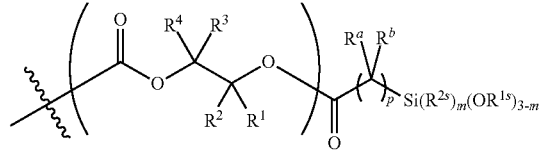

IIa-2d where each of $R^1$, $R^2$, $R^3$, $R^4$, $R^a$, $R^b$, $R^{1s}$, $R^{2s}$ and m is as defined above and in the classes and subclasses herein, p is an integer from 1 to 10.

In certain embodiments, polycarbonates of formula IIa-2d, conform to a formula:

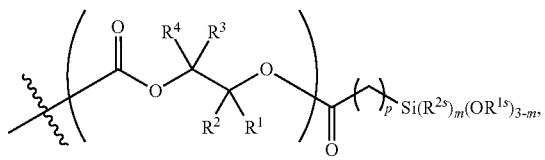

where $R^1$, $R^2$, $R^3$, $R^4$, $R^{1s}$, $R^{2s}$ and p are as defined above and in the classes and subclasses herein.

In certain embodiments, where Y' in structure II represents an ester-linked moiety, the Z group comprises a sulfonic acid. In certain embodiments, such an ester has a formula IIa-3a:

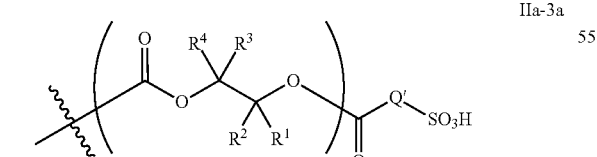

IIa-3a where $R^1$, $R^2$, $R^3$, $R^4$, and Q' are as defined above and in the classes and subclasses herein.

In certain embodiments, where Y' in structure II represents an ester-linked moiety, the Z group comprises a sulfonic acid, such an ester has a formula IIa-3b:

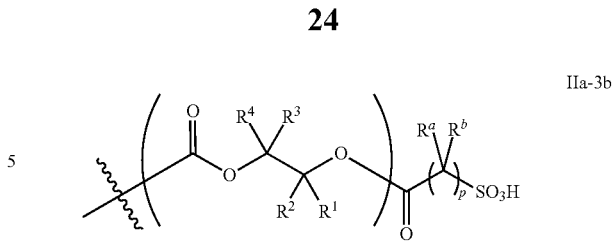

IIa-3b where each of $R^1$, $R^2$, $R^3$, $R^4$, $R^a$, $R^b$, and p is as defined above and in the classes and subclasses herein.

In certain embodiments, where Y' in structure II represents an ester-linked moiety, the Z group comprises a sulfonic acid, such an ester has a formula IIa-3c:

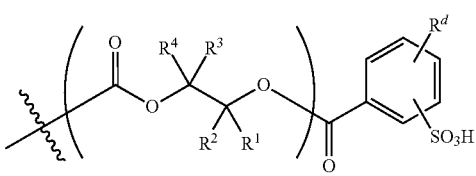

IIa-3c where each of $R^1$, $R^2$, $R^3$, $R^4$, and $R^d$ is as defined above and in the classes and subclasses herein.

In certain embodiments, where Y' in structure II represents an ester-linked moiety, the Z group comprises a phosphine group. In certain embodiments, such an ester has a formula IIa-4a:

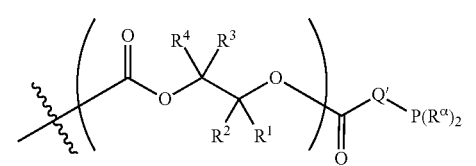

IIa-4a where $R^1$, $R^2$, $R^3$, $R^4$, and Q' are as defined above and in the classes and subclasses herein, and $R^\alpha$ is at each occurrence, independently selected from the group consisting of optionally substituted phenyl, and optionally substituted $C_{1-12}$ aliphatic.

In certain embodiments, where Y' in structure II represents an ester-linked moiety, the Z group comprises a phosphine moiety, such an ester has a formula IIa-4b:

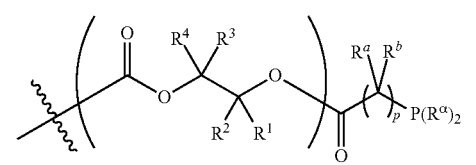

IIa-4b where each of $R^1$, $R^2$, $R^3$, $R^4$, $R^a$, $R^b$, $R^\alpha$, and p is as defined above and in the classes and subclasses herein.

In certain embodiments, where Y' in structure II represents an ester-linked moiety, the Z group comprises a phosphonium group. In certain embodiments, such an ester has a formula IIa-5a:

IIa-5a

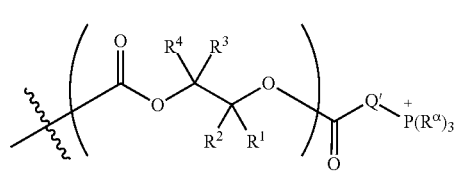

where $R^1$, $R^2$, $R^3$, $R^4$, $R^\alpha$, and Q' are as defined above and in the classes and subclasses herein.

In certain embodiments, where Y' in structure II represents an ester-linked moiety and the Z group comprises a phosphonium moiety, such an ester has a formula IIa-5b:

IIa-5b

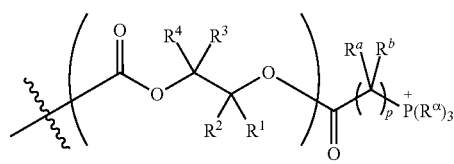

where each of $R^1$, $R^2$, $R^3$, $R^4$, $R^a$, $R^b$, $R^\alpha$, and p is as defined above and in the classes and subclasses herein.

In certain embodiments, where Y' in structure II represents an ester-linked moiety, the Z group comprises an amine group. In certain embodiments, such an ester has a formula IIa-6a:

IIa-6a

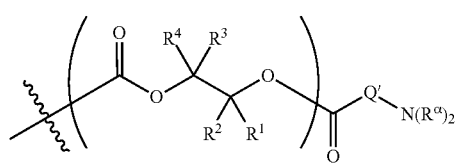

where $R^1$, $R^2$, $R^3$, $R^4$, $R^\alpha$, and Q' are as defined above and in the classes and subclasses herein.

In certain embodiments, where Y' in structure II represents an ester-linked moiety, the Z group comprises an amine moiety, such an ester has a formula IIb-6b:

IIa-6b

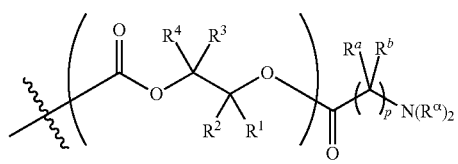

where each of $R^1$, $R^2$, $R^3$, $R^4$, $R^a$, $R^b$, $R^\alpha$, and p is as defined above and in the classes and subclasses herein.

In certain embodiments, where Y' in structure II represents an ester-linked moiety, the Z group comprises an ammonium group. In certain embodiments, such an ester has a formula IIa-7a:

IIa-7a

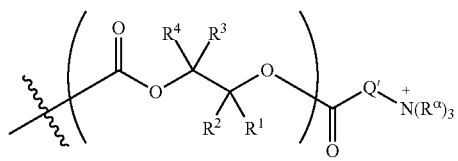

where $R^1$, $R^2$, $R^3$, $R^4$, $R^\alpha$, and Q' are as defined above and in the classes and subclasses herein.

In certain embodiments, where Y' in structure II represents an ester-linked moiety and the Z group comprises an ammonium moiety, such an ester has a formula IIa-7b:

IIa-7b

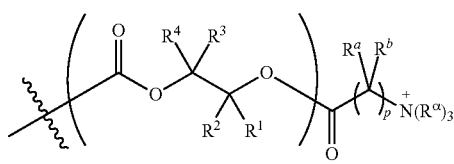

where each of $R^1$, $R^2$, $R^3$, $R^4$, $R^a$, $R^b$, $R^\alpha$, and p is as defined above and in the classes and subclasses herein.

I(b) Carbamate-Linked AEF Groups at Chain Ends

In certain other embodiments, Y' in structure II represents a carbamate-linked moiety containing an AEF group. Such compounds can be generated by carbamoylating the —OH end group of a polycarbonate chain with a suitable reagent such as an isocyanate. In certain embodiments, such a carbamate has a formula IIb:

IIb

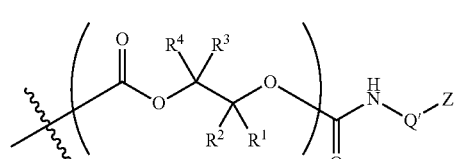

wherein each of $R^1$, $R^2$, $R^3$, $R^4$, Q' and Z, is as defined above and in the classes and subclasses herein.

In certain embodiments, such a carbamate has a formula IIb-1:

IIb-1

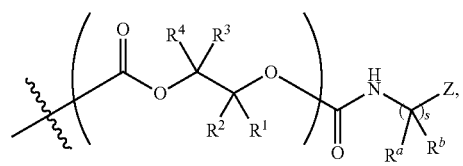

where each of $R^1$, $R^2$, $R^3$, $R^4$, $R^a$, $R^b$, s, and Z is as defined above and described in classes and subclasses herein.

In certain embodiments, where Y' in structure II represents a carbamate-linked moiety, the Z group comprises a silicon-containing functional group. In certain embodiments, such a carbamate has a formula IIb-1a:

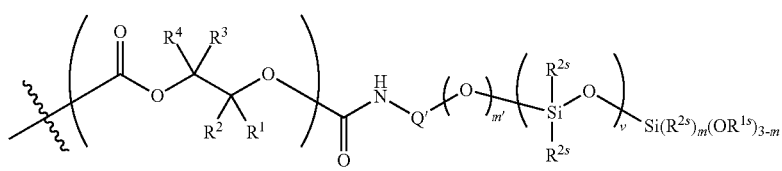

IIb-1a where each of $R^1$, $R^2$, $R^3$, $R^4$, $Q'$, $R^{1s}$, $R^{2s}$, m, m' and v is as defined above and in the classes and subclasses herein.

In certain embodiments, where Y' in structure II represents a carbamate-linked moiety and the Z group comprises a silicon-containing functional group, such a carbamate has a formula IIb-1b:

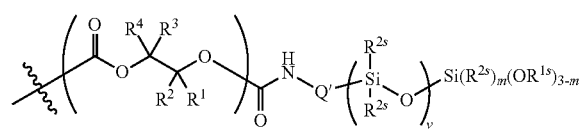

IIb-1b where each of $R^1$, $R^2$, $R^3$, $R^4$, $Q'$, $R^{1s}$, $R^{2s}$, m, and v is as defined above and in the classes and subclasses herein.

In certain embodiments, where Y' in structure II represents a carbamate-linked moiety and the Z group comprises a silicon-containing functional group, such a carbamate has a formula IIb-1c:

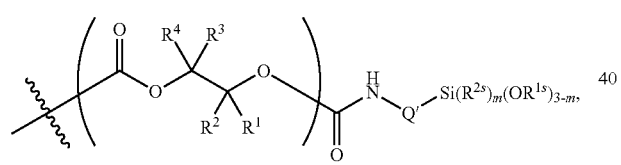

IIb-1c where each of $R^1$, $R^2$, $R^3$, $R^4$, $Q'$, $R^{1s}$, $R^{2s}$, and m is as defined above and in the classes and subclasses herein.

In certain embodiments, where Y' in structure II represents a carbamate-linked moiety and the Z group comprises a silicon-containing functional group, such a carbamate has a formula IIb-1d:

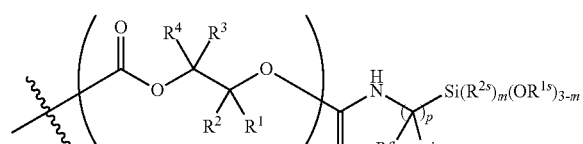

IIb-1d where each of $R^1$, $R^2$, $R^3$, $R^4$, $R^a$, $R^b$, $R^{1s}$, $R^{2s}$, p, and m is as defined above and in the classes and subclasses herein.

In certain embodiments, polycarbonates of formula IIb-1d, conform to a formula:

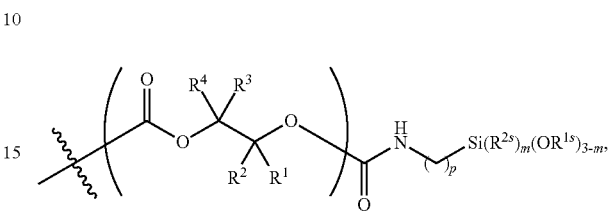

where $R^1$, $R^2$, $R^3$, $R^4$, $R^{1s}$, $R^{2s}$, m, and p are as defined above and in the classes and subclasses herein.

In certain embodiments, for polycarbonates of formula IIb-1d, each carbamate-linked moiety is independently selected from the group consisting of:

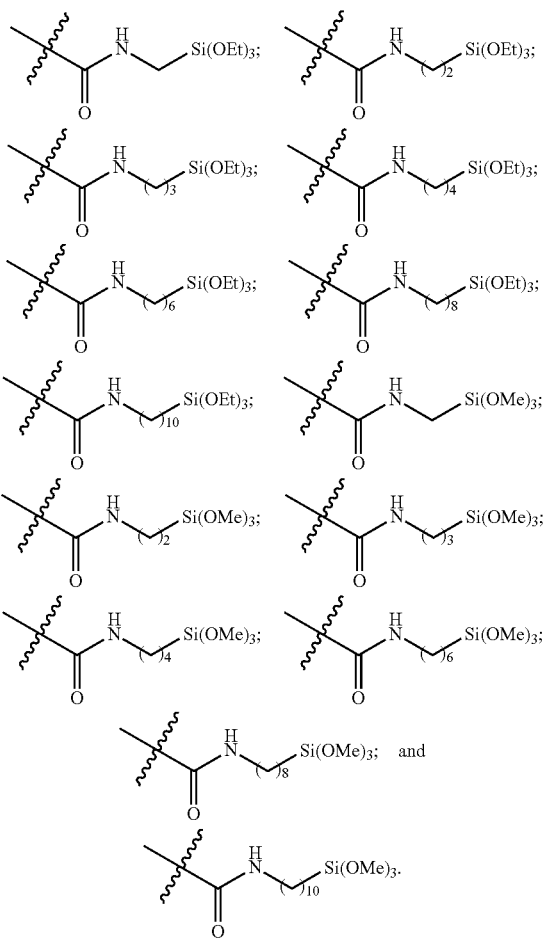

In certain embodiments, where Y' in structure II represents a carbamate-linked moiety, the Z group comprises a sulfonic acid. In certain embodiments, such a carbamate has a formula IIb-2a:

IIb-2a

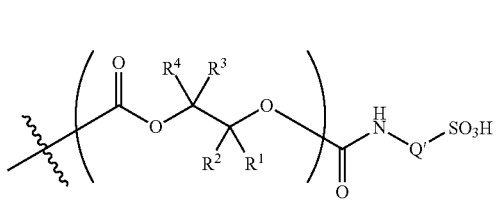

where $R^1$, $R^2$, $R^3$, $R^4$, and Q' are as defined above and in the classes and subclasses herein.

In certain embodiments, where Y' in structure II represents a carbamate-linked moiety and the Z group comprises a sulfonic acid, such a carbamate has a formula IIb-2b:

IIb-2b

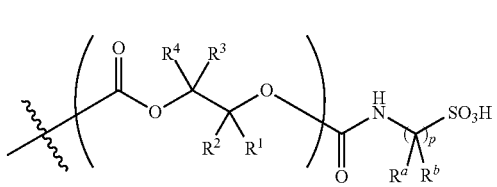

where each of $R^1$, $R^2$, $R^3$, $R^4$, $R^a$, $R^b$, and p is as defined above and in the classes and subclasses herein.

In certain embodiments, where Y' in structure II represents a carbamate-linked moiety the Z group comprises a carboxylic acid. In certain embodiments, such a carbamate has a formula IIb-3a:

IIb-3a

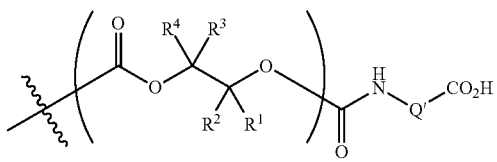

where $R^1$, $R^2$, $R^3$, $R^4$, and Q' are as defined above and in the classes and subclasses herein.

In certain embodiments, where Y' in structure II represents a carbamate-linked moiety and the Z group comprises a carboxylic acid, such a carbamate has a formula IIb-3b:

IIb-3b

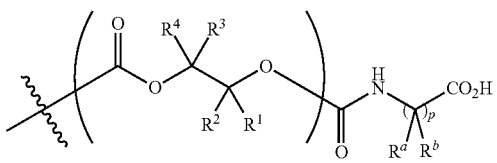

where each of $R^1$, $R^2$, $R^3$, $R^4$, $R^a$, $R^b$, and p is as defined above and in the classes and subclasses herein.

In certain embodiments, where Y' in structure II represents a carbamate-linked moiety, the Z group comprises a phosphine group. In certain embodiments, such a carbamate has a formula IIb-4a:

IIb-4a

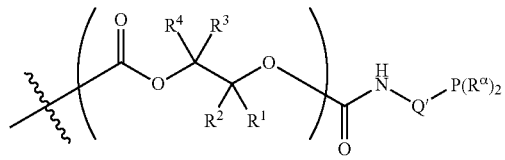

where $R^1$, $R^2$, $R^3$, $R^4$, $R^\alpha$, and Q' are as defined above and in the classes and subclasses herein.

In certain embodiments, where Y' in structure II represents a carbamate-linked moiety, the Z group comprises a phosphine moiety, such a carbamate has a formula IIb-4b:

IIb-4b

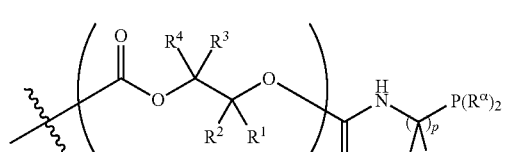

where each of $R^1$, $R^2$, $R^3$, $R^4$, $R^a$, $R^b$, $R^\alpha$, and p is as defined above and in the classes and subclasses herein.

In certain embodiments, where Y' in structure II represents a carbamate-linked moiety, the Z group comprises a phosphonium group. In certain embodiments, such a carbamate has a formula IIb-5a:

IIb-5a

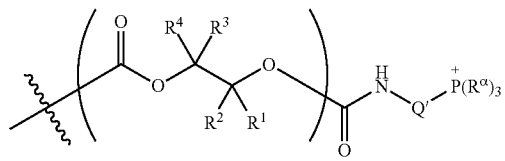

where $R^1$, $R^2$, $R^3$, $R^4$, $R^\alpha$, and Q' are as defined above and in the classes and subclasses herein.

In certain embodiments, where Y' in structure II represents a carbamate-linked moiety and the Z group comprises a phosphonium moiety, such a carbamate has a formula IIb-5b:

IIb-5b

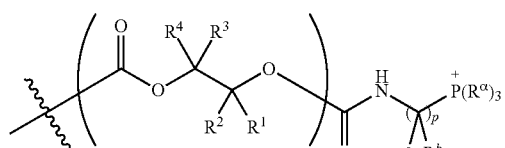

where each of $R^1$, $R^2$, $R^3$, $R^4$, $R^a$, $R^b$, $R^\alpha$, and p is as defined above and in the classes and subclasses herein.

In certain embodiments, where Y' in structure II represents a carbamate-linked moiety, the Z group comprises an amine group. In certain embodiments, such a carbamate has a formula IIb-6a:

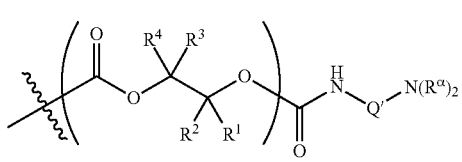
IIb-6a where $R^1$, $R^2$, $R^3$, $R^4$, $R^\alpha$, and Q' are as defined above and in the classes and subclasses herein.

In certain embodiments, where Y' in structure II represents a carbamate-linked moiety, the Z group comprises an amine moiety, such a carbamate has a formula IIb-6b:

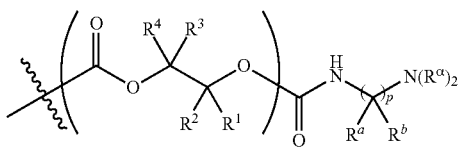
IIb-6b where each of $R^1$, $R^2$, $R^3$, $R^4$, $R^a$, $R^b$, $R^\alpha$, and p is as defined above and in the classes and subclasses herein.

In certain embodiments, where Y' in structure II represents a carbamate-linked moiety, the Z group comprises an ammonium group. In certain embodiments, such a carbamate has a formula IIb-7a:

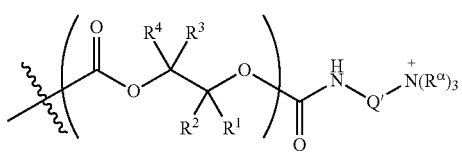
IIb-7a where $R^1$, $R^2$, $R^3$, $R^4$, $R^\alpha$, and Q' are as defined above in the classes and subclasses herein, and $R^\alpha$ is at each occurrence, independently selected from the group consisting of optionally substituted phenyl, and optionally substituted $C_{1-12}$ aliphatic.

In certain embodiments, where Y' in structure II represents a carbamate-linked moiety and the Z group comprises an ammonium moiety, such a carbamate has a formula IIb-7b:

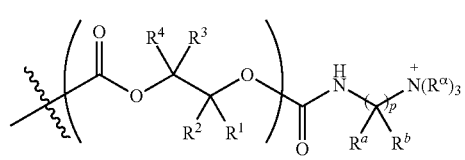
IIb-7b where each of $R^1$, $R^2$, $R^3$, $R^4$, $R^a$, $R^b$, $R^\alpha$, and p is as defined above and in the classes and subclasses herein.

In certain embodiments, where Y' in structure II represents a carbamate-linked moiety, the Y' group is derived from a diisocyanate. For example, an alcohol, amine, or mercaptan compound containing a Z group (or a Z group precursor) can be reacted with a diisocyanate to afford a mono-isocyanate linked via a carbamate, thiocarbamate, or urea linkage to a Z group. Such a reagent can be used to react with a hydroxyl end group of an aliphatic polycarbonate to afford compounds encompassed by the present invention. In certain embodiments, such materials have a structure selected from the group consisting of:

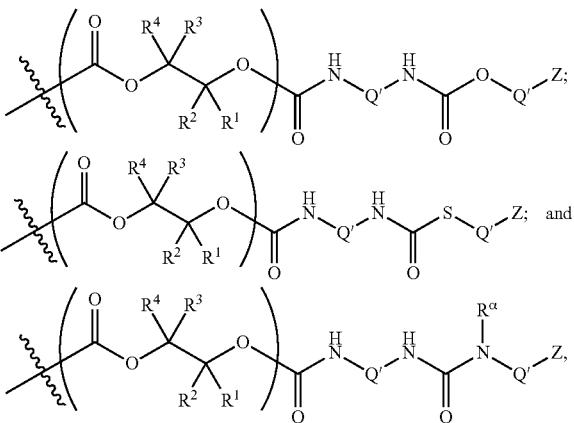

where each of $R^1$, $R^2$, $R^3$, $R^4$, $R^\alpha$, Q', and Z is as defined above and in the classes and subclasses herein and each of the two Q' moieties may be the same or different.

In certain embodiments, where a Y' group is derived from a diisocyanate, the Z group comprises a silicon-containing functional group. In certain embodiments, such compounds have a structure conforming selected from the group consisting of:

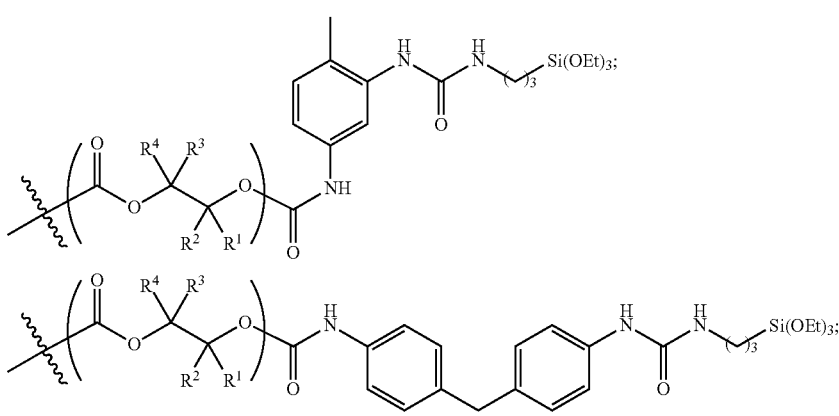

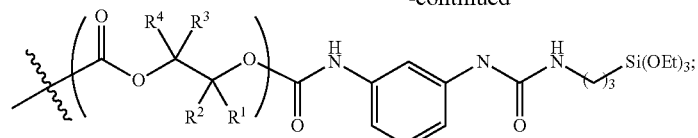
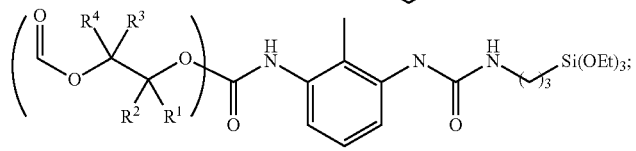
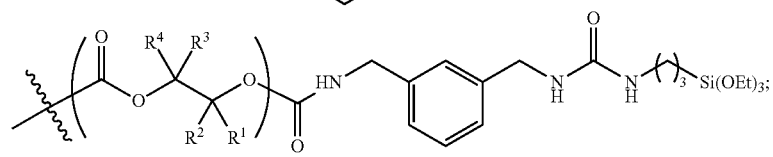
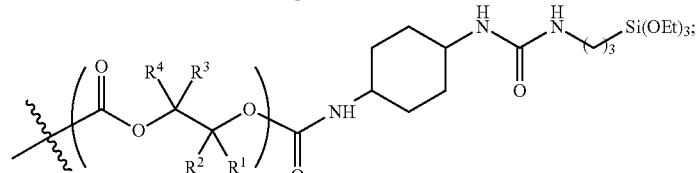
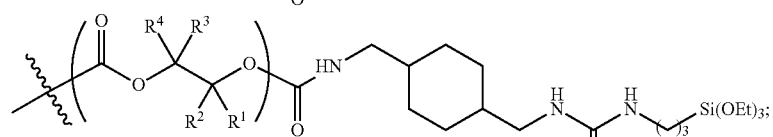
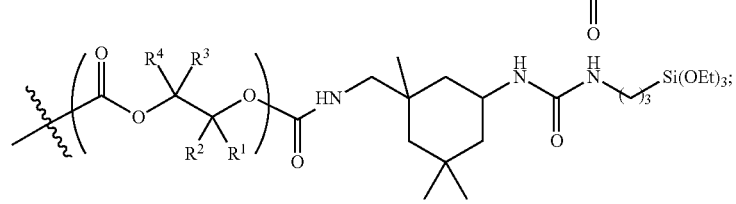
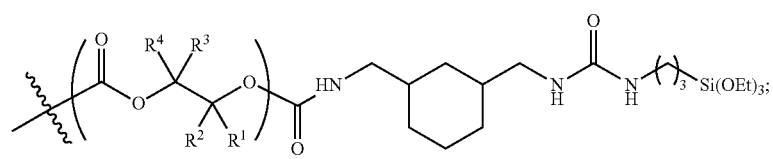
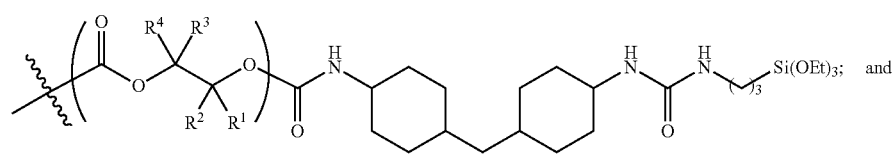
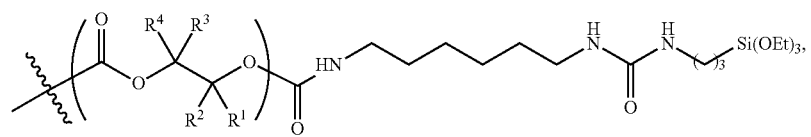
where $R^1$, $R^2$, $R^3$, and $R^4$ as defined above and in the classes and subclasses herein.
In certain embodiments, where a Y' group is derived from a diisocyanate and the Z group comprises a silicon-containing functional group, such compounds have a structure conforming selected from the group consisting of:

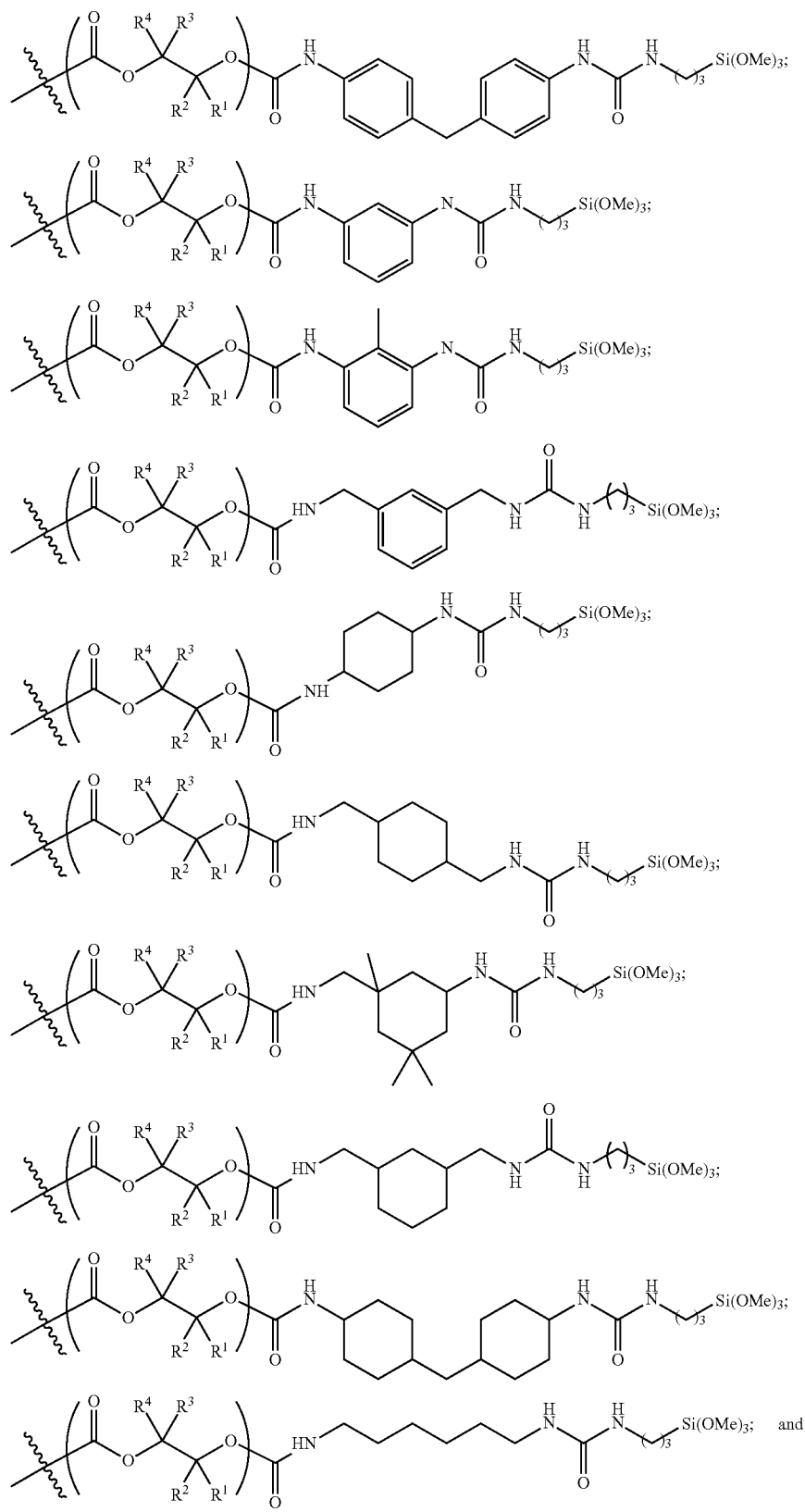

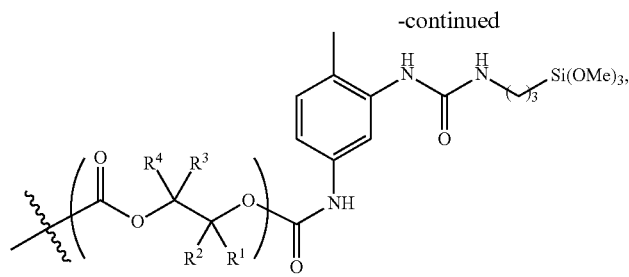

where $R^1$, $R^2$, $R^3$, and $R^4$ are as defined above and in the classes and subclasses herein.

I(c) Ether-Linked AEF Groups at Chain Ends

In certain other embodiments, Y' in structure II represents a ether-linked moiety containing an AEF group. Such compounds can be generated by alkylating the —OH end group of a polycarbonate chain with a suitable reagent such as an alkyl halide, an epoxide, or an alkyl sulfonate. In certain embodiments, such an ether has a formula IIc:

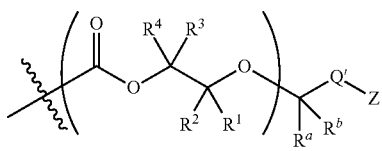

IIc wherein each of $R^1$, $R^2$, $R^3$, $R^4$, $R^a$, $R^b$, Q', and Z, is as defined above and described in classes and subclasses herein.

In certain embodiments, such an ether has a formula IIc-1:

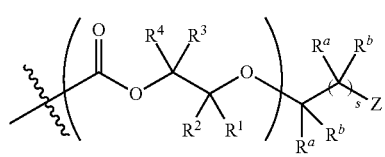

IIc-1 wherein each of $R^1$, $R^2$, $R^3$, $R^4$ $R^a$, $R^b$, s, and Z, is as defined above and described in classes and subclasses herein.

In certain embodiments, where Y' in structure II represents an ether-linked moiety, the Z group comprises a carboxylic acid. In certain embodiments, such an ether has a formula IIc-1a:

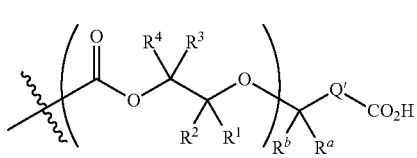

IIc-1a where $R^1$, $R^2$, $R^3$, $R^4$, $R^a$, $R^b$, and Q' are as defined above and in the classes and subclasses herein.

In certain embodiments, where Y' in structure II represents an ether-linked moiety, the Z group comprises a carboxylic acid, such an ether has a formula IIc-1b:

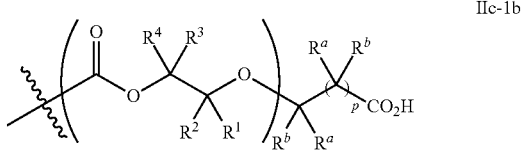

IIc-1b where each of $R^1$, $R^2$, $R^3$, $R^4$, $R^a$, $R^b$, and p is as defined above and in the classes and subclasses herein.

In certain embodiments, where Y' in structure II represents an ether-linked moiety, the Z group comprises a silicon-containing functional group. In certain embodiments, such an ether has a formula IIc-2a:

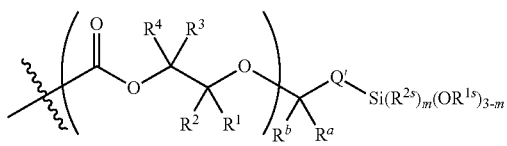

IIc-2a where $R^1$, $R^2$, $R^3$, $R^4$, $R^a$, $R^b$, and Q' are as defined above and in the classes and subclasses herein.

In certain embodiments, where Y' in structure II represents an ether-linked moiety, the Z group comprises a silicon-containing functional group, such an ether has a formula IIc-2b:

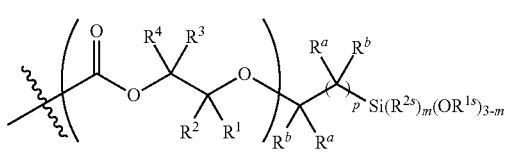

IIc-2b where each of $R^1$, $R^2$, $R^3$, $R^4$, $R^a$, $R^b$, and p is as defined above and in the classes and subclasses herein.

In certain embodiments, where Y' in structure II represents an ether-linked moiety, the Z group comprises a sulfonic acid. In certain embodiments, such an ether has a formula IIc-3a:

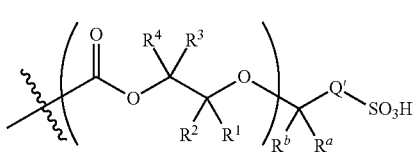

where $R^1$, $R^2$, $R^3$, $R^4$, $R^a$, $R^b$, and Q' are as defined above and in the classes and subclasses herein.

In certain embodiments, where Y' in structure II represents an ether-linked moiety, the Z group comprises a sulfonic acid, such an ether has a formula IIc-3b:

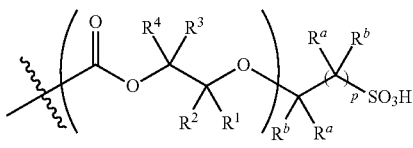

where each of $R^1$, $R^2$, $R^3$, $R^4$, $R^a$, $R^b$, and p is as defined above and in the classes and subclasses herein.

In certain embodiments, where Y' in structure II represents an ether-linked moiety, the Z group comprises a phosphine group. In certain embodiments, such an ether has a formula IIc-4a:

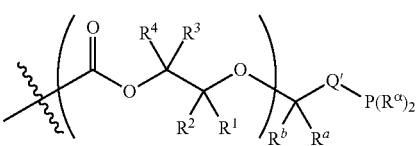

where $R^1$, $R^2$, $R^3$, $R^4$, $R^\alpha$, and Q' are as defined above and in the classes and subclasses herein.

In certain embodiments, where Y' in structure II represents an ether-linked moiety, the Z group comprises a phosphine moiety, such an ether has a formula IIc-4b:

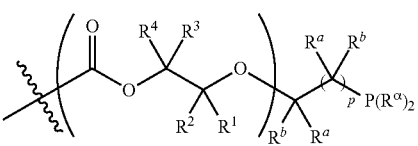

where each of $R^1$, $R^2$, $R^3$, $R^4$, $R^a$, $R^b$, $R^\alpha$, and p is as defined above and in the classes and subclasses herein.

In certain embodiments, where Y' in structure II represents an ether-linked moiety, the Z group comprises a phosphonium group. In certain embodiments, such an ether has a formula IIc-5a:

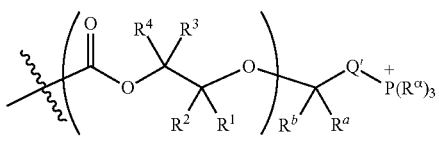

where $R^1$, $R^2$, $R^3$, $R^4$, $R^a$, $R^b$, $R^\alpha$, and Q' are as defined above and in the classes and subclasses herein.

In certain embodiments, where Y' in structure II represents an ether-linked moiety and the Z group comprises a phosphonium moiety, such an ether has a formula IIc-5b:

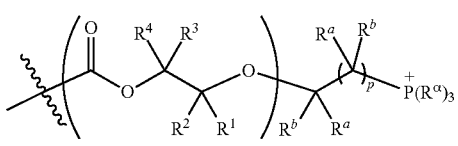

where each of $R^1$, $R^2$, $R^3$, $R^4$, $R^a$, $R^b$, $R^\alpha$, and p is as defined above and in the classes and subclasses herein.

In certain embodiments, where Y' in structure II represents an ether-linked moiety, the Z group comprises an amine group. In certain embodiments, such an ether has a formula IIc-6a:

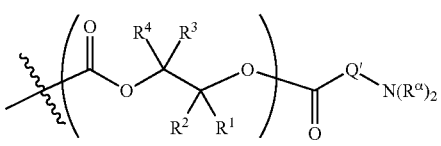

where $R^1$, $R^2$, $R^3$, $R^4$, $R^\alpha$, and Q' are as defined above and in the classes and subclasses herein.

In certain embodiments, where Y' in structure II represents an ether-linked moiety, the Z group comprises an amine moiety, such an ether has a formula IIb-6b:

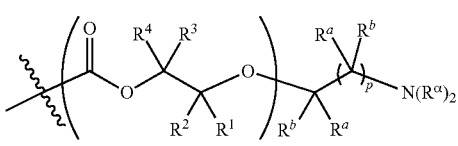

where each of $R^1$, $R^2$, $R^3$, $R^4$, $R^a$, $R^b$, $R^\alpha$, and p is as defined above and in the classes and subclasses herein.

In certain embodiments, where Y' in structure II represents an ether-linked moiety, the Z group comprises an ammonium group. In certain embodiments, such an ether has a formula IIc-7a:

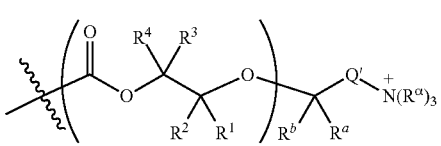

where $R^1$, $R^2$, $R^3$, $R^4$, $R^a$, $R^b$, $R^\alpha$, and Q' are as defined above and in the classes and subclasses herein, and In certain embodiments, where Y' in structure II represents an ether-linked moiety and the Z group comprises an ammonium moiety, such an ether has a formula IIc-7b:

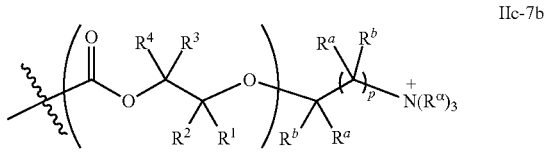

IIc-7b where each of $R^1$, $R^2$, $R^3$, $R^4$, $R^a$, $R^b$, $R^\alpha$, and p is as defined above and in the classes and subclasses herein.

I(d) Sulfonate Ester-Linked AEF Groups at Chain Ends

In certain other embodiments, Y' in structure II represents a sulfonate ester-linked moiety containing an AEF group. In certain embodiments, such a sulfonate ester has a formula IId:

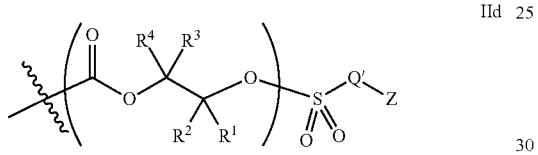

IId wherein each of, $R^1$, $R^2$, $R^3$, $R^4$, Z, and Q' is as defined above and described in classes and subclasses herein.

In certain embodiments, such a sulfonate ester has a formula IId-1:

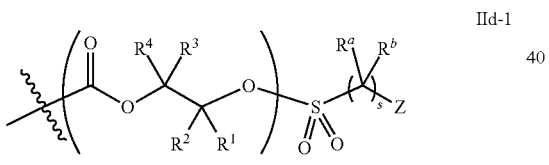

IId-1 wherein each of, $R^1$, $R^2$, $R^3$, $R^4$, $R^a$, $R^b$, s, and Z is as defined above and described in classes and subclasses herein.

In certain embodiments, where Y' in structure II represents a sulfonate ester-linked moiety, the Z group comprises a sulfonic acid. In certain embodiments, such a sulfonate ester has a formula IId-1a:

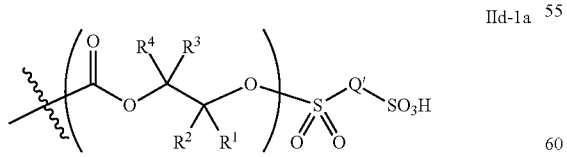

IId-1a where $R^1$, $R^2$, $R^3$, $R^4$, and Q' are as defined above and in the classes and subclasses herein.

In certain embodiments, where Y' in structure II represents a sulfonate ester-linked moiety, the Z group comprises a sulfonic acid, such a sulfonate ester has a formula IId-1b:

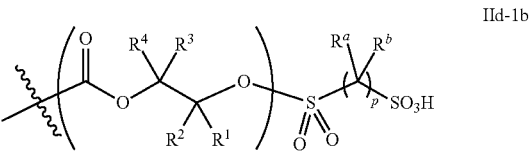

IId-1b where each of $R^1$, $R^2$, $R^3$, $R^4$, $R^a$, $R^b$, and p is as defined above and in the classes and subclasses herein.

In certain embodiments, where Y' in structure II represents a sulfonate ester-linked moiety, the Z group comprises a sulfonic acid, such a sulfonate ester has a formula IId-1c:

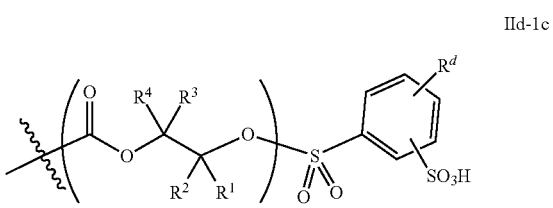

IId-1c where each of $R^1$, $R^2$, $R^3$, $R^4$, and $R^d$ is as defined above and in the classes and subclasses herein.

I(e) Silicon AEF Groups at Chain Ends

In certain other embodiments, Y' in structure II represents a silicon-containing moiety. Such compounds can be generated by silylating or siloxylating or the —OH end group of a polycarbonate chain with a suitable silylating or siloxylating reagent such as a silyl halide, a siloxy halide, or an orthosilicate. In certain embodiments, such a silicon-containing compound has a formula IIe:

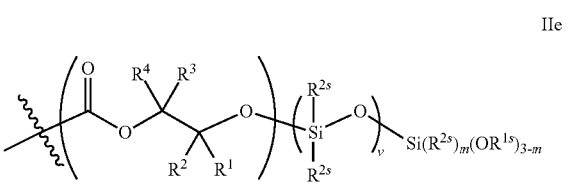

IIe wherein each of $R^1$, $R^2$, $R^3$, $R^4$, $R^{1s}$, $R^{2s}$, m, and v is as defined above and described in classes and subclasses herein.

In certain embodiments, such a silicon-terminated compound has a formula IIe-1:

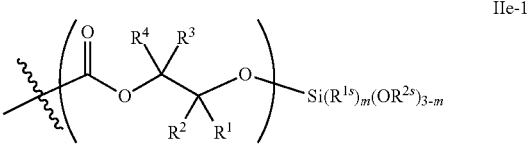

IIe-1 wherein each of $R^1$, $R^2$, $R^3$, $R^4$, $R^{1s}$, $R^{2s}$, and m is as defined above and described in classes and subclasses herein.

In certain embodiments, such a silicon-terminated compound has a formula IIe-2:

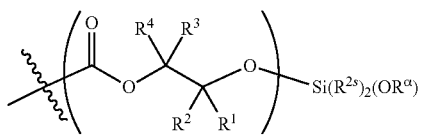

IIe-2 wherein each of $R^1$, $R^2$, $R^3$, $R^4$, $R^{2s}$, and $R^\alpha$ is as defined above and described in classes and subclasses herein.

In certain embodiments, such a silicon-terminated compound has a formula IIe-3:

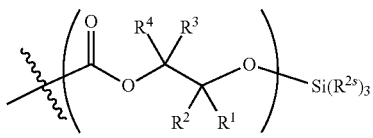

IIe-3 wherein each of $R^1$, $R^2$, $R^3$, $R^4$, and $R^{2s}$ is as defined above and described in classes and subclasses herein.

In certain embodiments, such a silicon-terminated compound has a formula IIe-4:

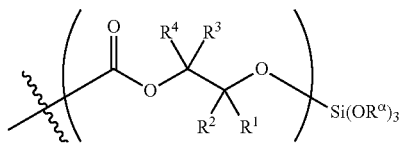

IIe-4 wherein each of $R^1$, $R^2$, $R^3$, $R^4$, and $R^\alpha$ is as defined above and described in classes and subclasses herein.

II) Aliphatic Polycarbonates with AEF Groups at Positions Other than the Chain Ends In the preceding embodiments, the AEF groups are disposed at the ends of the polycarbonate chains. In certain embodiments, an AEF group may be located at other locations in the polycarbonate chain. In particular, compositions wherein the AEF group is attached to a multivalent moiety from which two or more polycarbonate chains radiate, are encompassed by the present invention. In certain embodiments, such compounds conform to formula III:

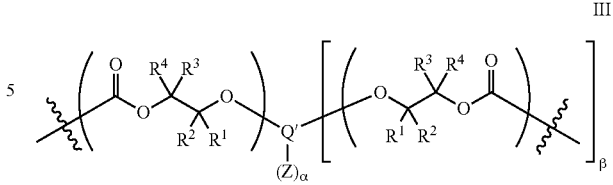

III wherein each of $R^1$, $R^2$, $R^3$, $R^4$, Q', Z, and a, is as defined above and described in classes and subclasses herein, and β is an integer from 1 to 5.

In certain embodiments, Y' groups may be derived from reagents capable of forming two or more linkages to hydroxyl groups of the polycarbonate chain. In certain embodiments, such a reagent has two hydroxyl-reactive groups. In certain embodiments, such polymers comprise groups having a formula III-a:

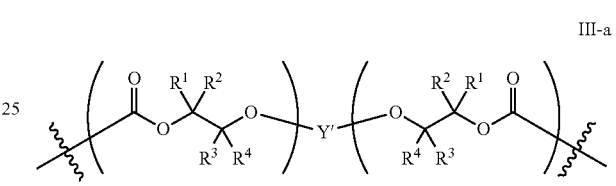

III-a wherein each of Y', $R^1$, $R^2$, $R^3$, and $R^4$ is as defined above and described in classes and subclasses herein.

In certain embodiments, such Y' groups may be derived from reagents capable of forming two or more ester bonds (such as di-anhydrides or diacid chlorides). In such cases two or more polymer chain ends may become linked by connection through one Y' group.

In certain embodiments, polycarbonate chain fragments of formula III-a are derived from reagents comprising two anhydride moieties in a single molecule. In certain embodiments, polycarbonate chain fragments of formula III-a are derived from reagents comprising two succinic-, maleic-, or phthalic-anhydride moieties in a single molecule. During reaction each such dianhydride may react with a chain end to form an ester bond and a free carboxylic acid. It will be appreciated that such reagents may be capable of reacting to produce two or more regioisomers. Compounds of the present invention specifically encompass all such regioisomers and mixtures of regioisomers. In certain embodiments, polycarbonate chain fragments of formula III-a are selected from the group consisting of:

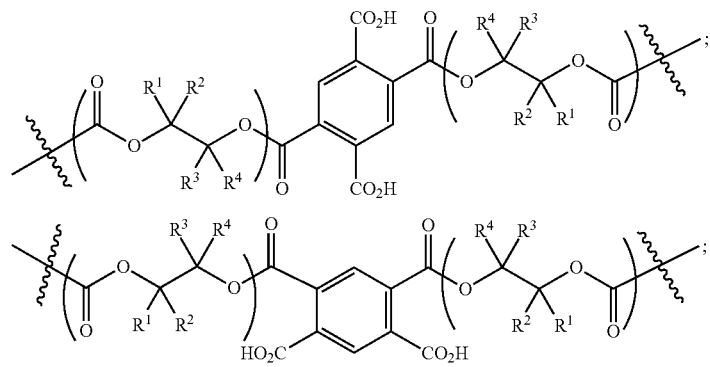

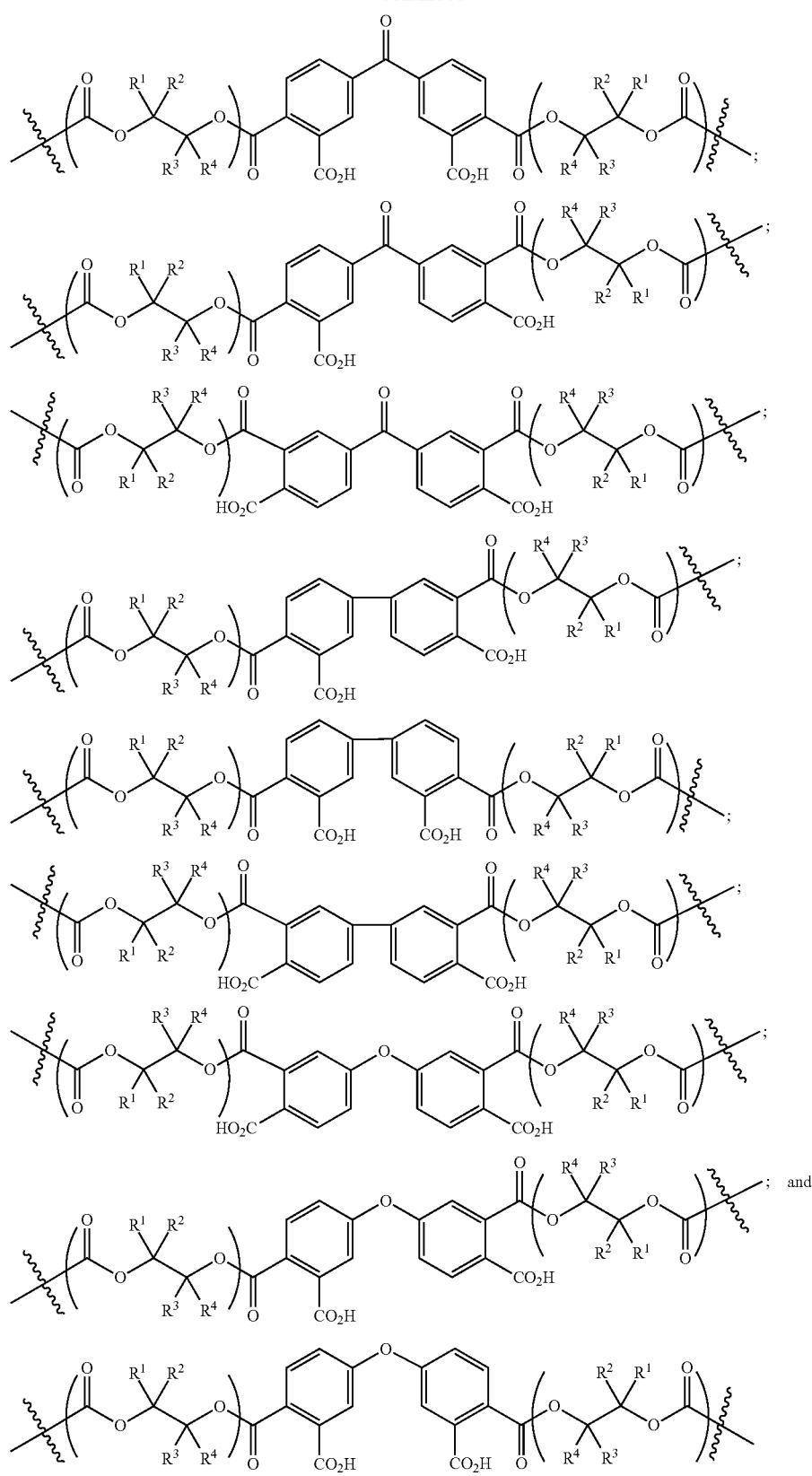

wherein each of $R^1$, $R^2$, $R^3$, and $R^4$ is as defined above and described in classes and subclasses herein.

In certain embodiments, compounds of structure III-a may comprise cyclic compounds formed by reaction of a dianhydride or diacid chloride with two chain ends in the same molecule.

In certain embodiments, polycarbonate chain fragments of formula III are derived from reagents comprising two isocyanate moieties in a single molecule. In certain embodiments, such compounds comprise structures III-b:

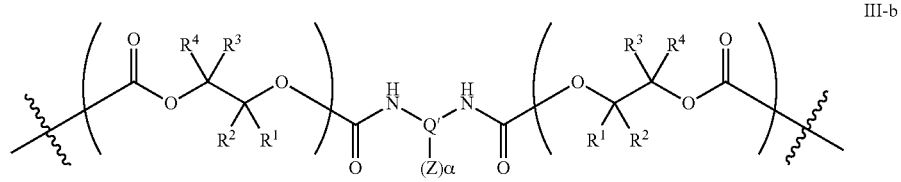

III-b wherein each of $R^1$, $R^2$, $R^3$, $R^4$, Q', Z, and α is as defined above and described in classes and subclasses herein.

III) Aliphatic Polycarbonates

The present section provides more detail on the structures and properties of the aliphatic polycarbonates represented in the compositions described above. The generic representations of the polycarbonate chains shown in each of the formulae above are to be understood to encompass all of the classes, subclasses and specific embodiments described in this section.

The aliphatic polycarbonates of the present invention can be broadly distinguished as lower molecular weight materials useful for formation of higher polymers via reaction with suitable cross-linking agents, and higher molecular weight materials with thermoplastic properties useful as molding resins, films, laminates and the like. The lower molecular weight polymers can be obtained by including a polyfunctional chain transfer agent (CTA) in the polymerization mixture, while higher molecular weight polymers do not necessarily (but may) incorporate such CTAs.

III(a) Aliphatic Polycarbonates Comprising Chain Transfer Agents

In certain embodiments, where aliphatic polycarbonate chains contain one or more fragments of formula II, each polymer chain contains, on average, at least two such fragments. In certain embodiments, such polymers have a structure P1:

wherein each of $R^1$, $R^2$, $R^3$, $R^4$, and is as defined above and described in classes and subclasses herein;

Y is, at each occurrence, independently selected from the group consisting of —H, Y', a urethane linkage, or a moiety having a reactive olefin such as an acrylate, a styrene, a vinyl ether, or a derivative of any of these where Y' is as defined above and described in classes and subclasses herein;

n is an integer from about 2 to about 100;

$$\boxed{Z}$$

is a multivalent moiety; and x and y are each independently from 0 to 6, where the sum of x and y is between 2 and 6.

In certain embodiments, such polycarbonate chains have two ends each terminated with a —Y group as defined hereinabove. In certain embodiments, —Y groups are the same at each occurrence and are derived by post-polymerization reactions on the hydroxy end groups of a polycarbonate chain. In other embodiments, one or more —Y groups are different from other —Y groups.

In certain embodiments, a multivalent moiety $$\boxed{Z}$$

embedded within the aliphatic polycarbonate chain is derived from a polyfunctional chain transfer agent having two or more sites from which epoxide/$CO_2$ copolymerization can occur. In certain embodiments, such copolymerizations are performed in the presence of polyfunctional chain

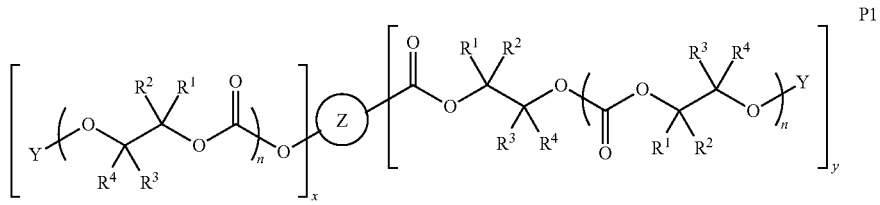

P1 transfer agents as exemplified in published PCT application WO/2010/028362 the entirety of which is incorporated herein by reference.

In certain embodiments, a polyfunctional chain transfer agent has a formula:

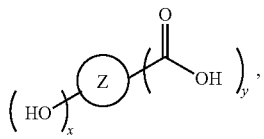

wherein each of

x and y is as defined above and described in classes and subclasses herein.

In certain embodiments, aliphatic polycarbonate chains in the inventive polymer compositions are derived from the copolymerization of one or more epoxides with carbon dioxide in the presence of such polyfunctional chain transfer agents as shown in Scheme 2:

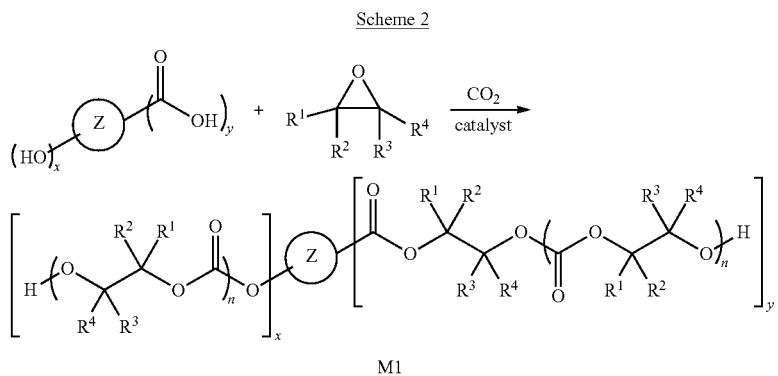

In certain embodiments, aliphatic polycarbonate chains in polymer compositions of the present invention comprise chains with the structure P2:

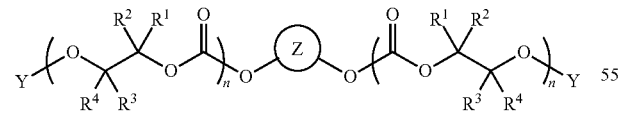

P2 wherein each of $R^1$, $R^2$, $R^3$, $R^4$,

and n is as defined above and described in classes and subclasses herein.

In certain embodiments where aliphatic polycarbonate chains have a structure P2

is derived from a dihydric alcohol. In such instances

represents the carbon-containing backbone of the dihydric alcohol, while the two oxygen atoms adjacent to

are derived from the —OH groups of the diol. For example, if the dihydric alcohol were derived from ethylene glycol, then

would be —CH$_2$CH$_2$— and P2 would have the following structure:

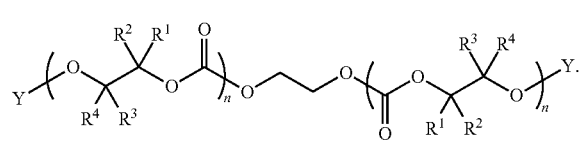

In certain embodiments, where

is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, where $$\boxed{Z}$$

is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, where $$\boxed{Z}$$

is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where $$\boxed{Z}$$

is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, $$\boxed{Z}$$

is derived from a polyhydric alcohol with more than two hydroxy groups. In certain embodiments, the aliphatic polycarbonate chains in polymer compositions of the present invention comprise aliphatic polycarbonate chains where the moiety $$\boxed{Z}$$

is derived from a triol. In certain embodiments, such aliphatic polycarbonate chains have the structure P3:

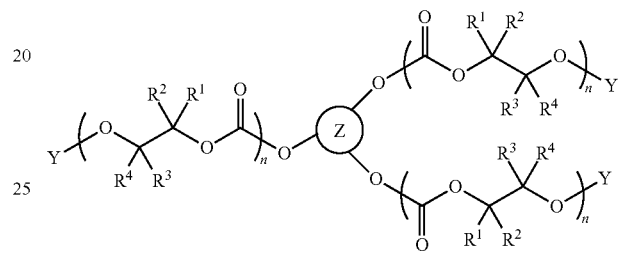

wherein each of $R^1$, $R^2$, $R^3$, $R^4$, $$\boxed{Z}$$

and n is as defined above and described in classes and subclasses herein.

In certain embodiments, where $$\boxed{Z}$$

is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds In certain embodiments, $$\boxed{Z}$$

is derived from an alkoxylated derivative of a trifunctional carboxylic acid or trifunctional hydroxy acid. In certain embodiments, alkoxylated polymeric derivatives comprise ethoxylated or propoxylated compounds.

In certain embodiments, where

is derived from a polymeric triol, the polymeric triol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the alkoxylated polymeric triols comprise ethoxylated or propoxylated compounds.

In certain embodiments,

is derived from a polyhydric alcohol with four hydroxy groups. In certain embodiments, aliphatic polycarbonate chains in polymer compositions of the present invention comprise aliphatic polycarbonate chains where the moiety

is derived from a tetraol. In certain embodiments, aliphatic polycarbonate chains in polymer compositions of the present invention comprise chains with the structure P4:

P4

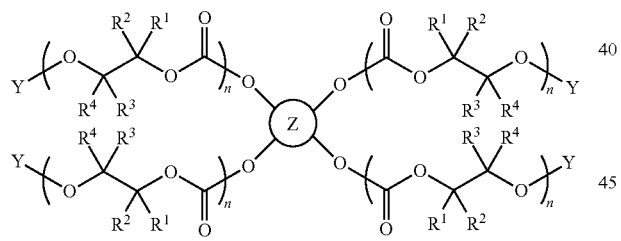

wherein each of $R^1$, $R^2$, $R^3$, $R^4$,

and n is as defined above and described in classes and subclasses herein.

In certain embodiments,

is derived from a polyhydric alcohol with more than four hydroxy groups. In certain embodiments, is derived from a polyhydric alcohol with six hydroxy groups. In certain embodiments, a polyhydric alcohol is dipentaerithrotol or an alkoxylated analog thereof. In certain embodiments, a polyhydric alcohol is sorbitol or an alkoxylated analog thereof. In certain embodiments, aliphatic polycarbonate chains in polymer compositions of the present invention comprise chains with the structure P5:

P5

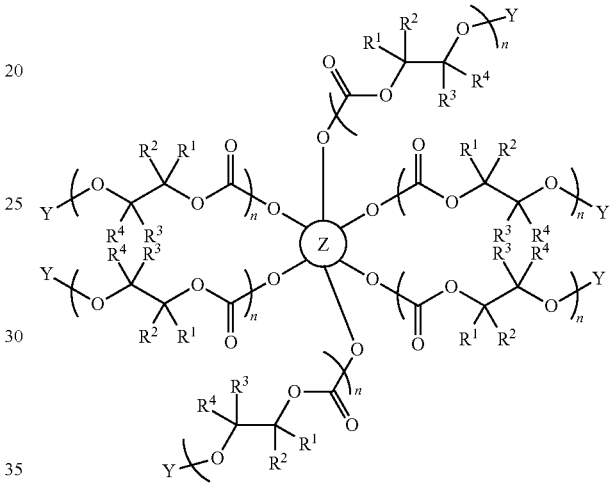

wherein each of $R^1$, $R^2$, $R^3$, $R^4$, Y,

and n is as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments,

is derived from a hydroxy acid. In certain embodiments, aliphatic polycarbonate chains in polymer compositions of the present invention comprise chains with the structure P6:

$$\text{Y}\left(\text{O}\underset{R^4\ R^3}{\overset{R^2\ R^1}{\text{C}}}\text{O-C}\right)_n\text{O-}\underset{}{\overset{O}{\text{Z}}}\text{-C-O}\underset{R^3\ R^4}{\overset{R^1\ R^2}{\text{C}}}\text{O-C-O}\underset{R^1\ R^2}{\overset{R^3\ R^4}{\text{C}}}\text{O}\left.\right)_n\text{Y} \quad P6$$

wherein each of $R^1$, $R^2$, $R^3$, $R^4$, Y, (Z)

and n is as defined above and described in classes and subclasses herein. In such instances, (Z)

represents the carbon-containing backbone of the hydroxy acid, while ester and carbonate linkages adjacent to (Z)

are derived from the —CO$_2$H group and the hydroxy group of the hydroxy acid. For example, if (Z)

were derived from 3-hydroxy propanoic acid, then (Z)

would be —CH$_2$CH$_2$— and P6 would have the following structure:

$$\text{Y}\left(\text{O}\underset{R^2\ R^1}{\overset{R^4\ R^3}{\text{C}}}\text{O-C-O}\right)_n\text{O}\underset{R^4\ R^3}{\overset{R^2\ R^1}{\text{C}}}\text{O-C-CH}_2\text{CH}_2\text{-C-O}\underset{R^1\ R^2}{\overset{R^3\ R^4}{\text{C}}}\text{O}\left(\right)_n\text{Y}.$$

In certain embodiments, (Z)

is derived from an optionally substituted C$_{2-40}$ hydroxy acid. In certain embodiments, (Z)

is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3 hydroxybutryic acid, L-3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a α-ω hydroxy acid. In certain embodiments, a hydroxy acid is selected from the group consisting of: of optionally substituted C$_{3-20}$ aliphatic α-ω hydroxy acids and oligomeric esters.

In certain embodiments, a hydroxy acid is selected from the group consisting of:

[Structures of various hydroxy acids shown]

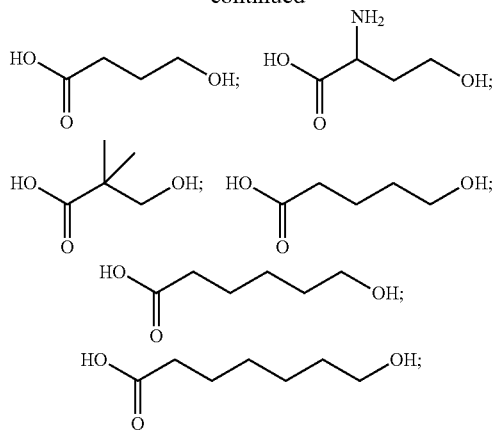
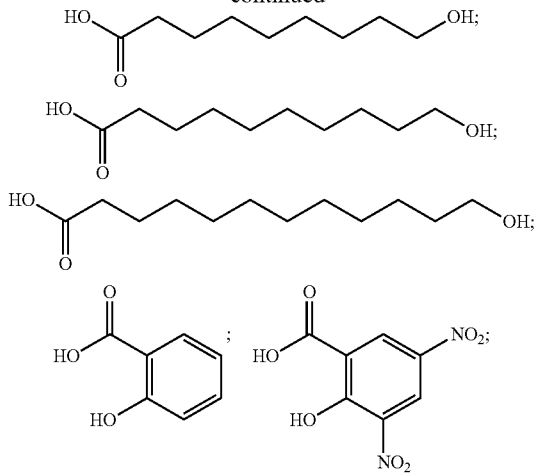
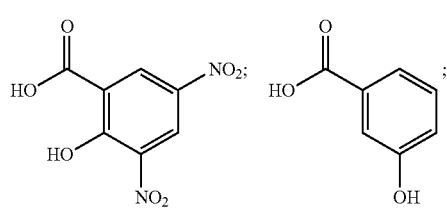
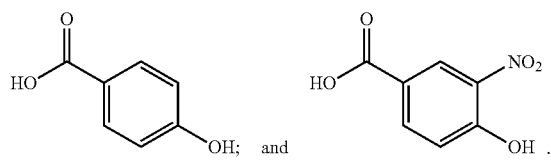

In certain embodiments,

is derived from a polycarboxylic acid. In certain embodiments, aliphatic polycarbonate chains in polymer compositions of the present invention comprise chains with the structure P7:

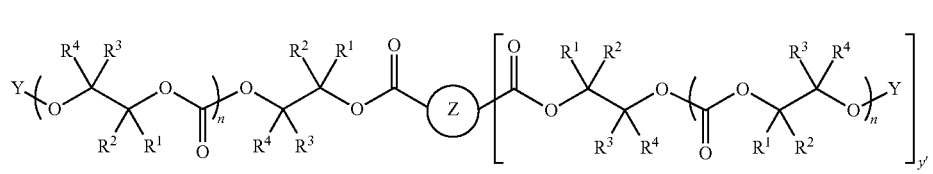

wherein each of $R^1$, $R^2$, $R^3$, $R^4$, Y,

and n is as defined above and described in classes and subclasses herein, and y' is from 1 to 5.

In embodiments where the aliphatic polycarbonate chains have a structure P7,

represents the carbon-containing backbone (or a bond in the case of oxalic acid) of a polycarboxylic acid, while ester groups adjacent to

are derived from —$CO_2H$ groups of a polycarboxylic acid. For example, if

were derived from succinic acid ($HO_2CCH_2CH_2CO_2H$), then would be —CH$_2$CH$_2$— and P7 would have the following structure:

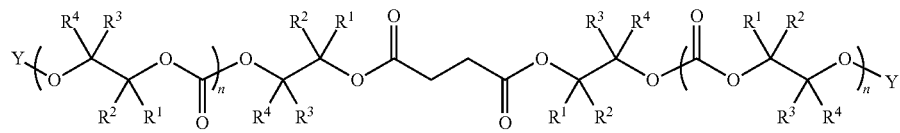

wherein each of R$^1$, R$^2$, R$^3$, R$^4$, Y, and n is as defined above and described in classes and subclasses herein.

In certain embodiments,

is derived from a dicarboxylic acid. In certain embodiments, aliphatic polycarbonate chains in polymer compositions of the present invention comprise chains with the structure P8:

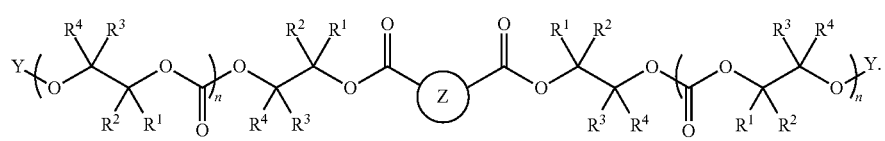

In certain embodiments,

is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments,

is selected from the group consisting of:

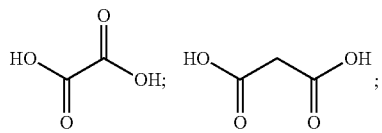

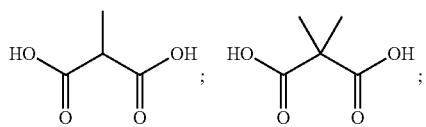

-continued

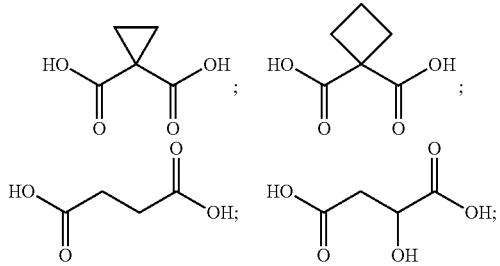

-continued

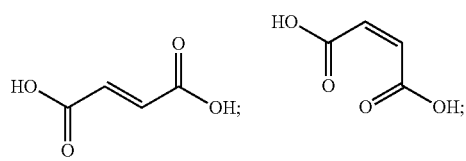

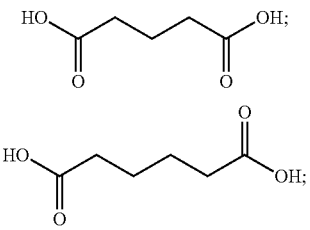

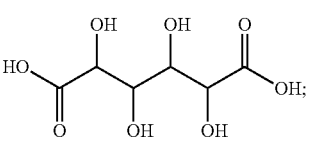

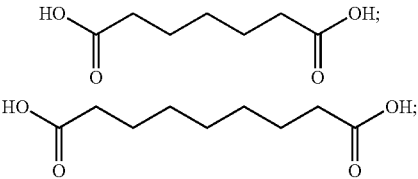

-continued

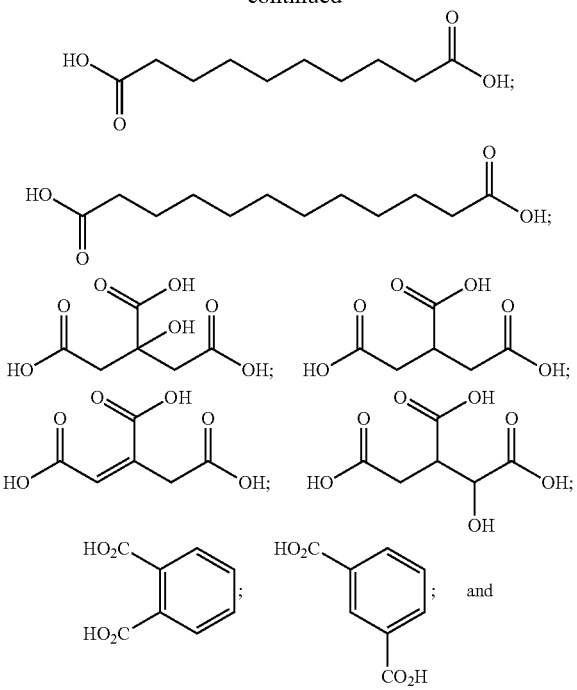

-continued

[structure of terephthalic acid]

In certain embodiments,

is derived from a phosphorous-containing molecule. In certain embodiments,

has a formula —P(O)(OR)$_k$— where each R is independently an optionally substituted C1-20 aliphatic group or an optionally substituted aryl group and k is 0, 1, or 2.

For example, if

were derived from phenyl phosphite (PhO—P(O)(OH)$_2$), then

would be —P(O)(OPh)- and P7 would have the following structure:

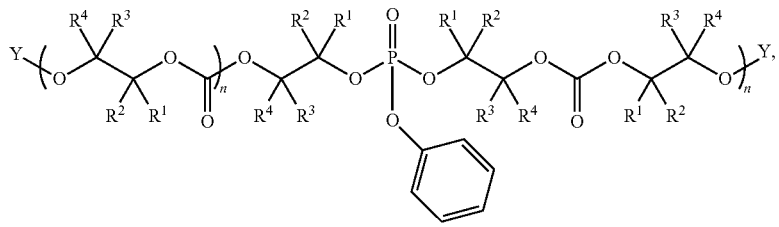

wherein each of R$^1$, R$^2$, R$^3$, R$^4$, Y, and n is as defined above and described in classes and subclasses herein.

In certain embodiments,

is derived from a phosphorous-containing molecule selected from the group consisting of:

[phosphorous acid structures]

-continued

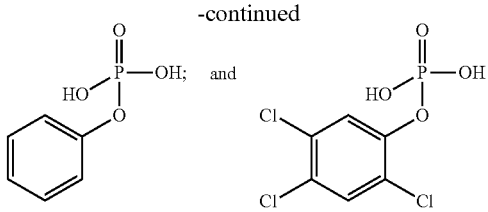

In certain embodiments, $$\boxed{Z}$$

has a formula —P(O)(R)$_k$— where R is an optionally substituted C$_{1-20}$ aliphatic group or an optionally substituted aryl group and k is 0, 1, or 2. In certain embodiments, $$\boxed{Z}$$

is derived from a phosphorous-containing molecule selected from the group consisting of:

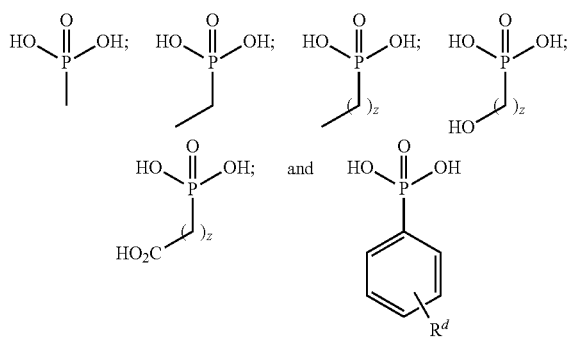

z = 2-30 where R$^d$ is as defined above.

In certain embodiments, $$\boxed{Z}$$

has a formula —PR— where R is an optionally substituted C$_{1-20}$ aliphatic group or an optionally substituted aryl group.

Depending on the intended application of the aliphatic polycarbonate, a widely varying proportion of the chain ends of the aliphatic polycarbonate compositions may comprise —Y' groups. In certain embodiments, a majority of the chain ends comprise Y' groups. In other embodiments, only a relatively small percentage of the polymer chain end comprise —Y' groups. The percentage of chain ends comprising Y' groups can be controlled by different strategies. In certain embodiments where the chain ends are modified by a post-polymerization reaction, the reagent that converts —OH chain ends to —OY' chain ends can be introduced as a limiting reagent to convert a desired fraction of the chain ends and leave the remaining chain ends unmodified. In another approach, a polymer composition with a higher than desired concentration of —OY' chain ends can be blended with a polymer composition having less than the desired concentration. In one embodiment of this approach a polymer composition comprising essentially all —OY' chain ends is blended with a desired amount of a polymer composition having no —OY' chain ends. It will be appreciated that these two approaches lead to different compositions of matter. For example, in the case of a using a limiting reagent to introduce 10% —OY' chain ends, the modified ends will be distributed randomly among the polymer chains and the composition will be a statistical mixture of all possible combinations of modified and unmodified chain ends—on the other hand, if a composition with 10% —OY' chain ends is made by blending fully functionalized polymer with unfunctionalized polymer, the composition will contain 1 part polymer with 100% —OY' chain ends and 9 parts polymer having no —OY' chain ends. In certain embodiments, the present invention encompasses compositions of matter comprising an aliphatic polycarbonate polymer where a fraction of the chain ends are modified with AEF groups characterized in that the distribution of AEF groups among individual chains is essentially random. In other embodiments, the present invention encompasses compositions of matter comprising an aliphatic polycarbonate polymer where a fraction of the chain ends are modified with AEF groups characterized in that the distribution of AEF groups among individual chains is controlled by physically blending two or more compositions.

In certain embodiments, compositions of the present invention containing aliphatic polycarbonate chains of any of formulae P1 through P8 are characterized in that a portion of the —Y groups comprise —Y' groups as defined hereinabove and a majority of the remaining —Y groups are —H. In certain embodiments, compositions of the present invention containing aliphatic polycarbonate chains of any of formulae P1 through P8 are characterized in that a portion of the —Y groups comprise —Y' groups as defined hereinabove and a majority of the remaining —Y groups are moieties having reactive double bonds such as acrylates, styrenes, or their derivatives.

In certain embodiments, where only a portion of end groups comprise —Y' groups, less than about 5% of the polymer chain ends comprise —Y' groups. In certain embodiments, between about 0.1% and about 1% of the polymer chain ends comprise —Y' groups. In certain embodiments, between about 1% and about 2% of the polymer chain ends comprise —Y' groups. In certain embodiments, between about 2.5% and about 5% of the polymer chain ends comprise —Y' groups. In certain embodiments, less than about 10% of the polymer chain ends comprise —Y' groups. In certain embodiments, between about 5% and about 10% of the polymer chain ends comprise —Y' groups. In certain embodiments, less than about 25% of the polymer chain ends comprise —Y' groups. In certain embodiments, between about 10% and about 25% of the polymer chain ends comprise —Y' groups. In certain embodiments, less than about 50% of the polymer chain ends comprise —Y' groups. In certain embodiments, between about 25% and about 50% of the polymer chain ends comprise —Y' groups.

In other embodiments, a majority of the polymer chain ends comprise —Y' groups while the remaining end groups are selected from those described above and defined in the classes and sub-classes herein. In certain embodiments where a majority of the polymer chain ends comprise —Y' groups, more than about 60% of the polymer chain ends comprise —Y' groups. In certain embodiments, more than about 70%, more than about 80%, more than about 85%, or more than about 90% of the polymer chain ends comprise —Y' groups. In certain embodiments, more than about 95%, more than about 97%, more than about 98% or more than about 99% of the polymer chain ends comprise —Y' groups. In certain embodiments, essentially all of the chain ends comprise —Y' groups.

In certain embodiments, polymer compositions of the present invention containing aliphatic polycarbonate chains of any of formulae P1 through P8 are characterized by a majority of the polymer chain ends comprising —OH groups. In certain embodiments, at least 75% of the polymer chain ends comprise —OH groups. In certain embodiments, at least 80% of the polymer chain ends comprise —OH groups. In certain embodiments, at least 85% of the polymer chain ends comprise —OH groups. In certain embodiments, at least 90% of the polymer chain ends comprise —OH groups. In certain embodiments, at least 95% of the polymer chain ends comprise —OH groups.

In certain embodiments, polymer compositions of the present invention containing aliphatic polycarbonate chains of any of formulae P1 through P8 are characterized by a majority of the polymer chain ends comprising —Y groups capable of participating in radical-promoted olefin polymerizations. In certain embodiments, at least 75% of the polymer chain ends comprise —Y groups capable of participating in radical-promoted olefin polymerizations. In certain embodiments, at least 80% of the polymer chain ends comprise —Y groups capable of participating in radical-promoted olefin polymerizations. In certain embodiments, at least 85% of the polymer chain ends comprise —Y groups capable of participating in radical-promoted olefin polymerizations. In certain embodiments, at least 90% of the polymer chain ends comprise —Y groups capable of participating in radical-promoted olefin polymerizations. In certain embodiments, at least 95% of the polymer chain ends comprise —Y groups capable of participating in radical-promoted olefin polymerizations.

In certain embodiments, aliphatic polycarbonate chains in provided polymer compositions are derived from the copolymerization of one or more epoxides with carbon dioxide in the presence of an initiator $Y'—(CO)_{q'}—OH$.

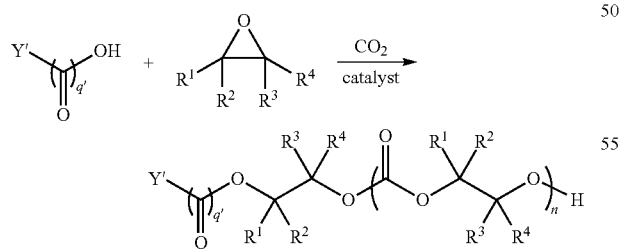

where each of $R^1$, $R^2$, $R^3$, $R^4$, Y', and n is as defined above and described in the classes and subclasses herein; and q' is 0 or 1.

In certain embodiments, such aliphatic polycarbonate chains are further functionalized after polymerization to introduce additional —Y' groups as described above:

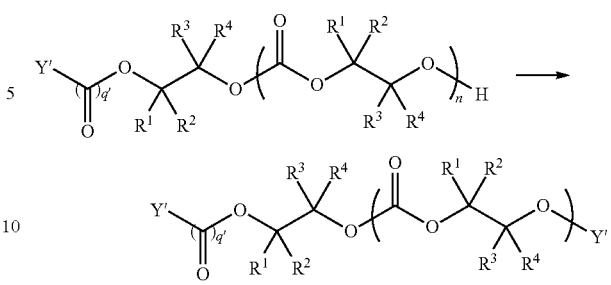

In certain embodiments, where polymer compositions of the present invention comprise aliphatic polycarbonate chains of any of formulae P1 through P8, Y is a Y' moiety selected from the group consisting of the moieties described hereinabove in the descriptions of compounds of formulae II through Ie.

In certain embodiments, each

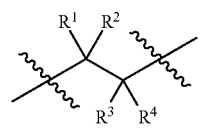

moiety in the structures hereinabove is independently selected from the group consisting of:

-continued

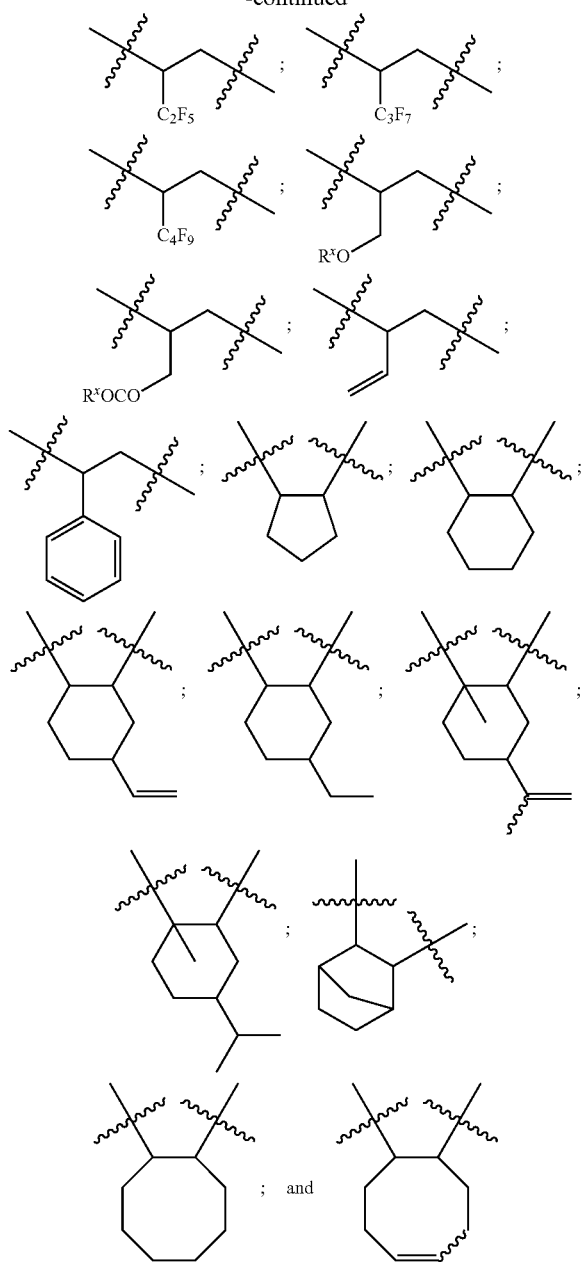

wherein each $R^x$ is independently an optionally substituted group selected from the group consisting of $C_{2-20}$ aliphatic, $C_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

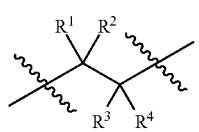

in the structures hereinabove is independently selected from the group consisting of:

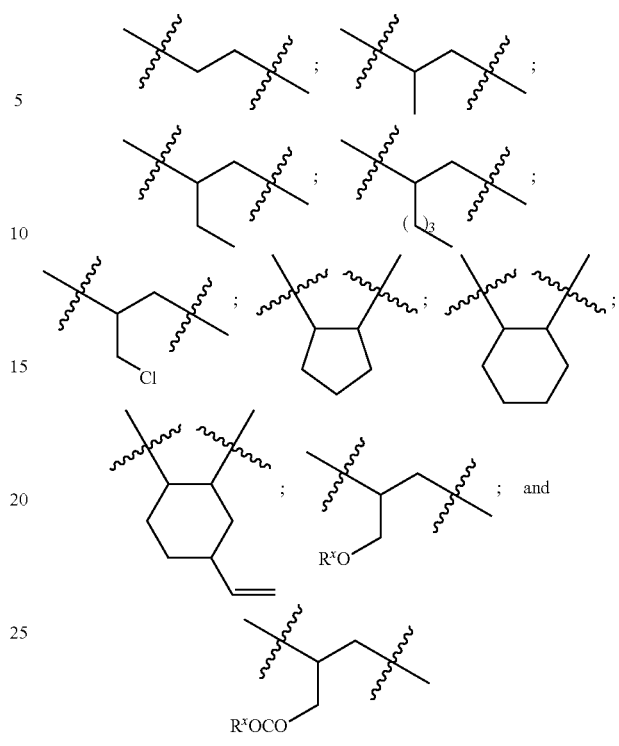

wherein $R^x$ is as defined above and described in classes and subclasses herein.

In certain embodiments, aliphatic polycarbonate chains comprise:

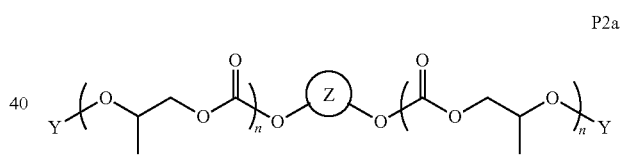
P2a wherein each of

—Y, and n is as defined above and described in classes and subclasses herein.

In certain embodiments, aliphatic polycarbonate chains comprise

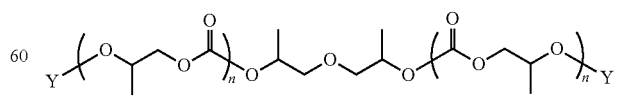
P2b wherein each of —Y and n is as defined above and described in classes and subclasses herein.

In certain embodiments, aliphatic polycarbonate chains comprise

P2b'

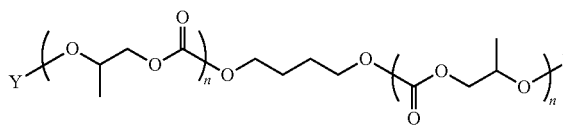

wherein each of —Y and n is as defined above and described in classes and subclasses herein.

In certain embodiments, aliphatic polycarbonate chains comprise

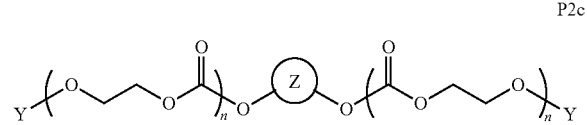

wherein each of —Y and n is as defined above and described in classes and subclasses herein.

In certain embodiments, aliphatic polycarbonate chains comprise

P2c

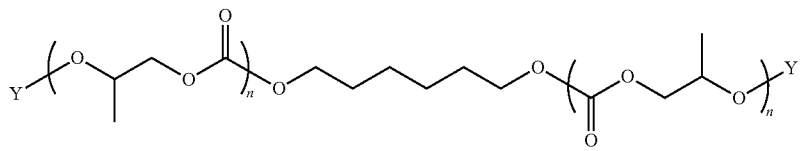

wherein each of

,

—Y, and n is as defined above and described in classes and subclasses herein.

In certain embodiments, aliphatic polycarbonate chains comprise

P2c'

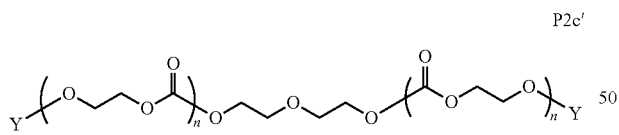

wherein each of —Y and n is as defined above and described in classes and subclasses herein.

In certain embodiments, aliphatic polycarbonate chains comprise

P2c''

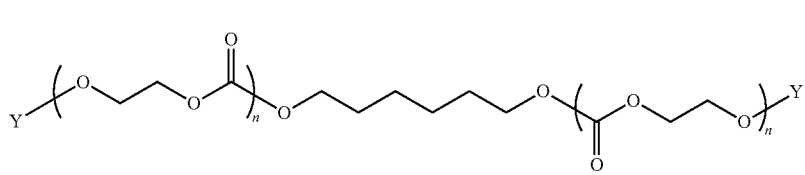

wherein each of —Y and n is as defined above and described in classes and subclasses herein.

In certain embodiments, aliphatic polycarbonate chains comprise

P2c'''

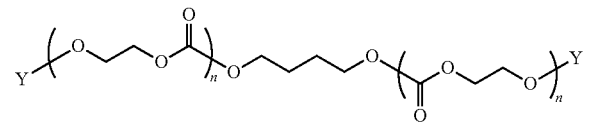

wherein each of —Y and n is as defined above and described in classes and subclasses herein.

In certain embodiments, aliphatic polycarbonate chains comprise

P2b''

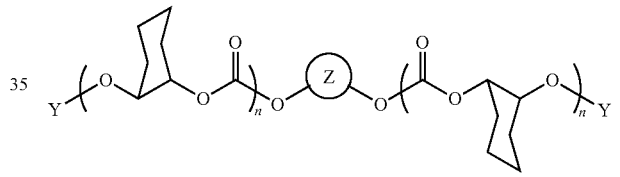

wherein each of —Y and n is as defined above and described in classes and subclasses herein.

In certain embodiments, aliphatic polycarbonate chains comprise

P2d

... [figure P2d]

wherein each of

,

—Y, and n is as defined above and described in classes and subclasses herein.

In certain embodiments, aliphatic polycarbonate chains comprise

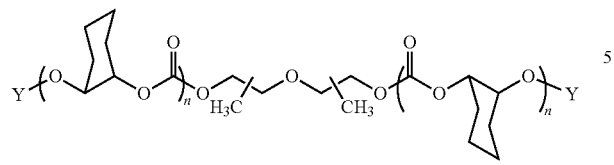
P2e wherein each of —Y and n are is as defined above and described in classes and subclasses herein.

In certain embodiments, aliphatic polycarbonate chains comprise

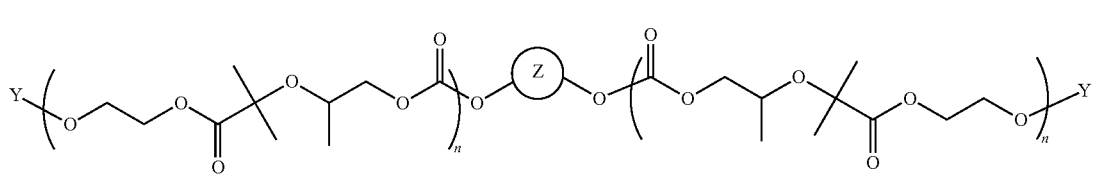
P2f wherein each of

,

—Y, and n is as defined above and described in classes and subclasses herein.

In certain embodiments, aliphatic polycarbonate chains comprise

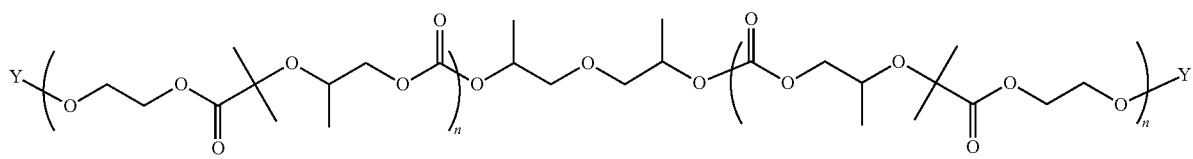
P2g wherein each of —Y and n is as defined above and described in classes and subclasses herein.

In certain embodiments, aliphatic polycarbonate chains comprise

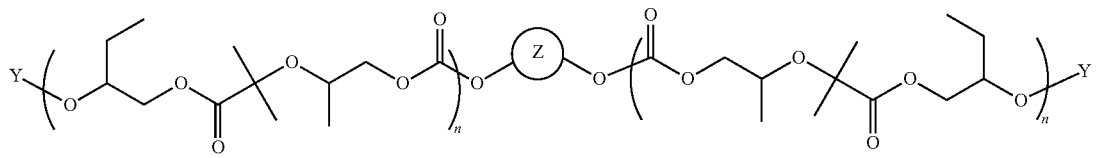
P2h wherein each of

,

—Y and n is as defined above and described in classes and subclasses herein.

In certain embodiments, aliphatic polycarbonate chains comprise

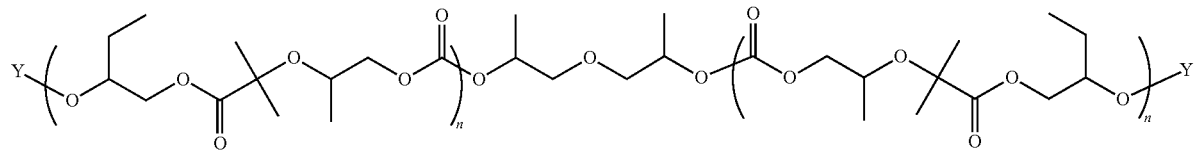

P2i wherein each of —Y and n is as defined above and described in classes and subclasses herein.

In certain embodiments, aliphatic polycarbonate chains comprise

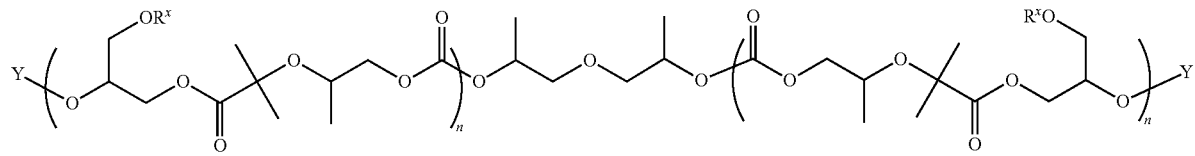

P2j wherein each of (Z),

—Y, $R^x$, and n is as defined above and described in classes and subclasses herein.

In certain embodiments, aliphatic polycarbonate chains comprise

P2k wherein each of —Y, $R^x$, and n is as defined above and described in classes and subclasses herein.

In certain embodiments, aliphatic polycarbonate chains comprise

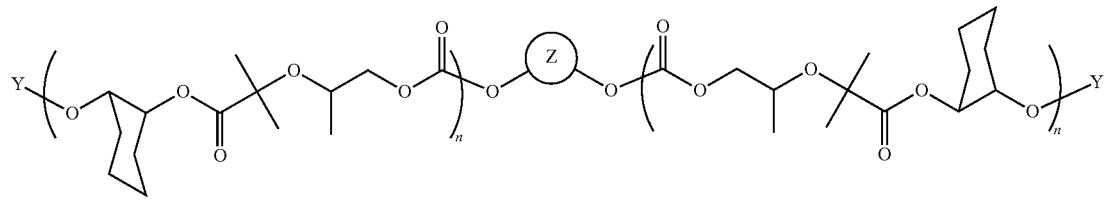

P2l wherein each of (Z),

—Y, and n is as defined above and described in classes and subclasses herein.

In certain embodiments, aliphatic polycarbonate chains comprise

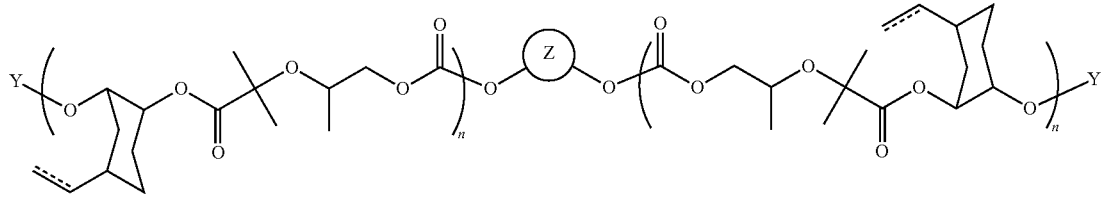

P2l-a wherein each of

,

—Y, and n are is as defined above and described in classes and subclasses herein; and ===== each independently represents a single or double bond.

In certain embodiments, aliphatic polycarbonate chains comprise

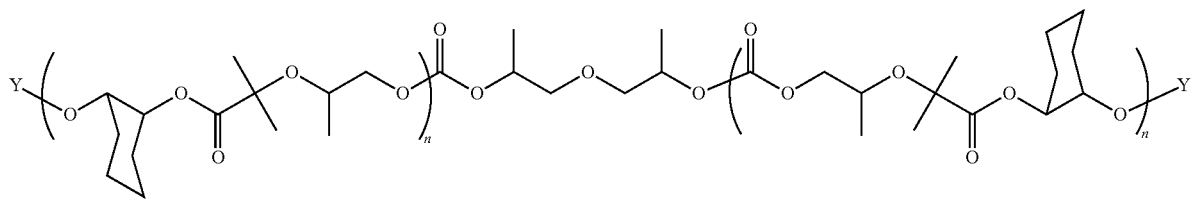

P2m wherein each of —Y and n is as defined above and described in classes and subclasses herein.

In certain embodiments, aliphatic polycarbonate chains comprise

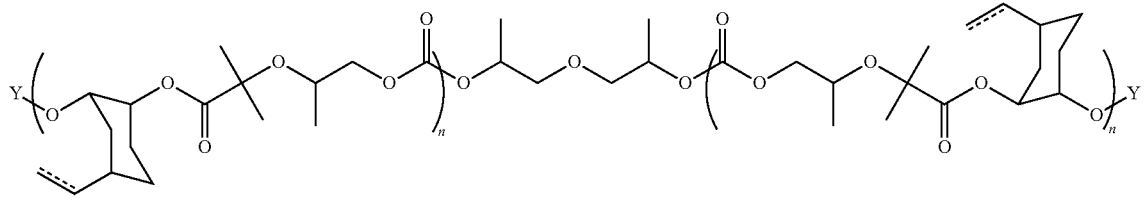

P2m-a wherein each of —Y, =====, and n is as defined above and described in classes and subclasses herein.

In certain embodiments, aliphatic polycarbonate chains comprise

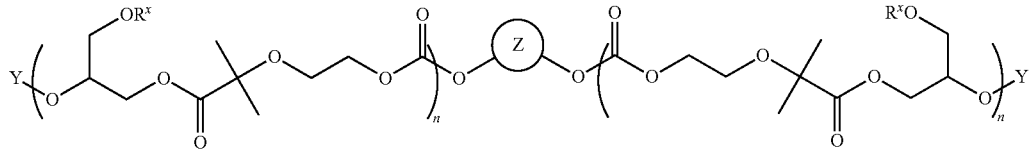

P2n wherein each of

—Y, $R^x$, and n is as defined above and described in classes and subclasses herein.

In certain embodiments, aliphatic polycarbonate chains comprise

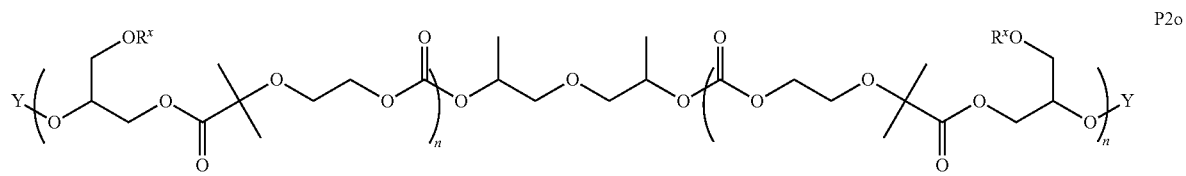

wherein each of —Y, $R^x$, and n is as defined above and described in classes and subclasses herein.

In certain embodiments, aliphatic polycarbonate chains comprise

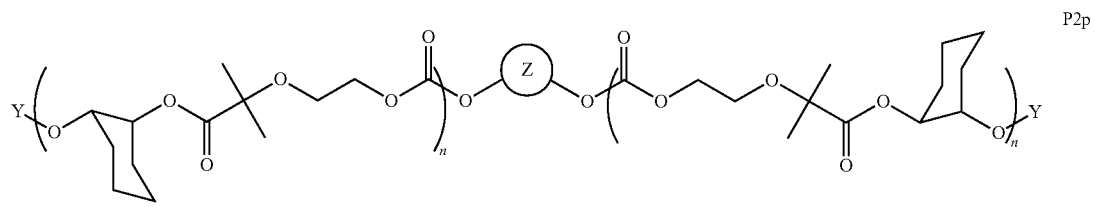

wherein each of

—Y, and n is as defined above and described in classes and subclasses herein.

In certain embodiments, aliphatic polycarbonate chains comprise

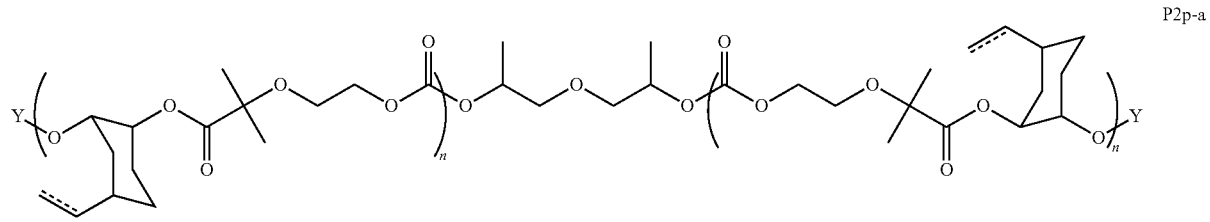

wherein each of —Y, ===== and n is as defined above and described in classes and subclasses herein.

In certain embodiments, aliphatic polycarbonate chains comprise

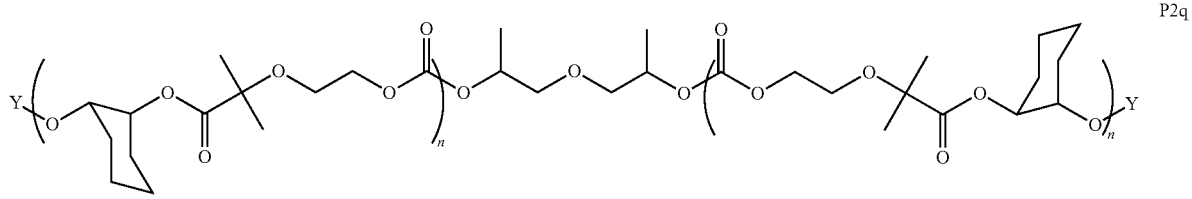
P2q wherein each of —Y and n is as defined above and described in classes and subclasses herein.

In certain embodiments, aliphatic polycarbonate chains comprise

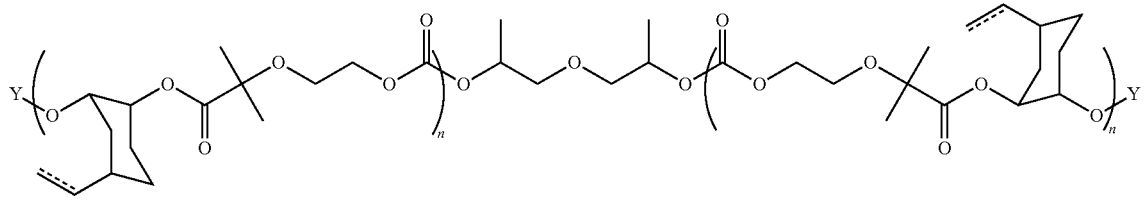
P2q-a wherein each of —Y, =====, and n is as defined above and described in classes and subclasses herein.

In certain embodiments, aliphatic polycarbonate chains comprise

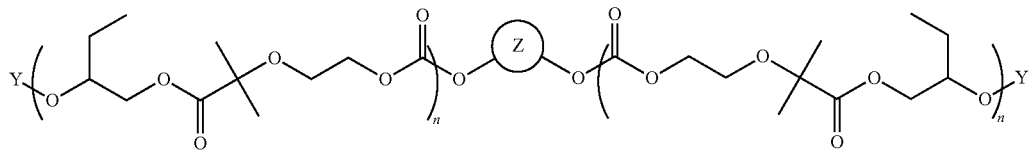
P2r wherein each of

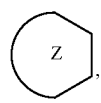

—Y and n is as defined above and described in classes and subclasses herein.

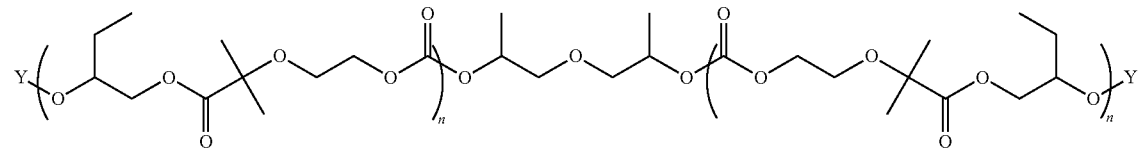
P2s

In certain embodiments, in polycarbonates of structures P2a, P2c, P2d, P2f, P2h, P2j, P2l, P2l-a, P2n, P2p, and P2r,

is selected from the group consisting of: ethylene glycol; diethylene glycol, triethylene glycol, 1,3 propane diol; 1,4 butane diol, hexylene glycol, propylene glycol, dipropylene glycol, tripopylene glycol, and alkoxylated derivatives of any of these.

In certain embodiments, aliphatic polycarbonate chains comprise
wherein each of —Y and n is as defined above and described in classes and subclasses herein.

In certain embodiments, in polycarbonates of formulae P2a through P2s, a portion of the —Y groups comprise —Y' groups selected from the group consisting of:

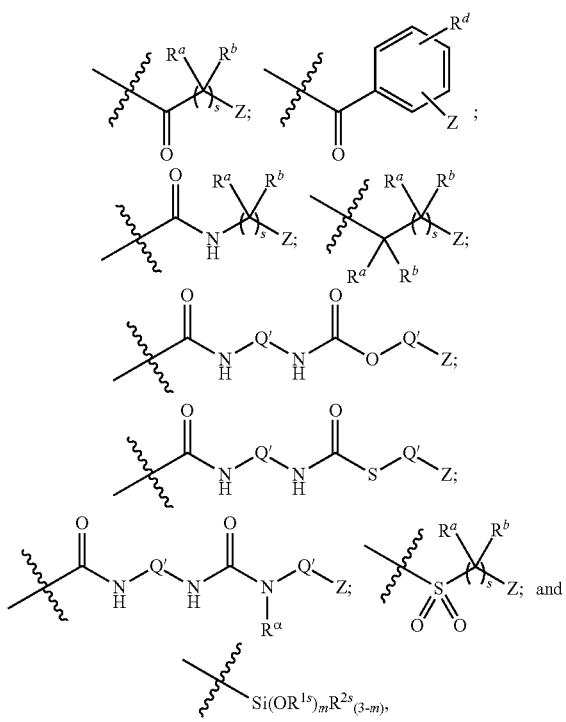

where each of $R^a$, $R^b$, Z, s, Q', $R^\alpha$, $R^{1s}$, $R^{2s}$, and m is as defined above and described in classes and subclasses herein.

In certain embodiments, in polycarbonates of formulae P2a through P2s, a portion of the —Y groups comprise —Y' groups selected from the group consisting of:

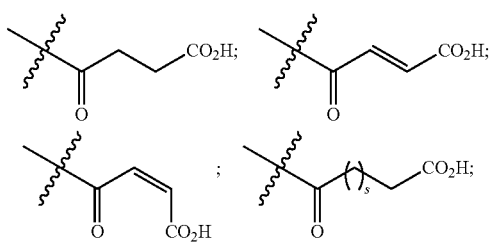

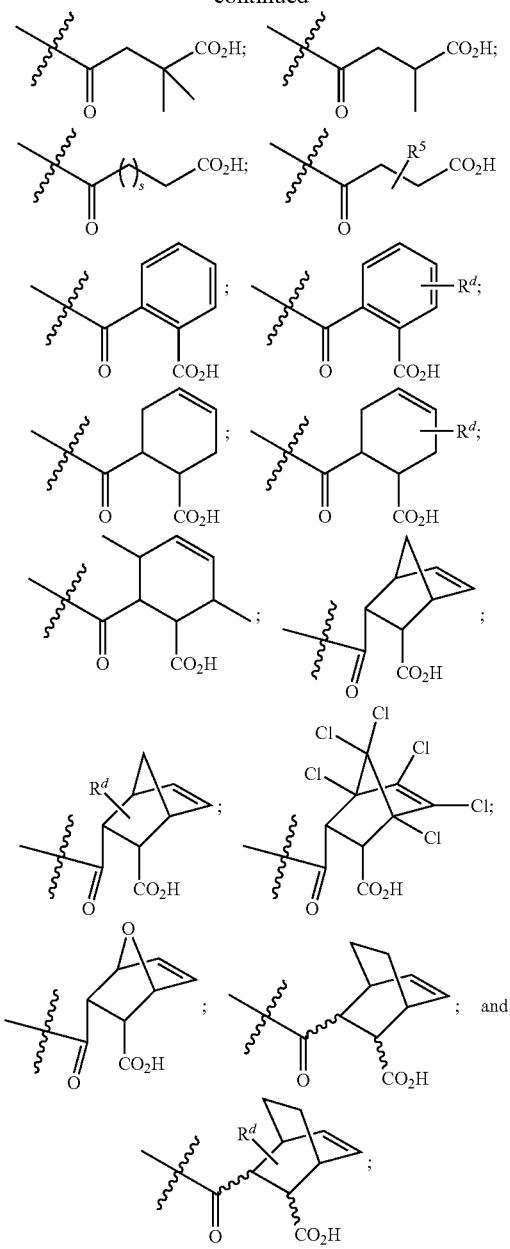

wherein each of s and $R^d$ is as defined above and described in classes and subclasses herein;

In certain embodiments, in polycarbonates of formulae P2a through P2s, a portion of the —Y groups comprise —Y' groups selected from the group consisting of:

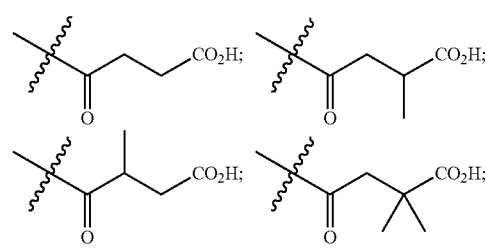

-continued

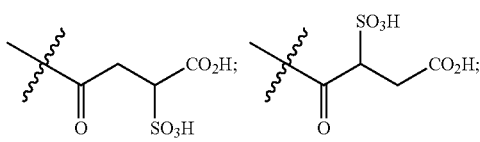

and combinations of any two or more of these

In certain embodiments, in polycarbonates of formulae P2a through P2s, a portion of the —Y groups comprise —Y' groups selected from the group consisting of:

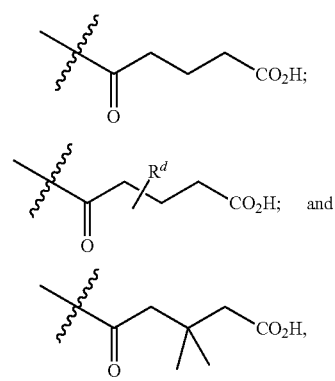

wherein each $R^d$, is as defined above and described in classes and subclasses herein.

In certain embodiments, in polycarbonates of formulae P2a through P2s, a portion of the —Y groups comprise —Y' groups selected from the group consisting of:

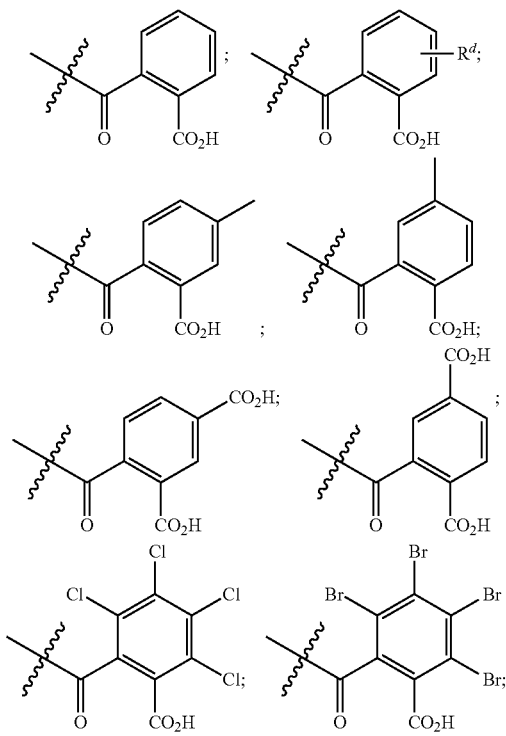

-continued

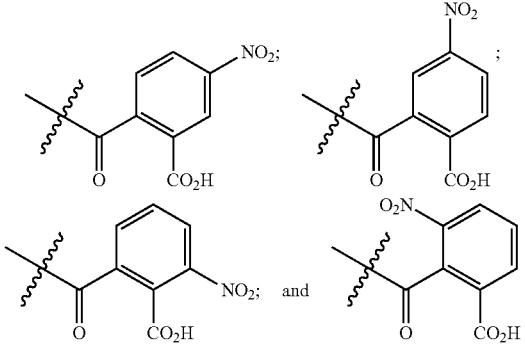

wherein each $R^d$, is as defined above and described in classes and subclasses herein.

III(b) Aliphatic Polycarbonates Comprising Monofunctional Polymerization Initiators Structures P1 through P8 are representative of aliphatic polycarbonates that may be derived from the copolymerization of carbon dioxide and epoxide(s) in the presence of a chain transfer agent. Suitable epoxides include one or more aliphatic epoxides such as propylene oxide, ethylene oxide, butylene oxide, cyclohexene oxide, 3-vinyl cyclohexene oxide, 3-ethyl cyclohexene oxide, and esters or ethers of glycidol. It is to be understood that many variations on these compounds are possible including the use of additional or different epoxides, use of different chain transfer agents, and the introduction of different Y groups. Such variations will be apparent to one skilled in the art based on the disclosure and teachings of the present application and are specifically encompassed within the scope of the present invention.

In other embodiments, the aliphatic polycarbonates comprising AEF groups may be derived from epoxide $CO_2$ copolymerizations in which multifunctional chain transfer agents are not present (or are present in only small amounts). This is particularly true of higher molecular weight polymers (for example aliphatic polycarbonates with an Mn greater than about 40,000 g/mol. In these embodiments, the polymer compositions comprise polycarbonate chains that do not contain an embedded multifunctional moiety (such as

in structures P1 through P8).

In certain embodiments, aliphatic polycarbonate chains of the present invention comprise compounds of formula Q1:

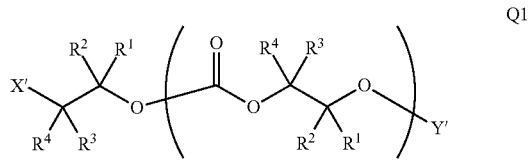

Q1 wherein each of $R^1$, $R^2$, $R^3$, $R^4$, Y' and n is as defined above and described in classes and subclasses herein, and X' represents the bound form of a nucleophilic polymerization initiator capable of ring-opening an epoxide.

In certain embodiments, aliphatic polycarbonate chains in the inventive polymer compositions are derived from the copolymerization of one or more epoxides with carbon dioxide in the presence of a catalyst (for example a metal complex of formula $L_nM\text{-}X'$, where $L_n$ represents one or more coordinated ligands, and $X'$ is a polymerization iniator, and optionally a monofunctional chain transfer agent of formula (H—X') as shown in Scheme 3:

Scheme 3

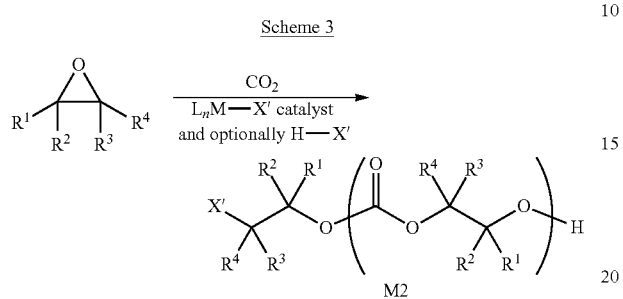

In certain embodiments, X' is selected from the group consisting of $C_{1-20}$ acyloxy, halogen, alkoxy, nitrate, azide, optionally substituted phenoxy, nitrophenoxy and sulfonate. In certain embodiments, X' may comprise an AEF, or a precursor to an AEF.

In certain embodiments, aliphatic polycarbonate chains of the present invention comprise

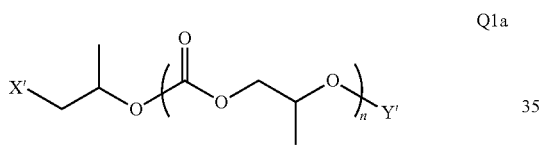

Q1a wherein each of Y', X' and n is as defined above and described in classes and subclasses herein.

In certain embodiments, aliphatic polycarbonate chains comprise

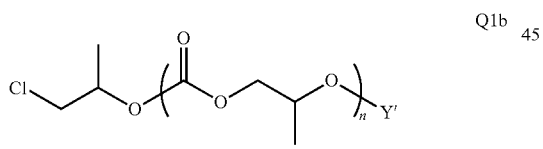

Q1b wherein Y' and n are as defined above and described in classes and subclasses herein.

In certain embodiments, the aliphatic polycarbonate chains comprise

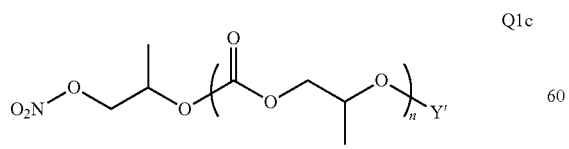

Q1c wherein Y' and n are as defined above and described in classes and subclasses herein.

In certain embodiments, the aliphatic polycarbonate chains comprise

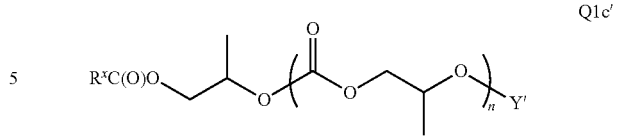

Q1c' wherein each of Y', $R^x$ and n is as defined above and described in classes and subclasses herein.

In certain embodiments, the aliphatic polycarbonate chains comprise

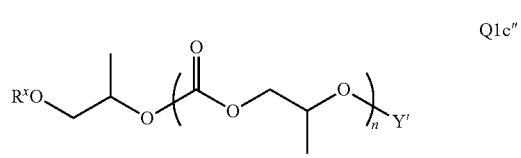

Q1c″ wherein each of Y', $R^x$ and n is as defined above and described in classes and subclasses herein.

In certain embodiments, the aliphatic polycarbonate chains comprise

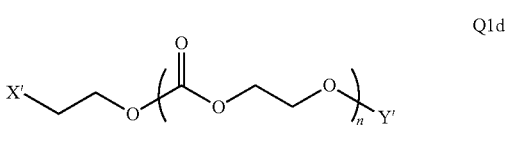

Q1d wherein each of Y', X', and n is as defined above and described in classes and subclasses herein.

In certain embodiments, aliphatic polycarbonate chains comprise

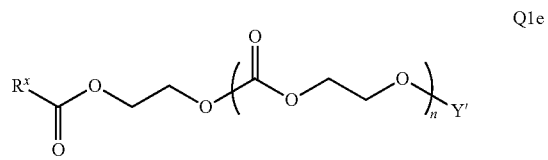

Q1e wherein each of Y', $R^x$, and n is as defined above and described in classes and subclasses herein.

In certain embodiments, aliphatic polycarbonate chains comprise

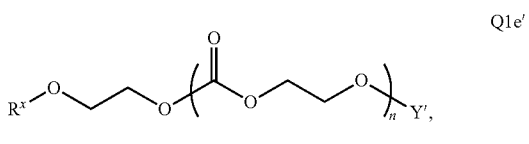

Q1e' wherein each of Y', $R^x$, and n is as defined above and described in classes and subclasses herein.

In certain embodiments, aliphatic polycarbonate chains comprise

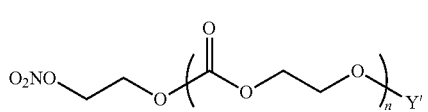
Q1f wherein each of —Y' and n is as defined above and described in classes and subclasses herein.

In certain embodiments, the aliphatic polycarbonate chains comprise

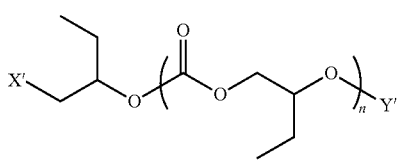
Q1g wherein each of Y', X', and n is as defined above and described in classes and subclasses herein.

In certain embodiments, aliphatic polycarbonate chains comprise

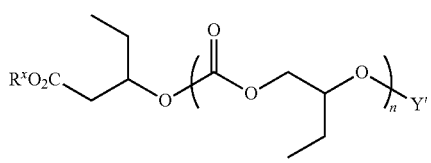
Q1h wherein each of -Q and n is as defined above and described in classes and subclasses herein.

In certain embodiments, aliphatic polycarbonate chains comprise

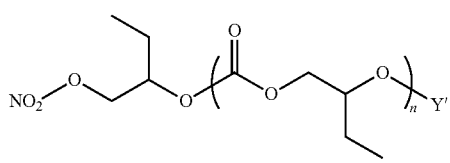
Q1i wherein each of —Y' and n is as defined above and described in classes and subclasses herein.

In certain embodiments, aliphatic polycarbonate chains comprise

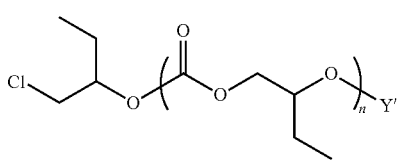
Q1i' wherein each of —Y' and n is as defined above and described in classes and subclasses herein.

In certain embodiments, aliphatic polycarbonate chains comprise

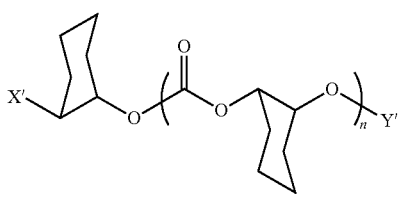
Q1j wherein each of Y', X', and n is as defined above and described in classes and subclasses herein.

In certain embodiments, aliphatic polycarbonate chains comprise

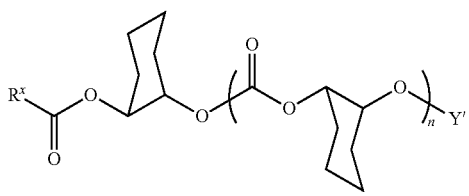
Q1k wherein each of —Y', $R^x$, and n is as defined above and described in classes and subclasses herein.

In certain embodiments, aliphatic polycarbonate chains comprise

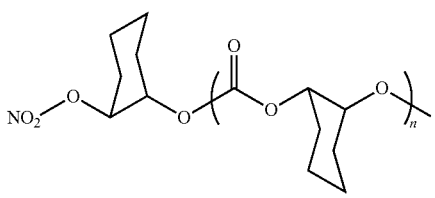
Q1l wherein each of —Y', and n is as defined above and described in classes and subclasses herein.

In certain embodiments, aliphatic polycarbonate chains comprise

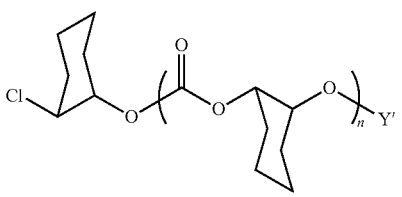
Q1l' wherein each of —Y', and n is as defined above and described in classes and subclasses herein.

In certain embodiments, aliphatic polycarbonate chains comprise

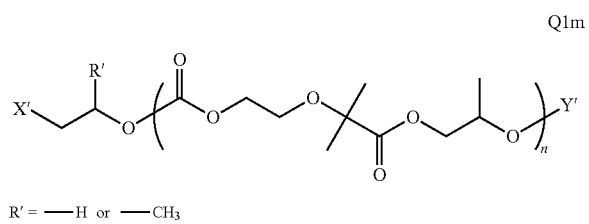

Q1m

R' = —H or —CH₃ wherein each of Y', X', and n is as defined above and described in classes and subclasses herein.

In certain embodiments, the aliphatic polycarbonate chains comprise

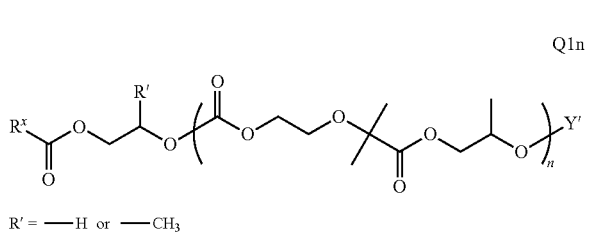

Q1n

R' = —H or —CH₃ wherein each of Y' and n is as defined above and described in classes and subclasses herein.

In certain embodiments, the aliphatic polycarbonate chains comprise

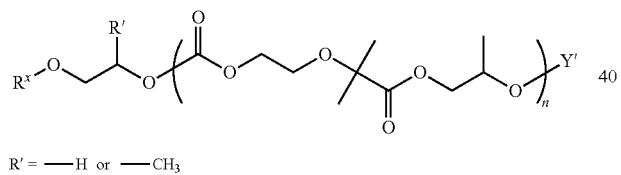

Q1n'

R' = —H or —CH₃ wherein each of Y' and n is as defined above and described in classes and subclasses herein.

In certain embodiments, the aliphatic polycarbonate chains comprise

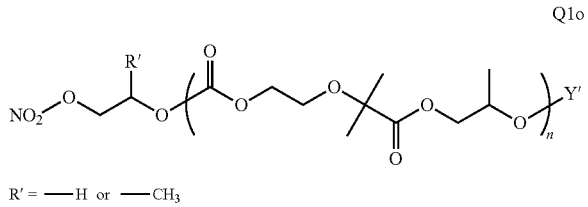

Q1o

R' = —H or —CH₃ wherein each of Y' and n is as defined above and described in classes and subclasses herein.

In certain embodiments, the aliphatic polycarbonate chains comprise

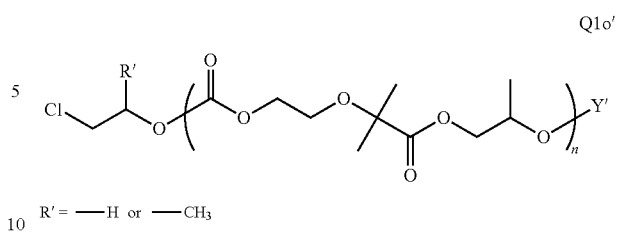

Q1o'

R' = —H or —CH₃

In certain embodiments, the aliphatic polycarbonate chains comprise

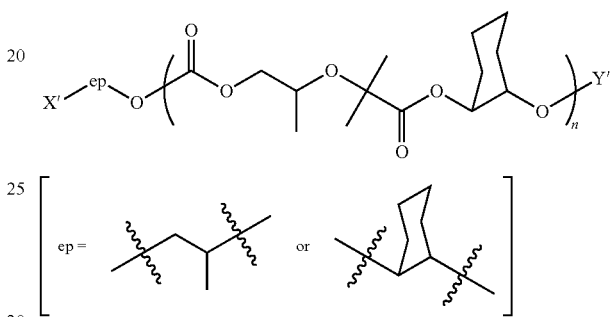

Q1q wherein each of X', Y', and n is as defined above and described in classes and subclasses herein.

In certain embodiments, aliphatic polycarbonate chains comprise

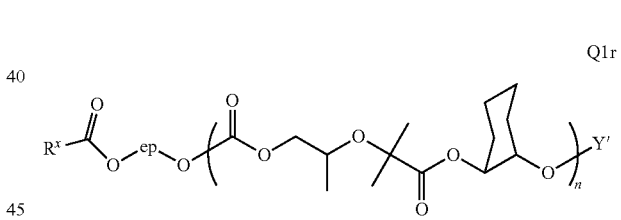

Q1r wherein each of —Y', $R^x$, -ep-, and n is as defined above and described in classes and subclasses herein.

In certain embodiments, aliphatic polycarbonate chains comprise

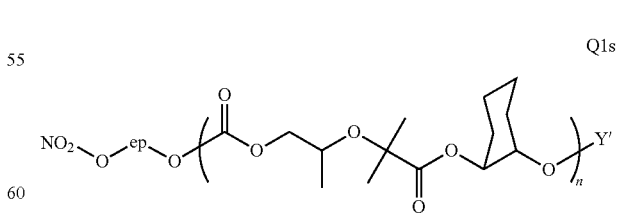

Q1s wherein each of —Y', -ep-, and n is as defined above and described in classes and subclasses herein.

In certain embodiments, aliphatic polycarbonate chains comprise

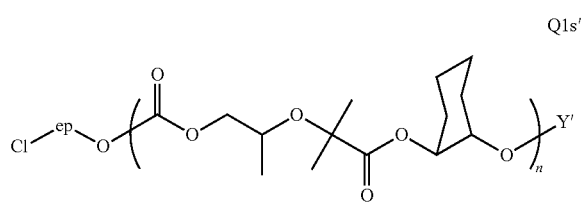

Q1s' wherein each of —Y', -ep-, and n is as defined above and described in classes and subclasses herein.

In certain embodiments, aliphatic polycarbonate chains comprise

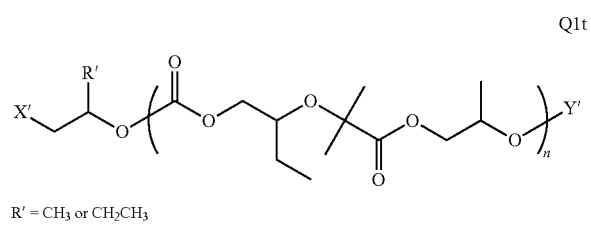

Q1t

R' = CH₃ or CH₂CH₃ wherein each of Y', X', and n is as defined above and described in classes and subclasses herein.

In certain embodiments, the aliphatic polycarbonate chains comprise

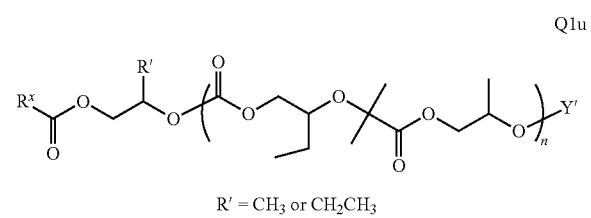

Q1u

R' = CH₃ or CH₂CH₃ wherein each of Y', $R^x$, and n is as defined above and described in classes and subclasses herein.

In certain embodiments, the aliphatic polycarbonate chains comprise

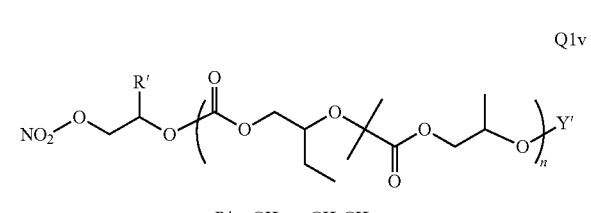

Q1v

R' = CH₃ or CH₂CH₃ wherein each of Y' and n is as defined above and described in classes and subclasses herein.

In certain embodiments, the aliphatic polycarbonate chains comprise

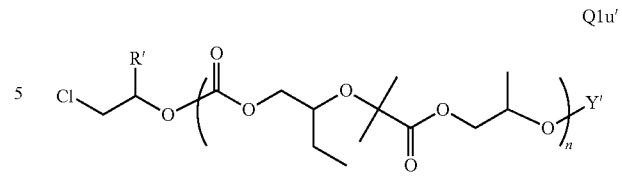

Q1u'

R' = CH₃ or CH₂CH₃ wherein each of Y' and n is as defined above and described in classes and subclasses herein.

In certain embodiments, aliphatic polycarbonate chains comprise

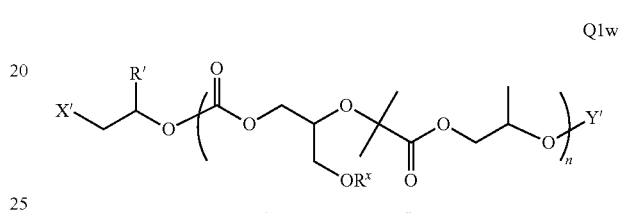

Q1w

R' = CH₃ or CH₂O$R^x$ wherein each of X', Y', $R^x$, and n is as defined above and described in classes and subclasses herein.

In certain embodiments, aliphatic polycarbonate chains comprise

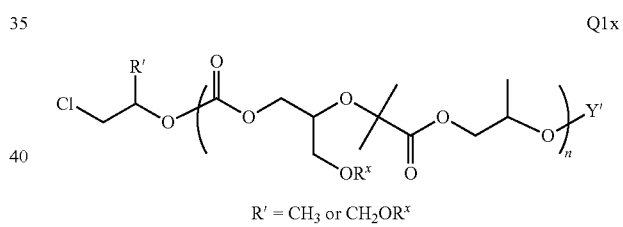

Q1x

R' = CH₃ or CH₂O$R^x$ wherein each of —Y', $R^x$, and n is as defined above and described in classes and subclasses herein.

In certain embodiments, aliphatic polycarbonate chains comprise

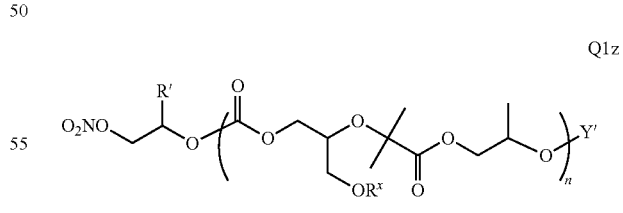

Q1z

R' = CH₃ or CH₂O$R^x$ wherein each of —Y', $R^x$, and n is as defined above and described in classes and subclasses herein.

In certain embodiments, aliphatic polycarbonate chains comprise

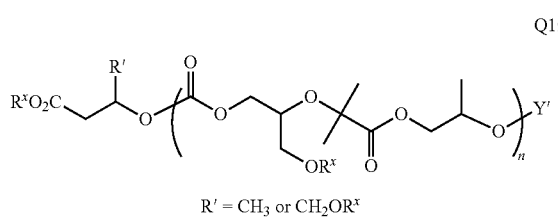

Q1z′

R′ = CH₃ or CH₂ORˣ wherein each of —Y′, Rˣ, and n is as defined above and described in classes and subclasses herein.

In certain embodiments, aliphatic polycarbonate chains comprise

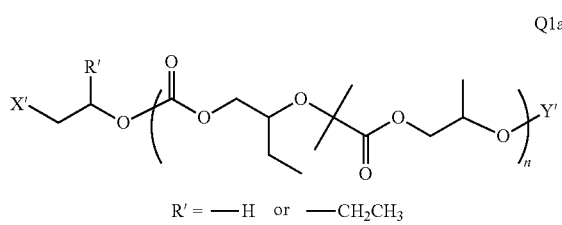

Q1aa

R′ = —H or —CH₂CH₃ wherein each of Y′, X′, and n is as defined above and described in classes and subclasses herein.

In certain embodiments, the aliphatic polycarbonate chains comprise

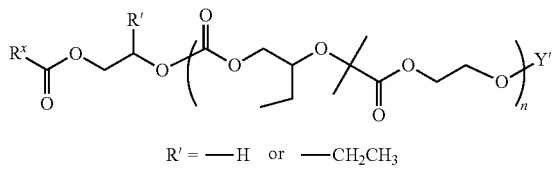

Q1ab

R′ = —H or —CH₂CH₃ wherein each of Y′, Rˣ, and n is as defined above and described in classes and subclasses herein.

In certain embodiments, the aliphatic polycarbonate chains comprise

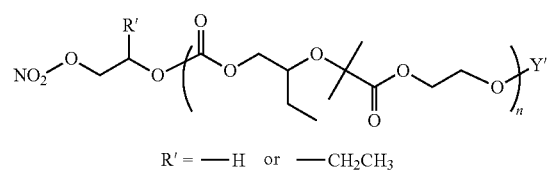

Q1ac

R′ = —H or —CH₂CH₃ wherein each of Y′ and n is as defined above and described in classes and subclasses herein.

In certain embodiments, the aliphatic polycarbonate chains comprise

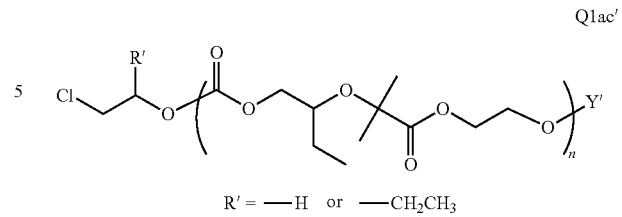

Q1ac′

R′ = —H or —CH₂CH₃ wherein each of Y′ and n is as defined above and described in classes and subclasses herein.

In certain embodiments, aliphatic polycarbonate chains comprise

In certain embodiments, aliphatic polycarbonate chains comprise

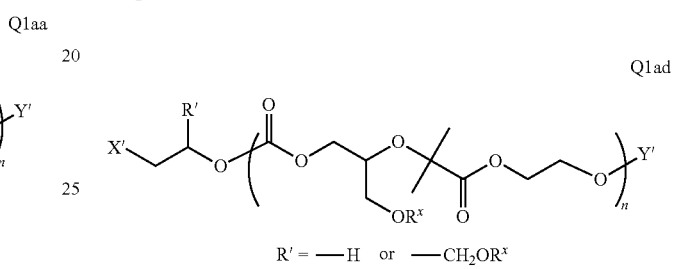

Q1ad

R′ = —H or —CH₂ORˣ wherein each of Y′, X′, Rˣ, and n is as defined above and described in classes and subclasses herein.

In certain embodiments, in polycarbonates of formulae Q1a through Q1ad, at least a portion of the —Y groups comprise —Y′ groups selected from the group consisting of:

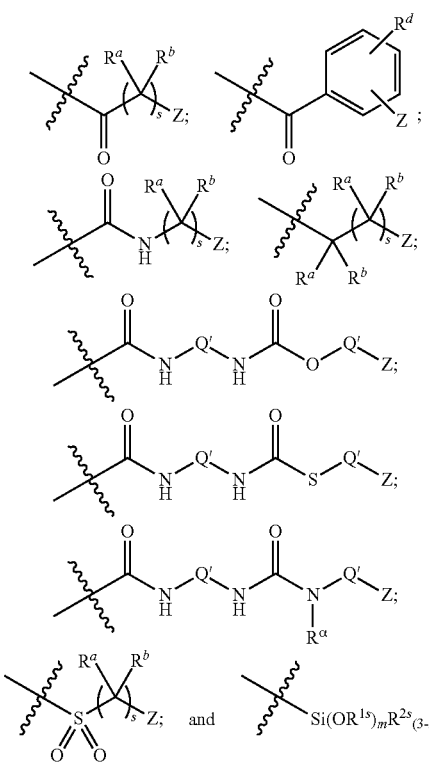

where each of $R^a$, $R^b$, Z, s, Q', $R^a$, $R^{1s}$, $R^{2s}$, and m is as defined above and described in classes and subclasses herein.

In certain embodiments, in polycarbonates of formulae Q1a through Q1ad, the moiety Y' is selected from the group consisting of:

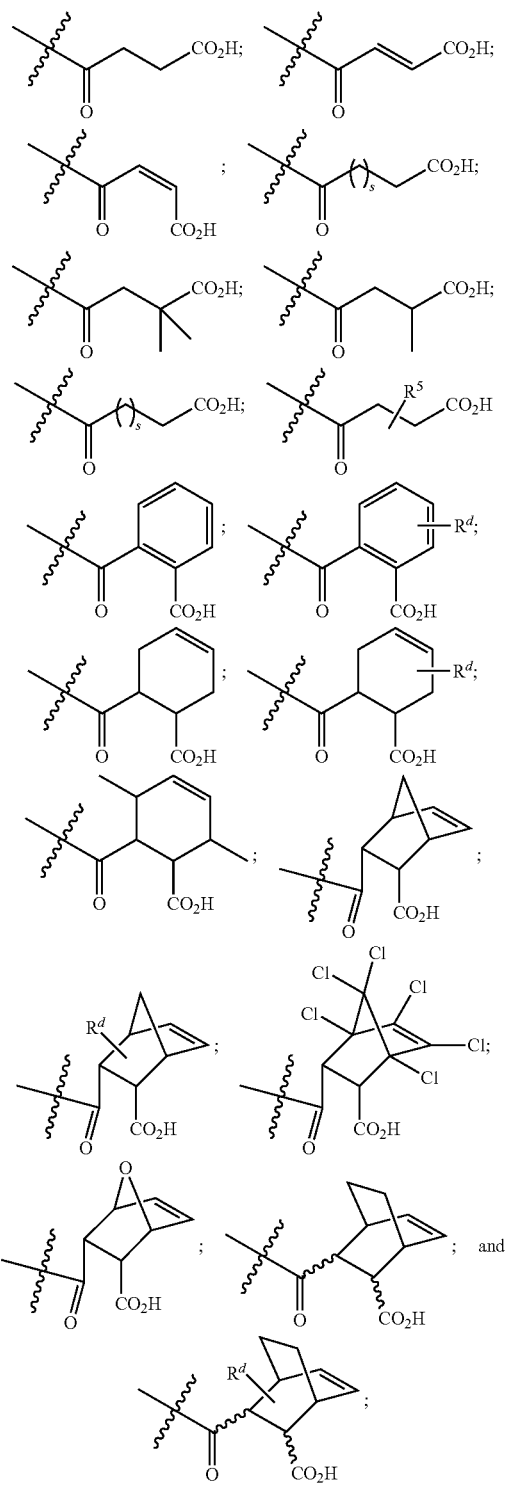

wherein each of s and $R^d$ is as defined above and described in classes and subclasses herein;

In certain embodiments, in polycarbonates of formulae Q1a through Q1ad, the moiety Y' is selected from the group consisting of:

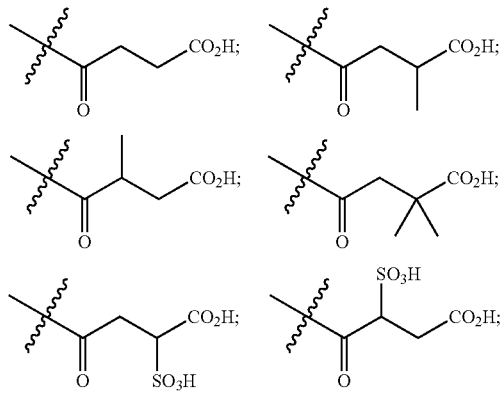

and combinations of any two or more of these.

In certain embodiments, in polycarbonates of formulae Q1a through Q1ad, the moiety Y' is selected from the group consisting of:

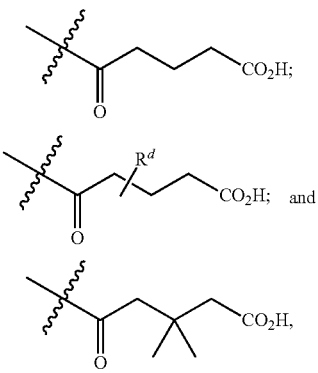

wherein each $R^d$, is as defined above and described in classes and subclasses herein.

In certain embodiments, in polycarbonates of formulae Q1a through Q1ad, the moiety Y' is selected from the group consisting of:

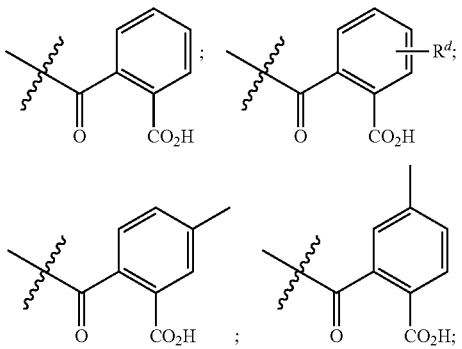

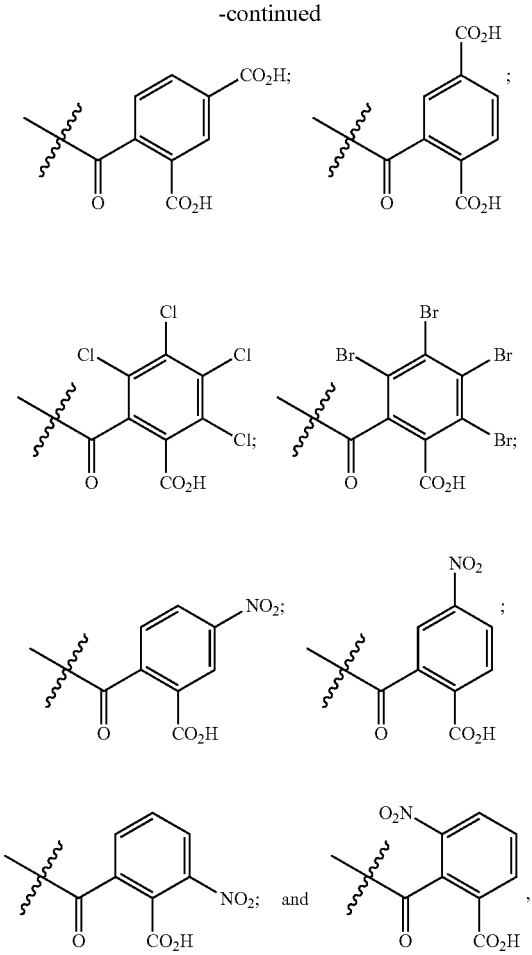

wherein each $R^d$, is as defined above and described in classes and subclasses herein.

For polycarbonates comprising repeat units derived from two or more epoxides, such as those represented by structures Q1m through Q1ad, depicted above, it is to be understood that the structures drawn may represent mixtures of positional isomers or regioisomers that are not explicitly shown. For example, the polymer repeat unit adjacent to either end groups of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e temperature pressure, etc.) and the timing of addition of reaction components. Similarly, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure Q1ac above, may contain a mixture of several compounds as shown in the diagram below. This diagram shows the isomers graphically for polymer Q1ac, where the structure in brackets represents the polymer with each regio- and positional isomer possible for the monomer unit adjacent to the end groups on each side of the main polymer chain. Each end group on the polymer may be independently selected from the groups shown on the left or right. In certain embodiments, the polymer composition comprises a mixture of all possible combinations of these. In other embodiments, the polymer composition is enriched in one or more of these.

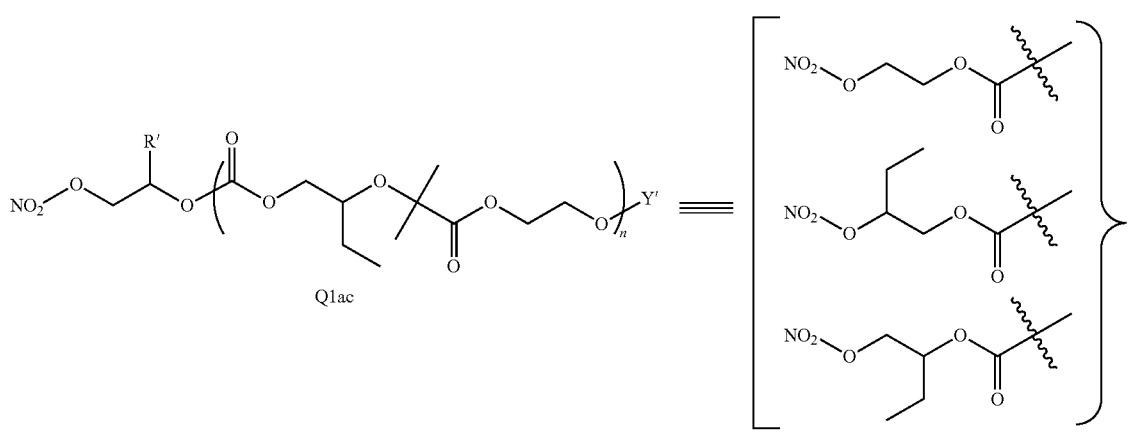

Q1ac

-continued

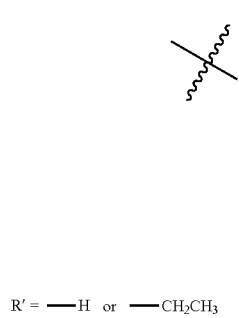 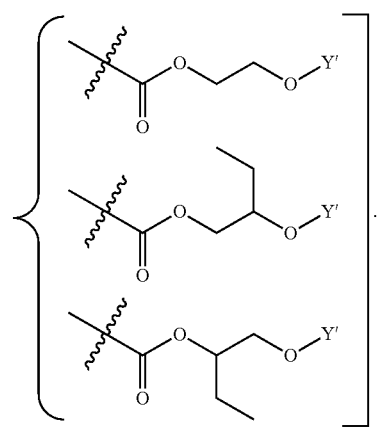

R' = —H or —CH$_2$CH$_3$

In certain embodiments, aliphatic polycarbonate chains comprise a copolymer of carbon dioxide and one epoxide. In certain embodiments, aliphatic polycarbonate chains comprise a copolymer of carbon dioxide and propylene oxide. In certain embodiments, aliphatic polycarbonate chains comprise a copolymer of carbon dioxide and ethylene oxide. In certain embodiments, aliphatic polycarbonate chains comprise a copolymer of carbon dioxide and cyclohexene oxide. In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexane oxide.

In other embodiments, aliphatic polycarbonate chains comprise a terpolymer of carbon dioxide and two different epoxides. In certain embodiments, aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, aliphatic polycarbonate chains comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% propylene oxide-derived repeat units.

In certain embodiments, in the polymer compositions described hereinabove, aliphatic polycarbonate chains have a number average molecular weight ($M_n$) in the range of 500 g/mol to about 250,000 g/mol.

In certain embodiments, aliphatic polycarbonate chains have an $M_n$ less than about 100,000 g/mol. In certain embodiments, aliphatic polycarbonate chains have an $M_n$ less than about 70,000 g/mol. In certain embodiments, aliphatic polycarbonate chains have an $M_n$ less than about 50,000 g/mol. In certain embodiments, aliphatic polycarbonate chains have an $M_n$ between about 500 g/mol and about 40,000 g/mol. In certain embodiments, aliphatic polycarbonate chains have an $M_n$ less than about 25,000 g/mol. In certain embodiments, aliphatic polycarbonate chains have an $M_n$ between about 500 g/mol and about 20,000 g/mol. In certain embodiments, aliphatic polycarbonate chains have an $M_n$ between about 1,000 g/mol and about 10,000 g/mol. In certain embodiments, aliphatic polycarbonate chains have an $M_n$ between about 1,000 g/mol and about 5,000 g/mol. In certain embodiments, aliphatic polycarbonate chains have an $M_n$ between about 500 g/mol and about 1,000 g/mol. In certain embodiments, aliphatic polycarbonate chains have an $M_n$ between about 1,000 g/mol and about 3,000 g/mol. In certain embodiments, aliphatic polycarbonate chains have an $M_n$ of about 5,000 g/mol. In certain embodiments, aliphatic polycarbonate chains have an $M_n$ of about 4,000 g/mol. In certain embodiments, aliphatic polycarbonate chains have an $M_n$ of about 3,000 g/mol. In certain embodiments, aliphatic polycarbonate chains have an $M_n$ of about 2,500 g/mol. In certain embodiments, aliphatic polycarbonate chains have an $M_n$ of about 2,000 g/mol. In certain embodiments, aliphatic polycarbonate chains have an $M_n$ of about 1,500 g/mol. In certain embodiments, aliphatic polycarbonate chains have an $M_n$ of about 1,000 g/mol. In certain embodiments, aliphatic polycarbonate chains have an $M_n$ of about 700 g/mol. In certain embodiments, aliphatic polycarbonate chains have an $M_n$ of about 500 g/mol.

In certain embodiments, in the polymer compositions described hereinabove, aliphatic polycarbonate chains are characterized in that they have a narrow molecular weight distribution. This can be indicated by the polydispersity indices (PDI) of the aliphatic polycarbonate polymers. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments aliphatic polycarbonate compositions of the present invention comprise substantially alternating polymers containing a high percentage of carbonate linkages and a low content of ether linkages. In certain embodiments, aliphatic polycarbonate compositions of the present invention are characterized in that, on average in the composition, the percentage of carbonate linkages is 85% or greater. In certain embodiments, aliphatic polycarbonate compositions of the present invention are characterized in that, on average in the composition, the percentage of carbonate linkages is 90% or greater. In certain embodiments, aliphatic polycarbonate compositions of the present invention are characterized in that, on average in the composition, the percentage of carbonate linkages is 91% or greater. In certain embodiments, aliphatic polycarbonate compositions of the present invention are characterized in that, on average in the composition, the percentage of carbonate linkages is 92% or greater. In certain embodiments, aliphatic polycarbonate compositions of the present invention are characterized in that, on average in the composition, the percentage of carbonate linkages is 93% or greater. In certain embodiments, aliphatic polycarbonate compositions of the present invention are characterized in that, on average in the composition, the percentage of carbonate linkages is 94% or greater. In certain embodiments, aliphatic polycarbonate compositions of the present invention are characterized in that, on average in the composition, the percentage of carbonate linkages is 95% or greater. In certain embodiments, aliphatic polycarbonate compositions of the present invention are characterized in that, on average in the composition, the percentage of carbonate linkages is 96% or greater. In certain embodiments, aliphatic polycarbonate compositions of the present invention are characterized in that, on average in the composition, the percentage of carbonate linkages is 97% or greater. In certain embodiments, aliphatic polycarbonate compositions of the present invention are characterized in that, on average in the composition, the percentage of carbonate linkages is 98% or greater. In certain embodiments, aliphatic polycarbonate compositions of the present invention are characterized in that, on average in the composition, the percentage of carbonate linkages is 99% or greater. In certain embodiments, aliphatic polycarbonate compositions of the present invention are characterized in that, on average in the composition, the percentage of carbonate linkages is 99.5% or greater. In certain embodiments, the percentages above exclude ether linkages present in polymerization initiators or chain transfer agents and refer only to the linkages formed during epoxide $CO_2$ copolymerization. In certain embodiments, aliphatic polycarbonate compositions of the present invention are characterized in that they contain essentially no ether linkages either within the polymer chains derived from epoxide $CO_2$ copolymerization or within any polymerization initiators, chain transfer agents or end groups that may be present in the polymer. In certain embodiments, aliphatic polycarbonate compositions of the present invention are characterized in that they contain, on average, less than one ether linkage per polymer chain within the composition.

In certain embodiments where an aliphatic polycarbonate is derived from mono-substituted epoxides (e.g. such as propylene oxide, 1,2-butylene oxide, epichlorohydrin, or a glycidol derivative), the aliphatic polycarbonate is characterized in that it is regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%.

IV) Higher Polymers

In one aspect, the present invention encompasses higher polymers derived from the polycarbonate compositions described hereinabove. In certain embodiments, such higher polymers are formed by reacting the polycarbonate with suitable cross-linking agents. In certain embodiments, cross linkers including functional groups reactive toward hydroxyl groups are selected, for example, from epoxy, isocyanate, melamine groups. In certain embodiments, such cross linking agents are polyisocyanates, melamines, epoxies or phenol/formaldehyde resins. Methods, reagents and compositions relevant to the use of the compounds herein as polyol resins for polyurethane technology are described in Ulrich Meier-Westhues *Polyurethanes Coatings, Adhesives and Sealants*, 2007 Vincentz Network GmbH & Co. and in *Chemistry and Technology of Polyols for Polyurethanes* 2005 Rapra Technology Ltd., the entirety of each of which are incorporated herein by reference.

In certain embodiments higher polymers of the present invention derived from AEF-containing polycarbonate polyols have improved adhesion or wetting properties relative to comparable polymers derived from analogous polyols lacking such AEF groups. In certain embodiments, such high polymers or formulated precursors to such higher polymer compositions have improved adhesion and/or wetting properties when placed in contact with an inorganic substrate. In certain embodiments such higher polymers or formulated precursors to such higher polymer compositions have improved handling or performance characteristics because of the presence of the AEF groups. In certain embodiments such improved characteristics include the dispersion of inorganic materials such as glass fibers, reinforcing compounds, fillers, pigments and the like within the formulations.

In certain embodiments, cross-linking or chain-extending reactions of the polycarbonates takes place primarily at hydroxy end groups of the polymer chains to the substantial exclusion of reaction at the AEF groups that may be present on some chain ends. In other embodiments, the cross-linking or chain-extending reactions of the polycarbonates takes place at both hydroxy end groups and at least a portion of the AEF groups.

In certain embodiments, such cross linking agents are polyisocyanates. In some embodiments, a difunctional or higher-functionality isocyanate is selected from diisocyanates, the biurets and cyanurates of diisocyanates, and the adducts of diisocyanates to polyols. Suitable diisocyanates generally have from 4 to 22 carbon atoms. The diisocyanates are typically selected from aliphatic, cycloaliphatic and aromatic diisocyanates, for example 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3- and 1,4-diisocyanatocyclohexane, 2,4- and 2,6-diisocyanato-1-methylcyclohexane, 4,4'-bis(isocyanatocyclohexyl)methane, isophorone diisocyanate (=1-isocyanato-3,3,5-trimethyl-5-isocyanatomethylcyclohexane), 2,4- and 2,6-tolylene diisocyanate, tetramethylene-p-xylylene diisocyanate (=1,4-bis(2-isocyanatoprop-2-yl)benzene), 4,4'-diisocyanatodiphenylmethane, preferably 1,6-diisocyanatohexane diisocyanatohexane and isophorone diisocyanate, and mixtures thereof.

In certain embodiments, crosslinking compounds comprise the cyanurates and biurets of aliphatic diisocyanates. In certain embodiments, crosslinking compounds are the diisocyanurate and the biuret of isophorone diisocyanate, and the isocyanate and the biuret of 1,6-diisocyanatohexane. Examples of adducts of diisocyanates to polyols are the adducts of the abovementioned diisocyanates to glycerol, trimethylolethane and trimethylolpropane, for example the adduct of tolylene diisocyanates to trimethylolpropane, or the adducts of 1,6-diisocyanatohexane or isophorone diisocyanate to trimethylpropane and/or glycerol.

In some embodiments, a polyisocyanate used, may, for example, be an aromatic polyisocyanate such as tolylene diisocyanate, diphenylmethane diisocyanate or polymethylene polyphenyl isocyanate, an aliphatic polyisocyanate such as hexamethylene diisocyanate, xylylene diisocyanate, dicyclohexylmethane diisocyanate, lysine diisocyanate or tetramethylxylylene diisocyanate, an alicyclic polyisocyanate such as isophorone diisocyanate, or a modified product thereof.

In some embodiments, a modified product of a polyisocyanate is a prepolymer modified product which is a reaction product of a low molecular weight diol with a low molecular weight triol, a buret product which is a reaction product with water, or a trimer having an isocyanurate skeleton.

The isocyanate group-terminated prepolymer can be produced by reacting a stoichiometrically excess amount of a polyisocyanate to the polyol composition. It can be produced by thermally reacting the polyol composition with the polyisocyanate at a temperature of from 60 to 100° C. for from 1 to 30 hours in a dry nitrogen stream in the presence or absence of a solvent and optionally in the presence of a urethane-forming catalyst. In some embodiments, a urethane-forming catalyst is an organometallic compound of tin, lead or titanium. In some embodiments a urethane-forming catalyst is an organic tin compound, such as dibutyltin dilaurate, dibutyltin dioctoate or stannous octoate.

In certain embodiments, the present invention encompasses isocyanate-terminated prepolymers derived from one or more of the AEF-containing aliphatic polycarbonate compositions described hereinabove. An isocyanate terminated prepolymer of the present invention can be used for uses known in the art and familiar to the skilled artisan. In some embodiments, it can be used for a humidity curable composition which is cured by a reaction with moisture in air, a two-part curable composition to be reacted with a curing agent such as a polyamine, a polyol or a low molecular weight polyol, a casting polyurethane elastomer, or other applications.

The present invention also provides a polyurethane resin obtained by reacting the above polyol compositions with a polyisocyanate. Such a polyurethane resin can be produced by a known method, and a curing agent such as a polyamine or a low molecular polyol, or urethane-forming catalysts may optionally be used.

In the production of polyurethanes, polyol compositions of the invention may be reacted with the polyisocyanates using conventional techniques that have been fully described in the prior art. Depending upon whether the product is to be a homogeneous or microcellular elastomer, a flexible or rigid foam, an adhesive, coating or other form, the reaction mixture may contain other conventional additives, such as chain-extenders, for example 1,4-butanediol or hydrazine, catalysts, for example tertiary amines or tin compounds, surfactants, for example siloxane-oxyalkylene copolymers, blowing agents, for example water and trichlorofluoromethane, cross-linking agents, for example triethanolamine, fillers, pigments, fire-retardants and the like.

To accelerate the reaction between the isocyanate-reactive groups of the polyol resin and the isocyanate groups of the crosslinker, it is possible to use known catalysts, for example, dibutyltin dilaurate, tin(II) octoate, 1,4-diazabicyclo[2.2.2]-octane, or amines such as triethylamine. These are typically used in an amount of from $10^{-5}$ to $10^{-2}$ g, based on the weight of the crosslinker.

The crosslinking density can be controlled by varying the functionality of the polyisocyanate, the molar ratio of the polyisocyanate to the polyol resin, or by additional use of monofunctional compounds reactive toward isocyanate groups, such as monohydric alcohols, e.g. ethylhexanol or propylheptanol.

A crosslinker is generally used in an amount which corresponds to an NCO:OH equivalents ratio of from 0.5 to 2, preferably from 0.75 to 1.5 and most preferably from 0.8 to 1.2.

Suitable crosslinking agents are also epoxy compounds having at least two epoxide groups in the molecule, and their extension products formed by preliminary extension (prepolymers for epoxy resins, as described, for example in Ullmann's Encyclopedia of Industrial Chemistry, 6th edition, 2000, Electronic Release, in the chapter "Epoxy Resins"). Epoxy compounds having at least two epoxide groups in the molecule include, in particular:

(i) Polyglycidyl and poly(3-methylglycidyl) esters which are obtainable by reacting a compound having at least two carboxyl groups, such as an aliphatic or aromatic polycarboxylic acid, with epichlorohydrin or beta-methylepichlorohydrin. The reaction is effected, preferably, in the presence of a base. Suitable aliphatic polycarboxylic acids are oxalic acid, succinic acid, glutaric acid, adipic acid, pimelic acid, azelaic acid, dimerized or trimerized linolenic acid, tetrahydrophthalic acid, hexahydrophthalic acid or 4-methylhexahydrophthalic acid. Suitable aromatic polycarboxylic acids are, for example, phthalic acid, isophthalic acid or terephthalic acid.

(ii) Polyglycidyl or poly(β-methylglycidyl) ethers which derive, for example, from acyclic alcohols, such as ethylene glycol, diethylene glycol, poly(oxyethylene) glycols, propane-1,2-diol, poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol; or cyclic alcohols such as 1,4-cyclohexanedimethanol, bis(4-hydroxycyclohexyl)methane or 2,2-bis(4-hydroxycyclohexyl)propane; or comprise aromatic rings, such as N,N-bis(2-hydroxyethyl)aniline or p,p-bis(2-hydroxyethylamino) diphenylmethane. The glycidyl ethers may also derive from monocyclic phenols such as resorcinol or hydroquinone, or polycyclic phenols, such as bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, or from novolaks which are obtainable by condensing aldehydes, such as formaldehyde, acetaldehyde, chloral or furfural, with phenols, such as phenol, 4-chlorophenol, 2-methylphenol, 4-tert-butylphenol or bisphenols.

(iii) Poly(N-glycidyl) compounds which are obtainable by dehydrochlorinating the reaction products of epichlorohydrin with amines which have at least two amine hydrogen atoms, such as aniline, n-butylamine, bis(4-aminophenyl) methane, m-xylylenediamine or bis(4-methylaminophenyl) methane. The poly(N-glycidyl) compounds also include triglycidyl isocyanurates, N,N'-diglycidyl derivatives of alkyleneureas such as ethyleneurea or 1,3-propyleneurea, and the diglycidyl derivatives or hydantoins such as 5,5-dimethylhydantoin.

(iv) Poly(S-glycidyl) compounds such as di-S-glycidyl derivatives which derive from dithiols, such as ethane-1,2-dithiol or bis(4-mercaptomethylphenyl) ether.

(v) Cycloaliphatic epoxy compounds such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate; or mixed cycloaliphatic-aliphatic epoxy compounds such as limonene diepoxide.

In some embodiments, the present disclosure encompasses higher polymers formed with polyol resins of the present invention that additionally include a stiffening polymer which comprises (meth)acryloyl and/or vinylaromatic units. The stiffening is obtainable by free-radically polymerizing (meth)acrylic monomers or vinylaromatic monomers. Examples of suitable monomers are styrene, ring-alkylated styrenes with preferably $C_{1-4}$ alkyl radicals such as a-methylstyrene, p-methylstyrene, acrylonitrile, methacrylonitrile, acrylamide or methacrylamide, alkyl acrylates and methacrylates having from 1 to 4 carbon atoms in the alkyl radical, in particular methyl methacrylate. Preference is given to using monomers and monomer mixtures which give rise to a polymer or copolymer having a glass transition temperature of more than +20° C. and preferably more than +50° C.

The stiffening polymer may, aside from (meth)acrylic monomers or vinylaromatic monomers, comprise various monomers. The (meth)acrylic monomers or vinylaromatic monomers make up generally at least 20% by weight, preferably at least 50% by weight, in particular at least 70% by weight, of the constituent monomers.

The encompassed higher polymer compositions may additionally comprise customary assistants such as fillers, diluents or stabilizers.

Suitable fillers are, for example, silica, colloidal silica, calcium carbonate, carbon black, titanium dioxide, mica and the like.

Suitable diluents are, for example, polybutene, liquid polybutadiene, hydrogenated polybutadiene, paraffin oil, naphthenenates, atactic polypropylene, dialkyl phthalates, reactive diluents, for example, alcohols and oligoisobutenes.

Suitable stabilizers are, for example, 2-benzothiazolyl sulfide, benzothiazole, thiazole, dimethyl acetylenedicarboxylate, diethyl acetylenedicarboxylate, BHT, butylhydroxyanisole, vitamin E.

Further higher polymeric materials which may be obtained from the polyols of the invention include vinyl type polymers made by polymerizing ethylenically unsaturated derivatives of the polyols. Such derivatives may be obtained, for example, by reacting the polyols with ethylenically unsaturated carboxylic acids, for example acrylic, methacrylic and itaconic acids or ester-forming derivatives thereof.

Another useful method of forming ethylenically unsaturated derivatives of the polyols is to react said polyols with organic polyisocyanates, for example those mentioned above, and then to react the isocyanate group terminated products obtained with hydroxyalkyl acrylates or methacrylates, for example the 2-hydroxyethyl or 2-hydroxypropyl compounds. Alternatively, the polyols may be reacted with isocyanato-acrylates obtained by reacting a diisocyanate with a hydroxalkyl acrylate or methacrylate.

The ethylenically unsaturated derivatives of the polycarbonates may be polymerized, preferably in the presence of co-monomers such as acrylonitrile, styrene, ethyl acrylate, butyl acrylate or methyl methacrylate, using conditions that have been fully described in the prior art for vinyl polymerisations. Useful molded plastic articles and composite materials may be made in this way.

Further higher polymeric materials which may be obtained from the polycarbonates of the invention include epoxy resins prepared in conventional manner from epoxy derivatives of the polycarbonates. Such derivatives may be obtained, for example, by reacting the polycarbonates with epichlorohydrin in the presence of bases.

Articles of manufacture comprising provided polycarbonate and/or polyurethane compositions can be made using known methods and procedures described in the art. The skilled artisan, after reading the present disclosure, will be able to manufacture such articles using well known protocols and techniques.

In another aspect, the present invention encompasses higher polymer compositions resulting from olefin polymerizations incorporating the aliphatic polycarbonate compositions described hereinabove. In certain embodiments such materials are derived by chain-extending or cross-linking the aliphatic polycarbonate chains by exposing the olefin groups in the —Y moieties to conditions that promote olefin polymerization. In certain embodiments, the aliphatic polycarbonates are combined with additional materials that participate in the olefin polymerization. Such materials can include olefinic monomers or prepolymers. The conditions that promote olefin polymerization can include the presence of polymerization initiators or catalysts. In certain embodiments, such olefin crosslinking polymerizations are radical polymerizations. In some embodiments, the source of a radical initiator can be peroxides, other chemicals, heat, or high energy radiation.

In certain embodiments, the olefin monomers are selected from the group consisting of styrene or derivatives thereof, acrylic acid or derivatives thereof, vinyl ethers, vinyl esters, polymeric materials containing any one or more of these, and combinations of two or more of the foregoing.

Methods of performing such radical polymerizations are well known in the art. In some embodiments, an olefin monomer is a acrylic monomer. Acrylic monomers include acrylic or methacrylic acid, esters of acrylic or (meth)acrylic acid and derivatives and mixtures thereof, such as but not limited to acrylamides and acrylonitriles. Non-limiting examples of suitable acrylic monomers are acrylate esters such as alkyl acrylates that have 1-18 carbon atoms in the alkyl group such as methyl acrylate, ethyl acrylate, n-propyl acrylate, n-butyl acrylate, isopropyl acrylate, isobutyl acrylate, t-butyl acrylate, n-amyl acrylate, n-hexyl acrylate, isoamyl acrylate, 2-ethylhexyl acrylate, nonyl acrylate, lauryl acrylate, stearyl acrylate, and the like. Cycloaliphatic acrylates also can be used such as trimethylcyclohexyl acrylate, t-butylcyclohexyl acrylate, cyclohexyl acrylate, isobornyl acrylate, and the like. Aryl acrylates can also be used such as benzyl acrylate, phenyl acrylate. Non-limiting examples of suitable (meth)acrylic monomers are (meth)acrylate esters such as alkyl methacrylates that have 1-18 carbon atoms in the alkyl group such as methyl (meth)acrylate, ethyl (meth)acrylate, n-propyl (meth)acrylate, n-butyl (meth)acrylate, isopropyl (meth)acrylate, isobutyl (meth)acrylate, t-butyl (meth)acrylate, n-amyl (meth)acrylate, n-hexyl (meth)acrylate, isoamyl (meth)acrylate, 2-ethylhexyl (meth)acrylate, nonyl (meth)acrylate, lauryl (meth)acrylate, stearyl (meth)acrylate, and the like. Cycloaliphatic (meth)acrylates also can be used such as trimethylcyclohexyl (meth)acrylate, t-butylcyclohexyl (meth)acrylate, cyclohexyl (meth)acrylate, isobornyl (meth)acrylate, and the like. Aryl (meth)acrylates can also be used such as benzyl (meth)acrylate, phenyl (meth)acrylate, and the like.

Other suitable acrylic monomers include acrylic acid derivatives such as: acrylic acid and its salts, acrylonitrile, acrylamide, N-alkyl acrylamide, N,N-dialkyl acrylamide, N-phenyl-acrylamide and acrolein. Other suitable (meth)acrylic monomers include (meth)acrylic acid derivatives such as: (meth)acrylic acid and its salts, (meth)acrylonitrile, (meth)acrylamide, N-alkyl (meth)acrylamide, N,N-dialkyl (meth)acrylamide, N-phenyl-(meth)acrylamide and (meth)acrolein.

Other polymerizable nonacrylic monomers that can be used for forming the polymer include vinyl aromatics such as styrene, alpha-methyl styrene, t-butyl styrene, vinyl toluene, divinyl benzene, vinyl acetate, and vinyltrimethoxy silane, or a combination thereof. In some embodiments, a monomer is styrene. In some embodiments, a monomer is vinyl toluene.

In some embodiments, a monomer is 2-phenoxy ethyl acrylate (PHEA), 1,6-hexanediol diacrylate (HDDA), trimethylolpropane triacrylate (TMPTA), dipentaerythritol hexaacrylate (DPHA), or a combination thereof. In some embodiments, a monomer is 2-phenoxy ethyl methacrylate (PHEM), 1,6-hexanediol dimethacrylate (HDDMA), trimethylolpropane trimethacrylate (TMPTMA), dipentaerythritol hexamethacrylate (DPHMA), or a combination thereof.

In some embodiments, a crosslinking agent reacted with an inventive polymer is a polymer or oligomer rather than a monomer. In some embodiments, a crosslinking agent is pentaerythritol triacrylate (PETA), pentaerythritol tetraacrylate (PETA-4), N,N'-methylenebisacrylamide (MBAAm), tetra(ethyleneglycol)dimethacrylate (TEGDMA), oligo(ethyleneglycol)diacrylate, poly(ethyleneglycoldi(meth)acrylate, or trimethylolpropane trimethacrylate (TMPTMA).

In certain embodiments, methods for free radical crosslinking comprise a peroxide or azo initiator. In some embodiments, an initiator is selected from the group consisting of diacyl peroxides, dialkyl peroxy-dicarbonates, tert-alkyl peroxyesters, di-(tert-alkyl) peroxyketals, and di-tert-alkyl peroxides.

In certain embodiments, an initiator is selected from the group consisting of t-butyl peroxide, methyl ethyl ketone peroxide, benzoyl peroxide, cumyl peroxyneodecanoate, cumyl peroxyneoheptanoate, t-amyl peroxyneodecanoate, t-butyl peroxyneodecanoate, di-(2-ethylhexyl) peroxy-dicarbonate, t-amyl peroxypivalate, t-butyl peroxypivalate, 2,5-dimethyl-2,5 bis(2-ethyl-hexanoylperoxy) hexane, dibenzoyl peroxide, t-amyl peroxy-2-ethylhexanoate, t-amyl peroxy-2-ethylhexanoate, 1,1-di-(t-amylperoxy) cyclohexane, 1,1-di-(t-butylperoxy) 3,3,5-trimethyl cyclohexane, 1,1-di-(t-butylperoxy) cyclohexane, O,O-t-Amyl-O(2-ethylhexyl) monoperoxycarbonate, O,O-t-butyl O-isopropyl monoperoxycarbonate, O,O-t-butyl O-(2-ethylhexyl) monoperoxycarbonate, t-amyl peroxybenzoate, t-butyl peroxybenzoate, t-butyl peroxyacetate, ethyl 3,3-di-(t-amylperoxy) butyrate, ethyl 3,3-di-(t-butylperoxy) butyrate, dicumyl peroxide, t-butyl peroctoate, cumene hydroperoxide, 2,2'-azobis(isobutyronitrile).

In some embodiments, crosslinking is photoinitiated and comprises a photoinitiator. In certain embodiments, a photoinitiator is 1-hydroxy-cyclohexyl-phenyl-ketone, 2,2-dimethyl-2-hydroxyacetophenone, 2,2-dimethyl-2-hydroxyacetophenone, 2'4-hydroxybenzophenone, benzophenone, 2-benzyl-2-(dimethylamino)-1-(4-(4-morphorlinyl)phenyl)-1-butanone, 2-methyl-1-(4-methylthio)phenyl-2-(4-morpholinyl)-1-propanone, diphenyl-(2,4,6-trimethylbenzoyl) phospine oxide, phenyl bis(2,4,6-trimethylbenzoyl) phosphine oxide, benzyl-dimethylketal, isopropylthioxanthone, 4-(dimethylamino)benzoate, and combinations thereof. In some embodiments, a photoinitiator is an alkyl or aromatic ketone such as benzophenone, benzoin, acetophenone, 4,4-bis(dimethylamino)benzophenone, benzoin methyl ether, [2-hydroxy-2-methyl-1-phenyl-propan-1-one], [1-(4-dodecylphenyl)-2-hydroxy-2-methyl-propan-1-one], [1-(4-isopropylphenyl)-2-hydroxy-2-methylpropan-1-one] and a mixture of 2-(1-methylethyl)-9H-thioxanthen-9-one, 2-hydroxy-2-methyl-1-phenylpropan-1-one and camphorquinone. This list is not exhaustive; any known photoinitiator that can be used in the composition of an aliphatic polycarbonate may be used.

In certain embodiments, the present invention provides methods for producing a crosslinked polymer composition, wherein an aliphatic polycarbonate composition having sites of olefinic unsaturation as described above is combined under suitable conditions with a suitable initiator and optionally a crosslinking agent to produce a crosslinked polymer composition. In certain embodiments, an initiator comprises a photoinitiator and the method further comprises the step of applying radiation. In some embodiments, the radiation of gamma and/or ultraviolet radiation. In some embodiments, suitable conditions comprise an organic solvent that produces a polymer solution, suspension, or emulsion. In some embodiments, the solvent that is a chemical reactant in the crosslinking reaction. In some embodiments, the solvent that is not a chemical reactant in the crosslinking.

In certain embodiments, the olefin-containing aliphatic polycarbonates described hereinabove, are combined with one or more additional unsaturated polymers or resins. In certain embodiments, the invention comprises blends of the olefin-containing aliphatic polycarbonates described hereinabove with commercial vinyl ester resins. In certain embodiments, the invention comprises blends of the olefin-containing aliphatic polycarbonates described hereinabove with commercial unsaturated polyesters. Such blends may also comprise any of the initiators and additives described herein.

It will be understood that the present invention includes compositions of crosslinked polymer resulting from such methods.

V) Composites

In another aspect, the present invention encompasses composites incorporating the polymer compositions described hereinabove. In certain embodiments, the present invention encompasses polymer-inorganic composite materials formed by curing of thermoset or reactive curing resins containing polycarbonate polyols comprising AEF groups as described hereinabove. In some embodiments, such composites are derived from radical polymerizations of compositions containing aliphatic polycarbonate chains having sites of olefinic unsaturation. In some embodiments, such composites are derived from curing of compositions containing aliphatic polycarbonate chains having epoxy-end groups. In some embodiments, such composites are derived from curing of compositions containing aliphatic polycarbonate polyols having a high percentage of —OH end groups with cross-linking reagents such as polyisocyanates or melamine.

In certain embodiments, the present invention encompasses polymer-inorganic composite materials formed from thermoplastic aliphatic polycarbonate compositions comprising AEF groups as described hereinabove. In certain embodiments, such thermoplastic polycarbonates have an $M_n$ above about 50 kg/mol. In certain embodiments, such thermoplastic polycarbonates have an $M_n$ above about 100 kg/mol, or above about 150 kg/mol. In certain embodiments, such thermoplastic polycarbonates comprise poly(propylene carbonate) (PPC), poly(ethylene carbonate) (PEC), poly(cyclohexene oxide carbonate) (PCHC), or terpolymers or blends of these such as PPC/PCHC, PEC/PCHC, or terpolymers of PPC with other substituted epoxides. In certain embodiments, such composites comprise blends with other thermoplastic polymers such as polyolefins, polyesters, polyethers and the like.

In certain embodiments, such composites further comprise fibers or solids. In certain embodiments, such fibers or solids are coated with or embedded in the polymer compositions described hereinabove. In certain embodiments the composites comprise glass fibers, carbon fibers, ceramic fibers, mineral fibers and the like. In certain embodiments, such composites contain inorganic materials, alumina, silica, zirconia, clays, titania and the like. In certain embodiments, the composites comprise inorganic materials such as clays, ceramics, alumina, silicaceous minerals, and the like. In certain embodiments, the composites comprise nano particles or related particulate materials. In certain embodiments, the composites comprise carbon nanotubes or other carbon fibers. In certain embodiments, the composites comprise other polymers in the form of sheets, fibers, scrims and the like.

In certain embodiments, the composites may also or alternatively comprise organic solids such as wood fibers, paper, cellulose, plant-derived fibers, and the like.

VI) Methods of Making

In another aspect, the present invention encompasses methods of producing aliphatic polycarbonate chains having end groups that contain AEF groups.

In certain embodiments, the present invention encompasses a method of treating an aliphatic polycarbonate polymer of formula M1:

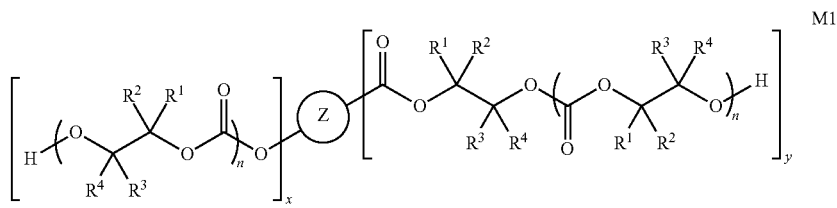

M1 with an alkylating agent, an acylating agent, a silyl compound, a boron-containing compound, a phosphorous-containing compound, an ammonium containing compound or an isocyanate under suitable conditions to provide a compound of formula Pt:

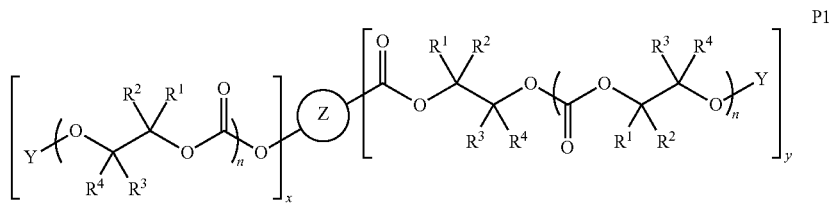

P1 wherein each of Z, $R^1$, $R^2$, $R^3$, $R^4$, n, x, y, and Y is as defined above and described in classes and subclasses herein.

In certain embodiments, the present invention encompasses a method of treating an aliphatic polycarbonate polymer of formula M2:

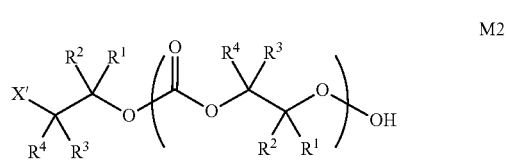

M2 with an alkylating agent, an acylating agent, a silyl compound, a boron-containing compound, a phosphorous-containing compound, an ammonium containing compound or an isocyanate under suitable conditions to provide a compound of formula Q1:

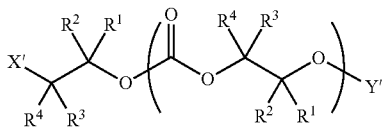

wherein each of Z, $R^1$, $R^2$, $R^3$, $R^4$, n, x, y, and Y' is as defined above and described in classes and subclasses herein.

In certain embodiments, methods of the present invention include the step of treating a polymer of formula M1 or M2 with an alkylating agent, an acylating agent, or an isocyanate containing suitable AEF groups or precursors of AEF groups. In certain embodiments, the acylating agent comprises a cyclic acid anhydride. In certain embodiments, the acylating agent comprises an isocyanate comprising a silicon-containing functional group. In certain embodiments, the acylating agent comprises an isocyanate comprising a tris alkoxy silane.

In certain embodiments, methods of the present invention include the step of treating a polymer of formula M1 or M2 with an alkylating agent, an acylating agent, or an isocyanate containing suitable AEF groups or precursors of AEF groups, wherein the alkylating agent, acylating agent or isocyanate is capable of reacting with two polymer chains. In certain embodiments, such a reagent comprises a bis cyclic anhydride. In certain embodiments, such a reagent comprises a diisocyanate comprising a silicon-containing functional group. In certain embodiments, the acylating agent comprises an isocyanate comprising a tris alkoxy silane.

In certain embodiments, methods of treating a polymer of formula M1 or M2 include the addition of a solvent. In certain embodiments, added solvents include non-protic organic solvents. In certain embodiments, added solvents are selected from the group consisting of ethers, esters, amides, nitriles, aliphatic hydrocarbons, halogenated hydrocarbons, aromatic hydrocarbons, and combinations of any two or more of these.

In certain embodiments, methods of treating a polymer of formula M1 or M2 include the addition of a coreactant or catalyst. In certain embodiments, added coreactants include bases, acids, metal salts and the like. In certain embodiments added catalysts include metal salts, halides, organic bases, acids and the like.

In certain embodiments, methods of the present invention include the step of copolymerizing one or more epoxides and $CO_2$ in the presence of a suitable catalyst and a chain transfer agent, wherein the chain transfer agent comprises the combination of: a functional group that initiates growth of a polymer chain (either by ring-opening an epoxide, or inserting a $CO_2$ molecule) and an AEF group or AEF group precursor as defined hereinabove. In certain embodiments, such a chain transfer agent has a formula HO-Q-$(Z)^\alpha$, where Q, Z and α are as defined above and in the classes and subclasses herein.

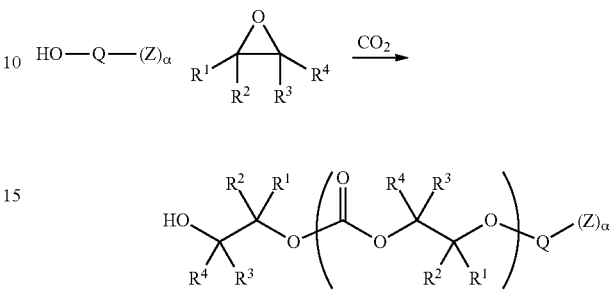

In certain embodiments, such a chain transfer agent has a formula

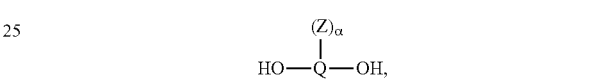

where Q, Z and a are as defined above and in the classes and subclasses herein.

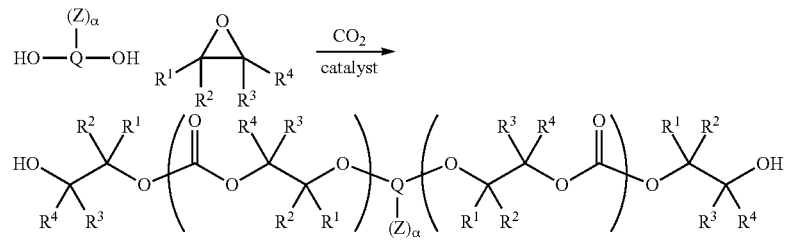

In certain embodiments, the chain transfer agent group comprises a silicon-containing group, a trisalkoxy silane group, or trialkyl silane group. In certain embodiments, the functional group that initiates growth of a polymer chain in such a method comprises an alcohol or carboxylic acid.

VII) Articles of Manufacture

In another aspect, the present invention encompasses articles of manufacture comprising the aliphatic polycarbonate compositions described hereinabove. In certain embodiments, the article of manufacture comprises glass laminate, a composite, a foam, or a coated article. In certain embodiments the composite, foam or coating comprises an inorganic material.

In certain embodiments, articles of the present invention comprise glass laminate assemblies comprising one or more layers of glass and one or more layers of polymer comprising the aliphatic polycarbonate compositions described herein. In certain embodiments, the glass laminate assembly comprises a photovoltaic cell. In certain embodiments, the glass laminate assembly comprises safety glass. In certain embodiments, the glass laminate assembly comprises a vehicle window.

In certain embodiments, the glass laminate assembly comprises an aliphatic polycarbonate having an Mn between about 40,000 and about 500,000 g/mol wherein a majority of the chain ends comprise AEF groups. In certain embodiments, such glass laminates comprise poly(propylene carbonate). In certain embodiments, such glass laminates comprise poly(ethylene carbonate).

In other embodiments, the glass laminate assembly comprises an aliphatic polycarbonate polyols comprising AEF groups and having an Mn less than about 40,000 g/mol. In certain embodiments, the aliphatic polycarbonate polyol comprises poly(propylene carbonate), poly(ethylene carbonate) or poly(propylene-co-ethylene carbonate). In certain embodiments, aliphatic polycarbonate polyol has an Mn from about 500 g/mol to about 5000 g/mol. In certain embodiments, the polycarbonate polyol is cross-linked by reaction with one or more polyisocyanates. In certain embodiments, the polycarbonate polyol is cross-linked by reaction with melamine. In certain embodiments, the polycarbonate polyol is cross-linked by reaction with epoxy resins. In other embodiments, the polycarbonate polyol contains olefin groups and reacts via olefin polymerization with a reactive diluent to form a thermoset material.

In certain embodiments, the present invention encompasses polymer-inorganic composite materials formed by curing of thermoset or reactive curing resins containing polycarbonate polyols comprising AEF groups as described hereinabove. In certain embodiments, such composites contain inorganic materials such as glass fiber, carbon fiber, alumina, silica, zirconia, clays, titania and the like.

In certain embodiments, the present invention encompasses polymer-inorganic composite materials formed by combining thermoplastic polycarbonates (e.g. those described above with Mn above about 50 kg/mol). In certain embodiments, such composites contain inorganic materials such as glass fiber, carbon fiber, alumina, silica, zirconia, clays, titania and the like.

Polymer composites may have desirable properties over their individual constituents, such as increased stiffness or strength, relative to their density. In some embodiments, composite materials offer the advantages of corrosion resistance, electrical insulation, better fatigue properties, biological inertness, and decreased assembly cost. This makes such materials particularly useful in electrical, appliance, hardware, dental, orthopedic, medical device, and other biomedical applications. Additional common applications for such composites include windmill blades, fiberglass boats, automotive parts, sporting goods and the like.

Glass-reinforced polymers are known to be useful in designs where metals (e.g., die-cast aluminum and zinc) are commonly used. For example, the addition of varying amounts of glass fibers to aromatic polycarbonates increases tensile strength, stiffness, compressive strength, and lowers the thermal expansion coefficient. Such glass-reinforced polycarbonate is generally more impact resistant than most other plastics and die cast aluminum. The present invention encompasses articles of manufacture containing glass-reinforced composites of provided aliphatic polycarbonate compositions.

While the foregoing disclosure has focused on the use of the novel AEF-containing aliphatic polycarbonates as improved compositions for use in polymer-inorganic mixtures, the inventors also recognize the potential for these compositions to find uses in other fields and applications. For example, since the AEF groups tend to be polar, they some of them are also hydrophilic. This can have advantageous effects for compatibilizing the polymers with organic materials such as starch, cellulosic materials, lignins, plant fibers and the like, and improving biocompatibility (for example in biomedical applications). Furthermore, to the extent the polycarbonate chains are relatively hydrophobic, certain compositions disclosed herein are amphiphilic and may find useful applications as surfactants, detergents, or viscosity modifiers. In addition, since both silicon-containing molecules and aliphatic polycarbonate compositions are known to have relatively good solubility in supercritical $CO_2$, there is reason to think that the hybrids of these disclosed herein may find application as additives to liquid or supercritical $CO_2$. These and other related applications which will be readily apparent to material scientists based on the teachings and disclosure herein are also encompassed by the present invention.

EXAMPLES

Example 1

Synthesis of Aliphatic Polycarbonate Compositions of Formula P2b:

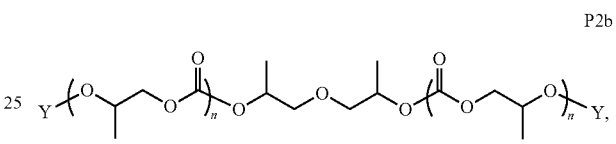

where Y is

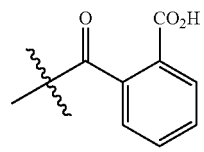 [SMILES: *C(=O)c1ccccc1C(=O)O]

Example 1a, where a Majority of End Groups are Acylated 100 g of poly(propylene carbonate) polyol of formula P2b where Y is —H and having a number average molecular weight ($M_n$) of 691 g/mol, a PDI of 1.1, and a carbonate content greater than 99% was combined with acetonitrile (100 mL) in a 500 mL round bottom flask and heated to 60° C. Phthalic anhydride (61 g, 0.41 mol) was charged and the reaction was stirred at 60° C. for 20 min. 1-Methylimidazole (27 g, 0.33 mol) was added over 2 min and the reaction mixture was held at 60° C. for 21 h.

The reaction was cooled to rt, quenched by addition of aq. HCl (1 N, 100 mL) and the reaction heated at 60° C. for 1 h. The reaction was cooled again and the organic layer was concentrated in vacuo to remove the bulk of the solvent. The resulting polyol was dissolved in EtOAc (100 mL) and extracted with water (2×50 mL) and brine (25 mL). The polyol was dried over $MgSO_4$, filtered and concentrated, in vacuo, at 50° C. to produce a faint yellow polyol (122 g, 90% yield (corrected for solvent)). $^1$H NMR (CDCl3, 400 MHz) (FIG. 1) indicated that approximately 90% of the polymer end groups were acylated.

Figure 2:
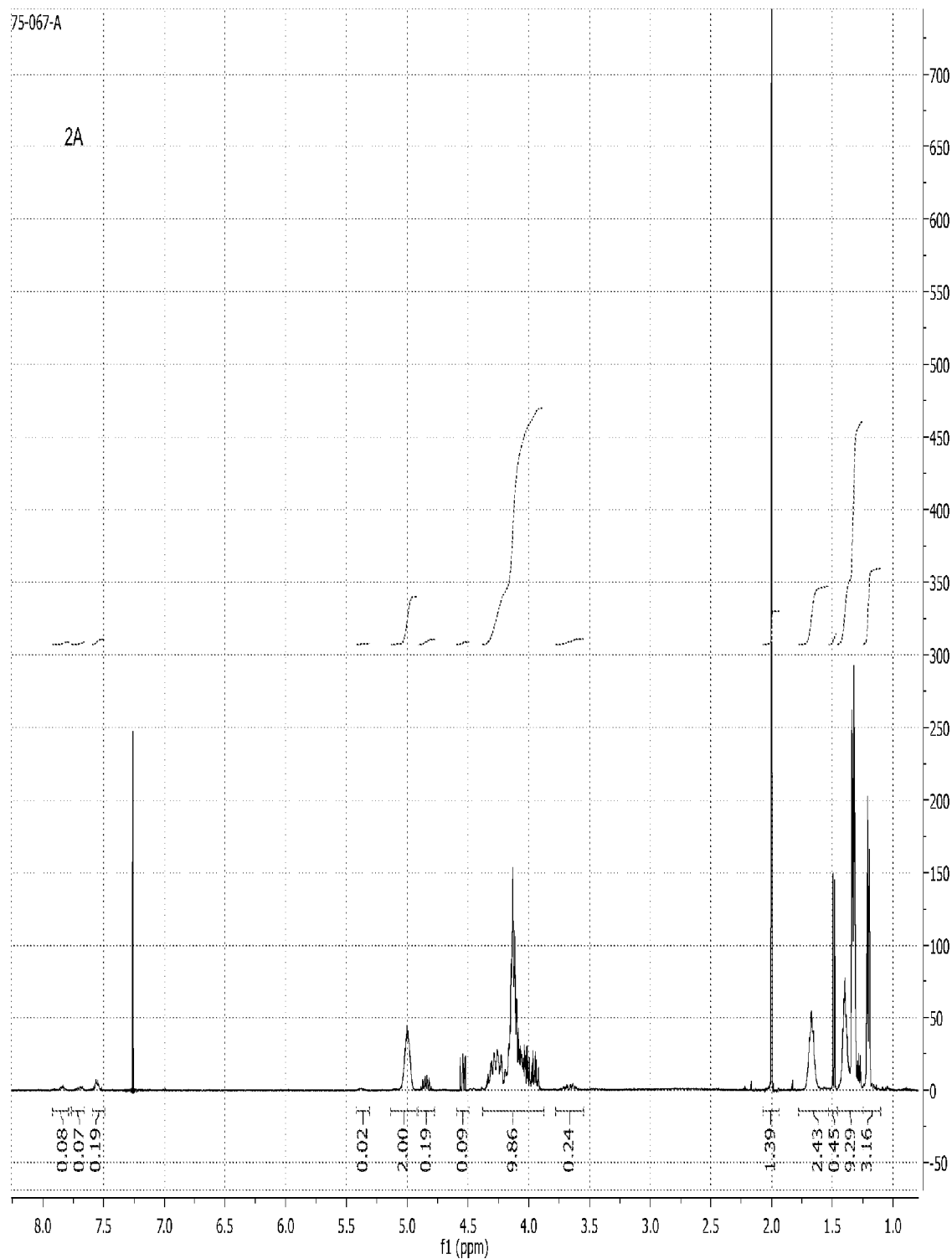
FIG. 2 shows the $^1$H NMR spectrum of a poly(propylene carbonate) composition of the present invention wherein a fraction of chain ends comprise phthalate AEF groups.

Example 1b, where a Minor Fraction of End Groups are Acylated 20 g of the same polyol used in example 1a, and phthalic anhydride (0.82 g, 5.5 mmol), and 2-butanone (18 mL) were combined in a 40 mL vial and heated to 60° C. 1-Methylimidazole (0.36 g, 4.4 mmol) was charged, over 1 min, and the reaction was held at 60° C. for 2 h. The reaction was worked-up as in Example 1a to produce a faint yellow polyol (21 g, 78% yield). $^1$H NMR (CDCl3, 400 MHz) shown in FIG. 2, indicated that approximately 5% of the polymer end groups were acylated.

Example 1c, Alternate Acylation Conditions 2.0 g of the same polyol used in Examples 1a and 1b, phthalic anhydride (82 mg, 0.6 mmol), and 2-butanone (3 mL) were combined in a 20 mL vial and heated to 60° C. TMEDA (13 mg, 0.1 mmol) was charged, over 1 min, and the reaction was held at 60° C. for 6 h. The reaction was worked-up as in procedure 1) to produce a faint yellow polyol. $^1$H NMR (CDCl3, 400 MHz) was similar to example 1b.

Example 1d, Alternate Acylation Conditions 1.0 g of the same polyol used in Examples 1a through 1c, phthalic anhydride (0.5 g, 2.2 mmol), and dichloromethane (5 mL) were combined in a 20 mL vial and heated to 60° C. 4-Dimethylaminopyridine (DMAP) (0.3 g, 2.2 mmol) and triethylamine (0.2 g, 2.2 mmol) were charged, over 1 min, and the reaction was held at 60° C. for 2 h. The reaction was worked-up as in Example 1a to produce a faint yellow polyol. $^1$H NMR (CDCl3, 400 MHz) was similar to example 1a.

Example 2

Synthesis of aliphatic polycarbonate compositions of formula P2b:

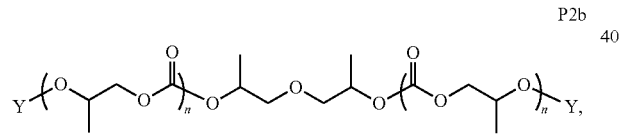

where Y is

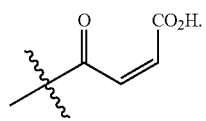 [SMILES: *C(=O)/C=C\C(=O)O]

Figure 3:
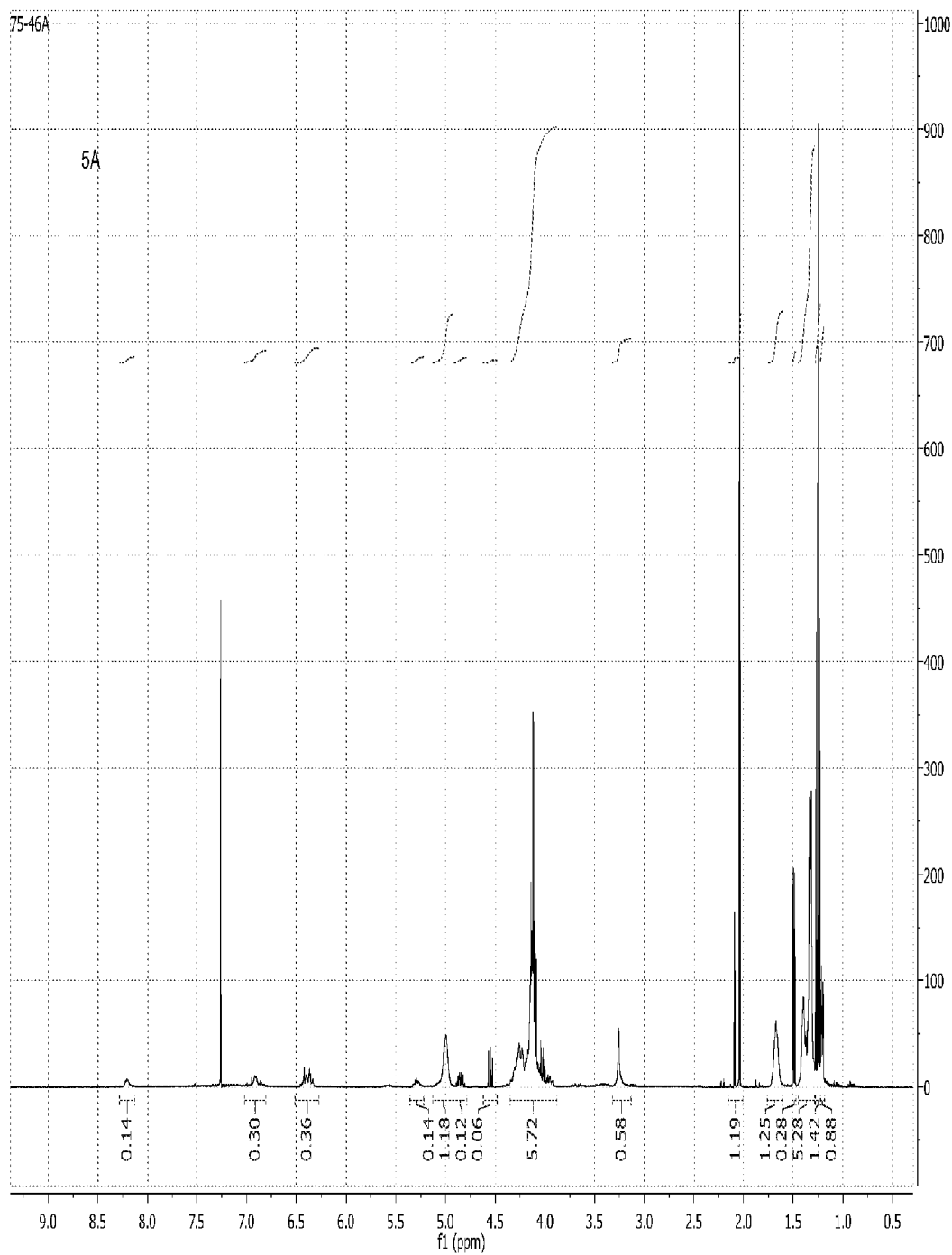
FIG. 3 shows the $^1$H NMR spectrum of a poly(propylene carbonate) composition of the present invention wherein a majority of chain ends comprise maleate AEF groups.

2.0 g of the same polyol used in Example 1a, maleic anhydride (0.5 g, 5.5 mmol), and dichloromethane (3 mL) were combined in a 20 mL vial and heated to 60° C. 4-Dimethylaminopyridine (DMAP) (0.3 g, 2.2 mmol) and triethylamine (0.6 g, 4.4 mmol) were charged and the reaction was held at 60° C. for 2 h. The reaction was worked-up as in Example 1a to produce a reddish polyol (2.0 g, 81% yield). The $^1$H NMR (CDCl3, 400 MHz) indicating a majority of chain ends were modified is shown in FIG. 3.

The complete disclosures of all patents, patent applications including provisional patent applications, and publications, and electronically available material cited herein are incorporated by reference.

OTHER EMBODIMENTS

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An epoxide $CO_2$ copolymer composition comprising epoxide $CO_2$ copolymer chains wherein:
one or more chain ends of at least a portion of the epoxide $CO_2$ copolymer chains within the epoxide $CO_2$ copolymer composition have a formula:

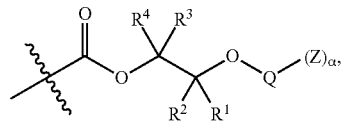

where,
$R^1$, $R^2$, $R^3$, and $R^4$ are, at each occurrence in the polymer chain, independently selected from the group consisting of —H, fluorine, an optionally substituted $C_{1-30}$ aliphatic group, an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms and/or one or more sites of unsaturation;
-Q- is a bivalent or multivalent moiety;
each Z comprises an adhesion enhancing functional group independently selected from the group consisting of: silicon-containing functional groups, phosphorous-containing functional groups, —SO$_3$H, and —N(R$^\alpha$)$_3^+$ where each R$^\alpha$ is at each occurrence, independently selected from the group consisting of optionally substituted phenyl and optionally substituted $C_{1-12}$ aliphatic; and
α is an integer from 1 to 4 inclusive;
the epoxide $CO_2$ copolymer composition is characterized in that, on average in the composition, the percentage of carbonate linkages in epoxide $CO_2$ copolymer chains is 90% or greater; and
the number average molecular weight of the epoxide $CO_2$ copolymer composition is less than about 20,000 g/mol;
wherein the epoxide $CO_2$ copolymer composition further comprises epoxide $CO_2$ polymer chains of formula:

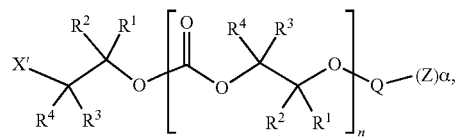

where
$R^1$, $R^2$, $R^3$, and $R^4$ are, at each occurrence in the polymer chain, independently selected from the group consisting of —H, fluorine, an optionally substituted $C_{1-30}$ aliphatic group, an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms and/or one or more sites of unsaturation;

-Q- is a bivalent or multivalent moiety, each Z comprises a moiety independently selected from the group consisting of: silicon-containing functional groups, phosphorous-containing functional groups, —$SO_3H$, —$CO_2H$, and —$N(R^\alpha)_3^+$ where each $R^\alpha$ is at each occurrence, independently selected from the group consisting of optionally substituted phenyl and optionally substituted $C_{1-12}$ aliphatic, α is an integer from 1 to 4 inclusive;

X' is selected from the group consisting of $C_{1-20}$ acyl oxy, halogen, alkoxy, nitrate, azide, optionally substituted phenoxy, nitrophenoxy and sulfonate; and n is an integer from 5 to about 500.

2. The epoxide $CO_2$ copolymer composition of claim 1, wherein the adhesion enhancing functional group is linked to a chain end via an ester linkage.

3. The epoxide $CO_2$ copolymer composition of claim 1, wherein the adhesion enhancing functional group is linked to a chain end via a urethane linkage.

4. The epoxide $CO_2$ copolymer composition of claim 1, wherein the adhesion enhancing functional group is linked to a chain end via an ether linkage.

5. The epoxide $CO_2$ copolymer composition of claim 1, wherein the adhesion enhancing functional group comprises a silicon-containing functional group and a silicon atom is bonded directly to a terminal oxygen atom of the epoxide $CO_2$ copolymer.

6. The epoxide $CO_2$ copolymer composition of claim 1, wherein the epoxide $CO_2$ copolymer chains having chains ends of formula:

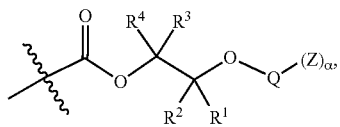

comprise a primary repeat unit having a formula:

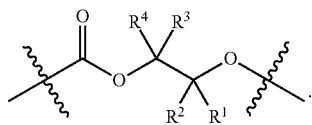

7. The epoxide $CO_2$ copolymer composition of claim 6, wherein the —Q-(Z)$_\alpha$ moieties of the epoxide $CO_2$ copolymer chains having chain ends of formula:

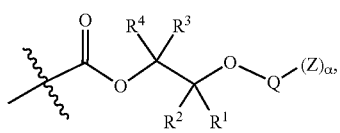

are selected from the group consisting of:

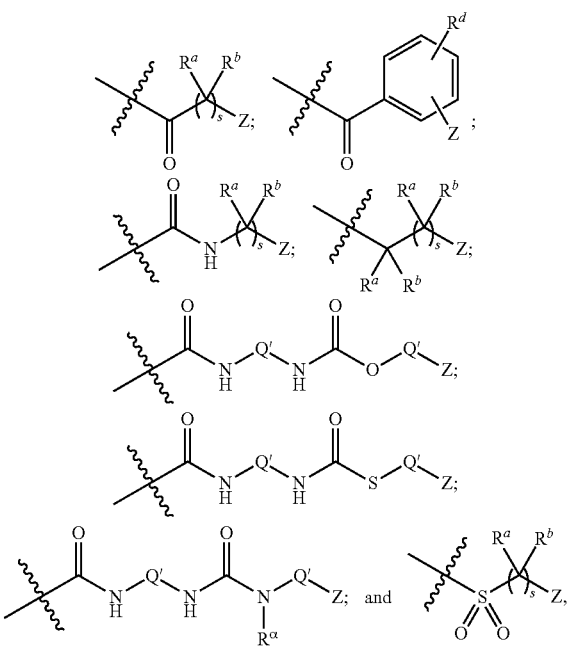

where $R^a$ and $R^b$ are, at each occurrence, independently selected from the group consisting of —H, halogen, an optionally substituted $C_{1-20}$ aliphatic group, an optionally substituted $C_{1-20}$ heteroaliphatic group, an optionally substituted $C_{6-14}$ aryl group, an optionally substituted acyloxy group, an optionally substituted acyl group, an optionally substituted alkoxy group, an optionally substituted 3- to 14-membered carbocyclic group, and an optionally substituted 3- to 12-membered heterocyclic group, where any two or more $R^a$ and $R^b$ groups may optionally be taken together with intervening atoms to form one or more optionally substituted, optionally unsaturated rings optionally containing one or more heteroatoms, where any two or more $R^a$ and $R^b$ groups on adjacent carbon atoms may optionally be taken together with intervening atoms to form an optionally substituted aryl ring, where an $R^a$ or $R^b$ on one carbon atom and an $R^a$ or $R^b$ on an adjacent carbon may optionally be taken together with the bond between the adjacent carbons to represent a double bond between the two carbon atoms, and where $R^a$ and $R^b$ groups attached to the same atom may be taken together to form an optionally substituted moiety selected from the group consisting of: alkene, imine, oxime, and hydrazone;

where one or more $R^d$ groups of the formula

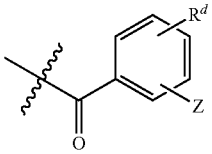

are optionally present, and is, at each occurrence, independently selected from the group consisting of: halogen, —NO$_2$, —CN, —SR, —S(O)R, —S(O)$_2$R, —NRC(O)R, —OC(O)R, —CO$_2$R, —NCO, —N$_3$, —OR, —OC(O)N(R)$_2$, —N(R)$_2$, —NRC(O)R, —NRC(O)OR; or an optionally substituted radical selected from the group consisting of C$_{1-20}$ aliphatic, C$_{1-20}$ heteroaliphatic, a 3- to 14-membered carbocycle, a 3- to 12-membered heterocycle, a 5- to 12-membered heteroaryl, and 6- to 10-membered aryl; where two or more adjacent R$^d$ groups can be taken together to form an optionally substituted saturated, partially unsaturated, or aromatic 5- to 12-membered ring containing 0 to 4 heteroatoms; where each occurrence of R is independently —H or an optionally substituted moiety selected from the group consisting of C$_{1-6}$ aliphatic, C$_{1-6}$ heteroaliphatic, 3- to 7-membered heterocyclic, 3- to 7-membered carbocyclic, 6- to 10-membered aryl, and 5- to 10-membered heteroaryl;

each R$^{1s}$ is independently a C$_{1-6}$ aliphatic group or optionally substituted aryl group;

each R$^{2s}$ is independently —H, optionally substituted C$_{1-6}$ aliphatic, or optionally substituted phenyl;

each Q' is a multifunctional organic moiety optionally containing one or more heteroatoms and each Q' may be the same or different;

s is an integer from 1 to 8; and m is 0, 1, 2, or 3.

8. The epoxide CO$_2$ copolymer composition of claim 6, wherein each

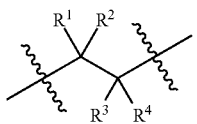

moiety in the polymer chain is independently selected from the group consisting of:

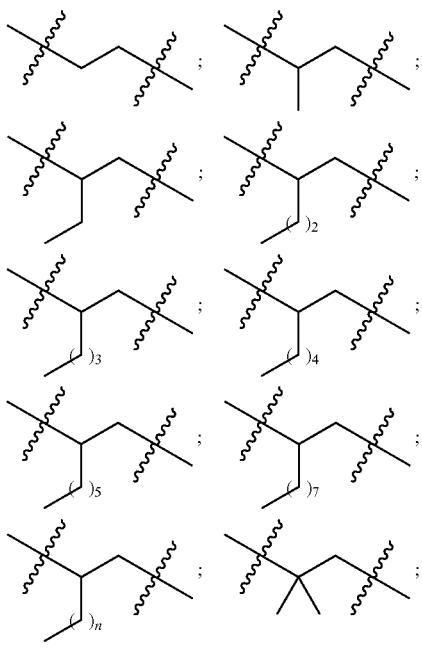

n = 9 - 30

-continued

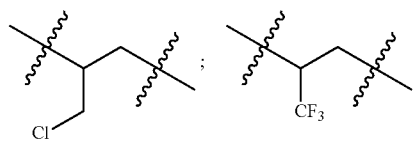

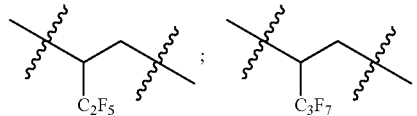

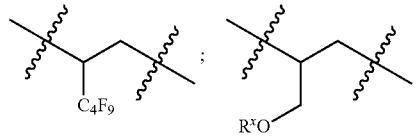

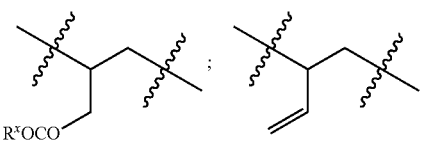

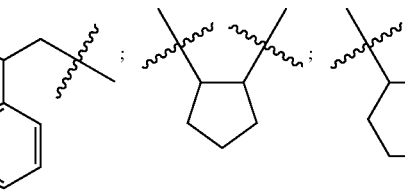

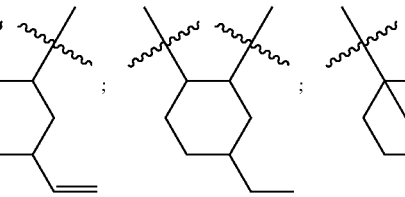

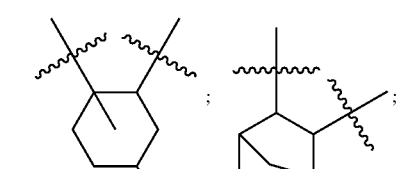

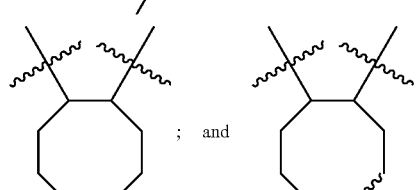

where each R$^x$ is independently an optionally substituted moiety selected from the group consisting of C$_{2-20}$ aliphatic, C$_{2-20}$ heteroaliphatic, 3- to 14-membered carbocyclic, 6- to 10-membered aryl, 5- to 10-membered heteroaryl, and 3- to 12-membered heterocyclic.

9. The epoxide CO$_2$ copolymer composition of claim 1, wherein the epoxide CO$_2$ polymer chains having chain ends of formula:

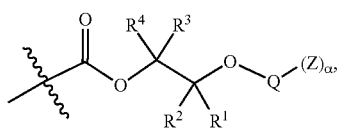

comprise a copolymer of $CO_2$ and an epoxide selected from the group consisting of: ethylene oxide, propylene oxide, 1,2 butene oxide, cyclohexene oxide, epichlorohydrin, 3-vinyl cyclohexene oxide, 3-ethyl cyclohexene oxide, a glycidyl ester, a glycidyl ether and any combination of two or more of these.

10. The epoxide $CO_2$ copolymer composition of claim 1, wherein the epoxide $CO_2$ polymer chains having chain ends of formula:

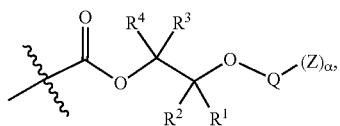

comprise a copolymer of $CO_2$ and propylene oxide.

11. The epoxide $CO_2$ copolymer composition of claim 1, wherein the number average molecular weight of the epoxide $CO_2$ copolymer is between about 500 g/mol and 5,000 g/mol.

12. The epoxide $CO_2$ copolymer composition of claim 6, wherein the

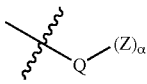

moieties of the epoxide $CO_2$ copolymer chains within the epoxide $CO_2$ copolymer composition having chain ends of formula:

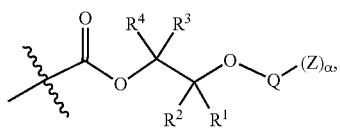

are selected from the group consisting of:

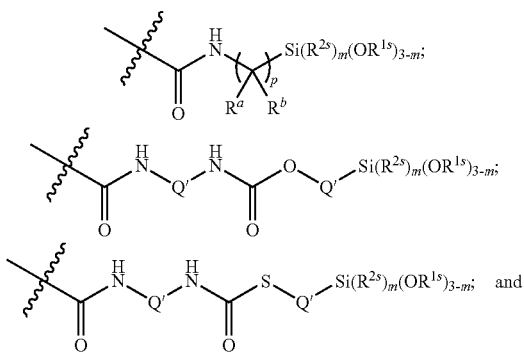

-continued

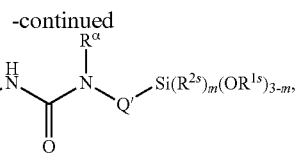

where $R^a$ and $R^b$ are, at each occurrence, independently selected from the group consisting of —H, halogen, an optionally substituted $C_{1-20}$ aliphatic group, an optionally substituted $C_{1-20}$ heteroaliphatic group, an optionally substituted $C_{6-14}$ aryl group, an optionally substituted acyloxy group, an optionally substituted acyl group, an optionally substituted alkoxy group, an optionally substituted 3- to 14-membered carbocyclic group, and an optionally substituted 3- to 12-membered heterocyclic group, where any two or more $R^a$ and $R^b$ groups may optionally be taken together with intervening atoms to form one or more optionally substituted, optionally unsaturated rings optionally containing one or more heteroatoms, where any two or more $R^a$ and $R^b$ groups on adjacent carbon atoms may optionally be taken together with intervening atoms to form an optionally substituted aryl ring, where an $R^a$ or $R^b$ on one carbon atom and an $R^a$ and $R^b$ on an adjacent carbon may optionally be taken together with the bond between the adjacent carbons to represent a double bond between the two carbon atoms, and where $R^a$ and $R^b$ groups attached to the same atom may be taken together to form an optionally substituted moiety selected from the group consisting of: alkene, imine, oxime, and hydrazone;

each Q' is a multifunctional organic moiety optionally containing one or more heteroatoms and each Q' may be the same or different;

each $R^{2s}$ is independently H, optionally substituted $C_{1-6}$ aliphatic, or optionally substituted phenyl;

each $R^{1s}$ is independently a $C_{1-6}$ aliphatic group or optionally substituted aryl group;

m is 0, 1, 2, or 3; and p is an integer from 1 to 10.

13. The epoxide $CO_2$ copolymer composition of claim 12, wherein the

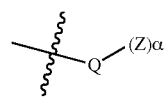

moieties of the epoxide $CO_2$ copolymer chains within the epoxide $CO_2$ copolymer composition having chain ends of formula:

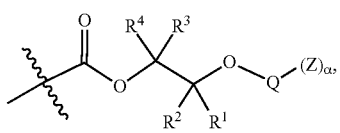

are selected from the group consisting of:

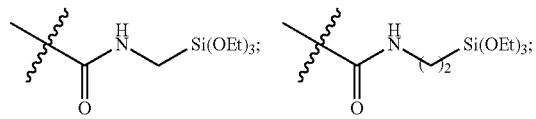
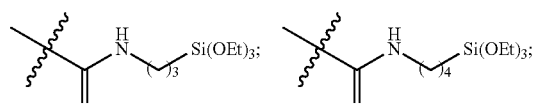
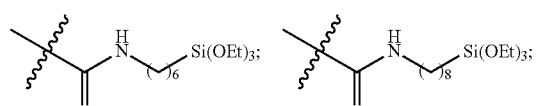
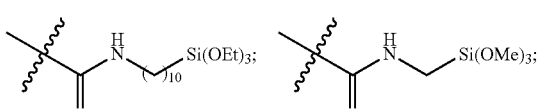
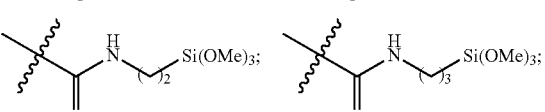
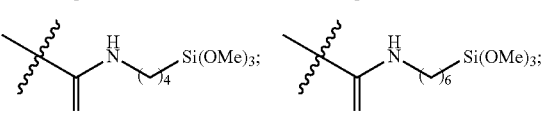
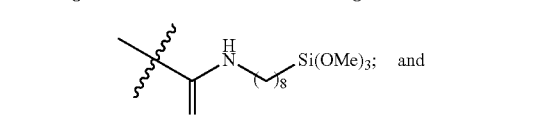
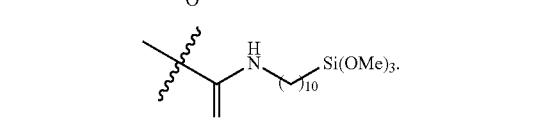

14. The epoxide $CO_2$ copolymer composition of claim 6, wherein the epoxide $CO_2$ copolymer chains of formula:

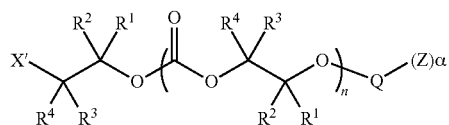

are of formula:

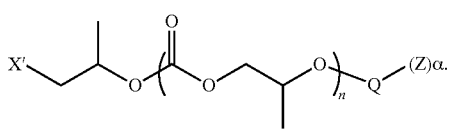

15. The epoxide $CO_2$ copolymer composition claim 6, wherein the

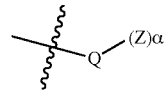

moieties of the epoxide $CO_2$ copolymer chains of formula:

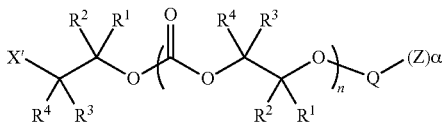

are selected from the group consisting of:

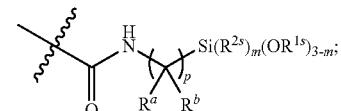
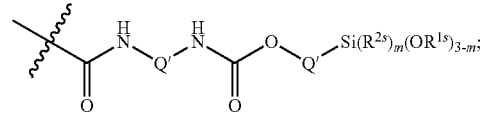
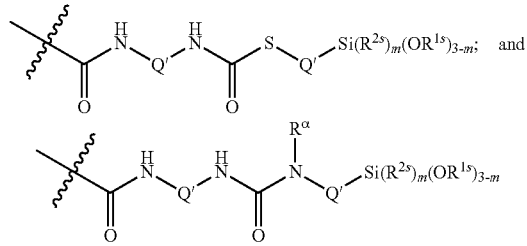

each $Q'$ is a multifunctional organic moiety optionally containing one or more heteroatoms and each $Q'$ may be the same or different;

each $R^{2s}$ is independently H, optionally substituted $C_{1-6}$ aliphatic, or optionally substituted phenyl;

each $R^{1s}$ is independently a $C_{1-6}$ aliphatic group or optionally substituted aryl group;

m is 0, 1, 2, or 3; and p is an integer from 1 to 10.

16. The epoxide $CO_2$ copolymer composition of claim 15, wherein the

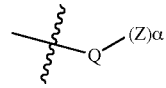

moieties of the epoxide $CO_2$ copolymer chains of formula:

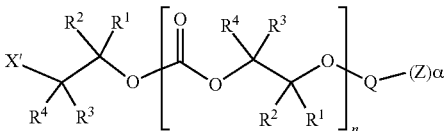

are selected from the group consisting of:

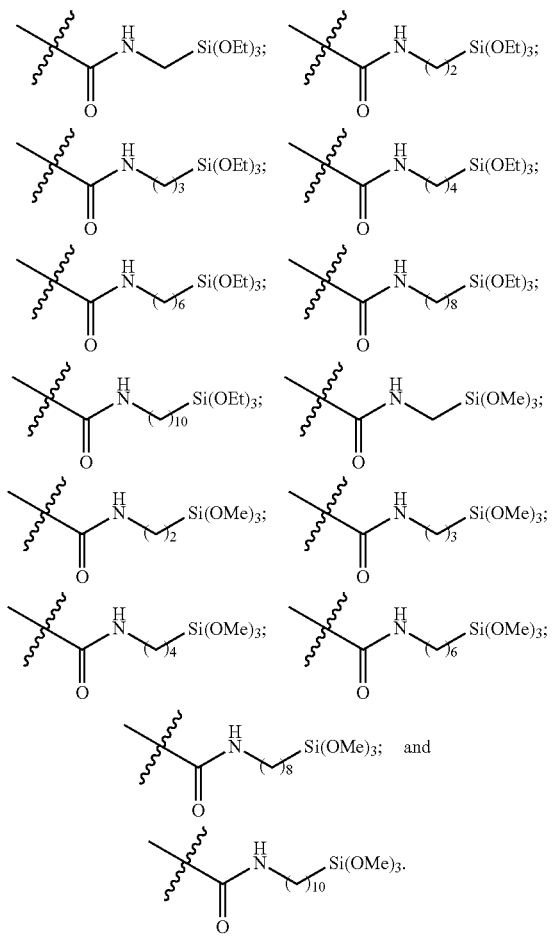

17. A higher polymer comprising the reaction product of an epoxide $CO_2$ copolymer composition of claim 1 with a polyfunctional reagent selected from the group consisting of: polyisocyanates, melamine, and phenol formaldehyde resins.

18. A higher polymer comprising a reaction product of olefin polymerization between an epoxide $CO_2$ copolymer composition of claim 1 and a reactive diluent comprising a reactive olefin.

19. A composite comprising a higher polymer composition of claim 17 in combination with one or more inorganic materials.

20. A glass laminate comprising epoxide $CO_2$ copolymer composition of claim 1.

21. A method for producing an epoxide $CO_2$ copolymer composition of claim 1 having improved glass adhesion comprising the step of treating an epoxide $CO_2$ copolymer comprising —OH end groups with a reagent to convert at least a portion of the free —OH end groups of the epoxide $CO_2$ copolymer to moieties comprising a functional group selected from the group consisting of: silicon-containing functional groups, —$SO_3H$, phosphorus-containing functional groups, —$N(R^\alpha)_3^\pm$, and combinations of two or more of these
where each $R^\alpha$ is at each occurrence, independently selected from the group consisting of optionally substituted phenyl and optionally substituted $C_{1-12}$ aliphatic.

22. The epoxide $CO_2$ copolymer composition of claim 6, wherein the chain ends of formula:

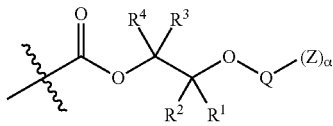

are of formula:

IIa-2a
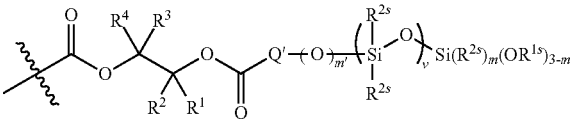

IIa-2b
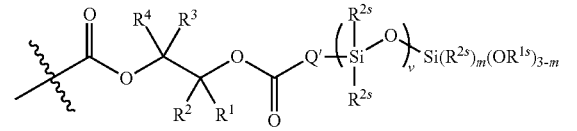

IIa-2c
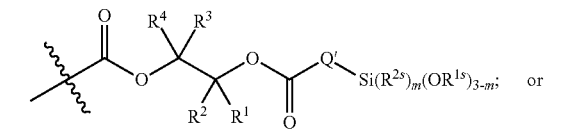

or

IIa-2d
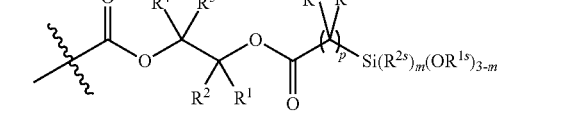

wherein
$R^a$ and $R^b$ are, at each occurrence, independently selected from the group consisting of —H, halogen, an optionally substituted $C_{1-20}$ aliphatic group, an optionally substituted $C_{1-20}$ heteroaliphatic group, an optionally substituted $C_{6-14}$ aryl group, an optionally substituted acyloxy group, an optionally substituted acyl group, an optionally substituted alkoxy group, an optionally substituted 3- to 14-membered carbocyclic group, and an optionally substituted 3- to 12-membered heterocyclic group, where any two or more $R^a$ and $R^b$ groups may optionally be taken together with intervening atoms to form one or more optionally substituted, optionally unsaturated rings optionally containing one or more heteroatoms, where any two or more $R^a$ and $R^b$ groups on adjacent carbon atoms may optionally be taken together with intervening atoms to form an optionally substituted aryl ring, where an $R^a$ or $R^b$ on one carbon atom and an $R^a$ or $R^b$, on an adjacent carbon may optionally be taken together with the bond between the adjacent carbons to represent a double bond between the two carbon atoms, and where $R^a$ and $R^b$ groups attached to the same atom may be taken together to form an optionally substituted moiety selected from the group consisting of: alkene, imine, oxime, and hydrazone;

each Q' is a multifunctional organic moiety optionally containing one or more heteroatoms and each Q' may be the same or different;
each $R^{2s}$ is independently H, optionally substituted $C_{1-6}$ aliphatic, or optionally substituted phenyl;
each $R^{1s}$ is independently a $C_{1-6}$ aliphatic group or optionally substituted aryl group;
m is 0, 1, 2, or 3;
v is 0 or an integer from 1 to 20;
p is an integer from 1 to 10; and
m' is 0 or 1.

23. The epoxide $CO_2$ copolymer composition of claim 6, wherein the chain ends of formula:

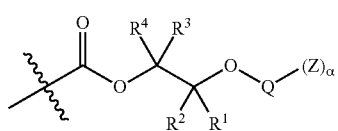

are of formula:

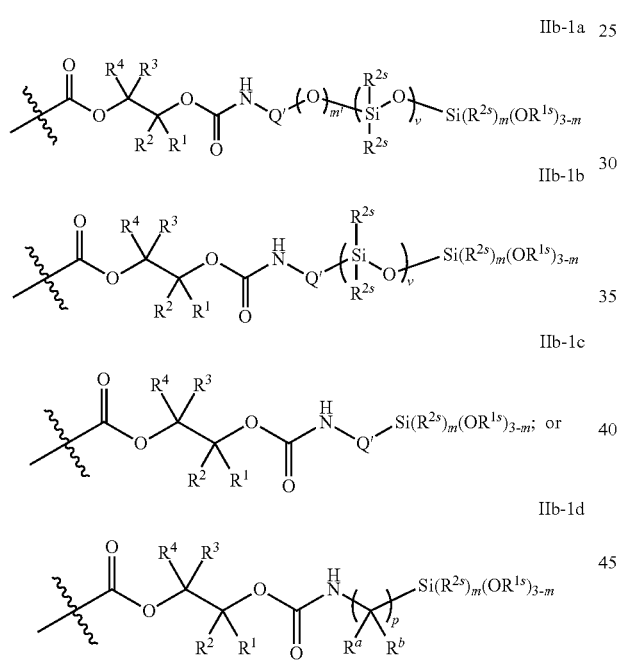

IIb-1a

IIb-1b

IIb-1c

IIb-1d wherein
$R^a$ and $R^b$ are, at each occurrence, independently selected from the group consisting of —H, halogen, an optionally substituted $C_{1-20}$ aliphatic group, an optionally substituted $C_{1-20}$ heteroaliphatic group, an optionally substituted $C_{6-14}$ aryl group, an optionally substituted acyloxy group, an optionally substituted acyl group, an optionally substituted alkoxy group, an optionally substituted 3- to 14-membered carbocyclic group, and an optionally substituted 3- to 12-membered heterocyclic group, where any two or more $R^a$ and $R^b$ groups may optionally be taken together with intervening atoms to form one or more optionally substituted, optionally unsaturated rings optionally containing one or more heteroatoms, where any two or more $R^a$ and $R^b$ groups on adjacent carbon atoms may optionally be taken together with intervening atoms to form an optionally substituted aryl ring, where an $R^a$ or $R^b$ on one carbon atom and an $R^a$ or $R^b$ on an adjacent carbon may optionally be taken together with the bond between the adjacent carbons to represent a double bond between the two carbon atoms, and where $R^a$ and $R^b$ groups attached to the same atom may be taken together to form an optionally substituted moiety selected from the group consisting of: alkene, imine, oxime, and hydrazone;
each Q' is a multifunctional organic moiety optionally containing one or more heteroatoms and each Q' may be the same or different;
each $R^{2s}$ is independently H, optionally substituted $C_{1-6}$ aliphatic, or optionally substituted phenyl;
each $R^{1s}$ is independently a $C_{1-6}$ aliphatic group or optionally substituted aryl group;
m is 0, 1, 2, or 3;
v is 0 or an integer from 1 to 20;
p is an integer from 1 to 10; and
m' is 0 or 1.

24. The epoxide $CO_2$ copolymer composition of claim 6, wherein the chain ends of formula:

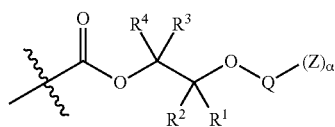

are of formula:

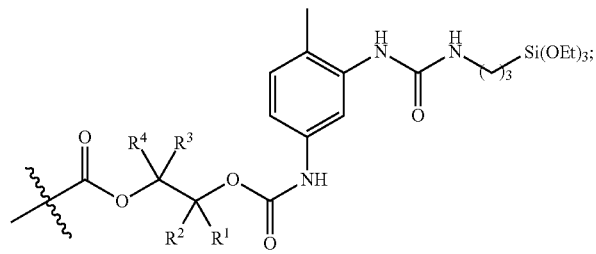

-continued
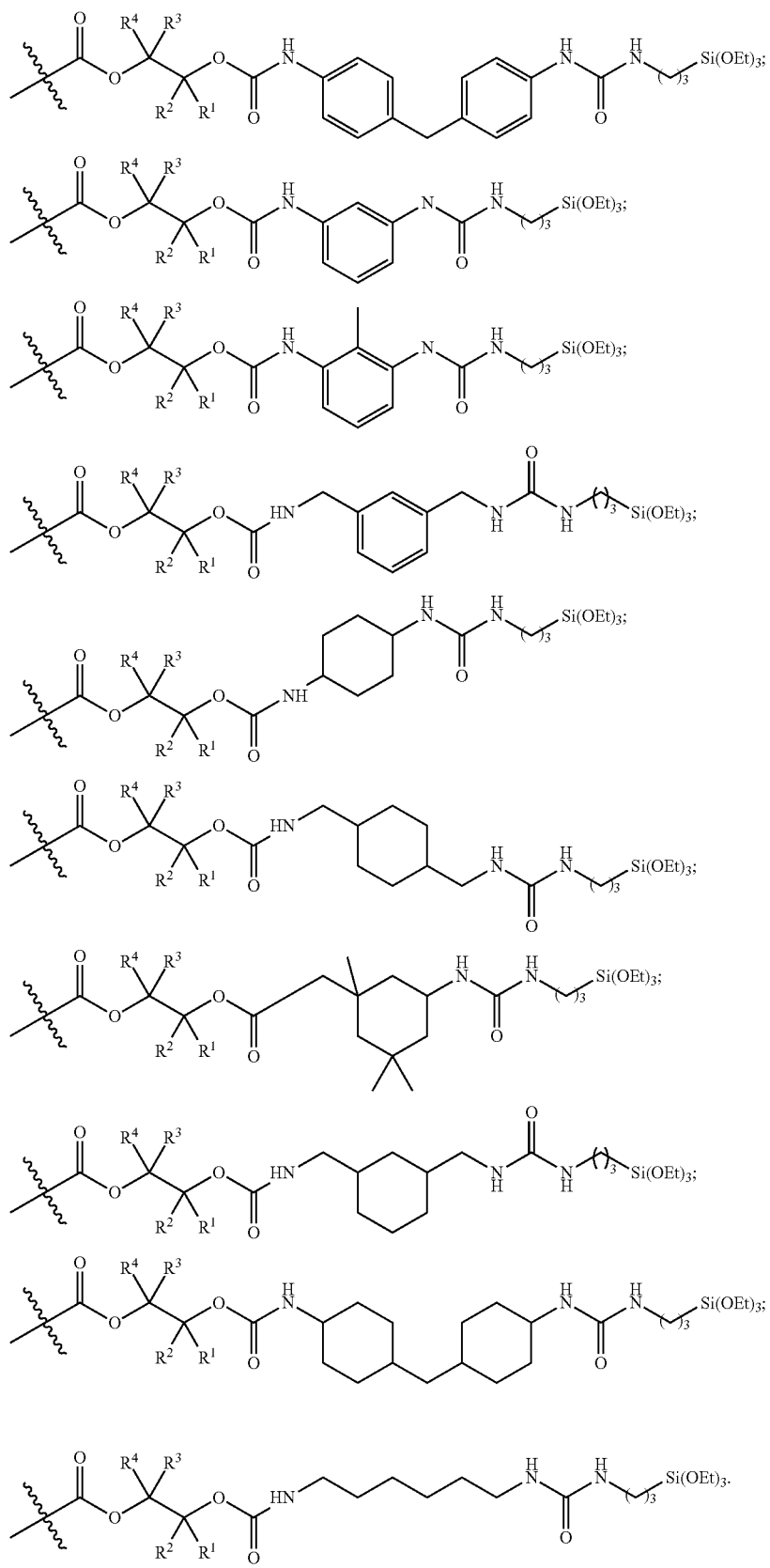

25. The epoxide $CO_2$ copolymer composition of claim 6, wherein the chain ends of formula:

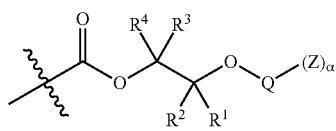

are of formula:

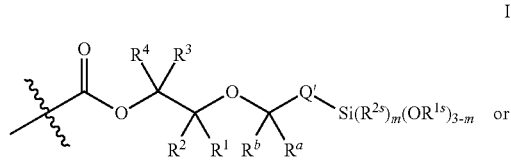

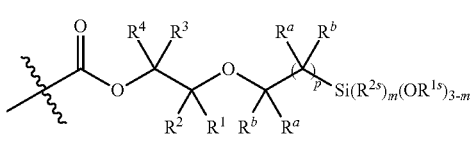

wherein $R^a$ and $R^b$ are, at each occurrence, independently selected from the group consisting of —H, halogen, an optionally substituted $C_{1-20}$ aliphatic group, an optionally substituted $C_{1-20}$ heteroaliphatic group, an optionally substituted $C_{6-14}$ aryl group, an optionally substituted acyloxy group, an optionally substituted acyl group, an optionally substituted alkoxy group, an optionally substituted 3- to 14-membered carbocyclic group, and an optionally substituted 3- to 12-membered heterocyclic group, where any two or more $R^a$ and $R^b$ groups may optionally be taken together with intervening atoms to form one or more optionally substituted, optionally unsaturated rings optionally containing one or more heteroatoms, where any two or more $R^a$ and $R^b$ groups on adjacent carbon atoms may optionally be taken together with intervening atoms to form an optionally substituted aryl ring, where an $R^a$ or $R^b$ on one carbon atom and an $R^a$ or $R^b$ on an adjacent carbon may optionally be taken together with the bond between the adjacent carbons to represent a double bond between the two carbon atoms, and where $R^a$ and $R^b$ groups attached to the same atom may be taken together to form an optionally substituted moiety selected from the group consisting of: alkene, imine, oxime, and hydrazone;

each $Q'$ is a multifunctional organic moiety optionally containing one or more heteroatoms and each $Q'$ may be the same or different;

each $R^{2s}$ is independently H, optionally substituted $C_{1-6}$ aliphatic, or optionally substituted phenyl;

each $R^{1s}$ is independently a $C_{1-6}$ aliphatic group or optionally substituted aryl group;

m is 0, 1, 2, or 3; and p is an integer from 1 to 10.

26. The epoxide $CO_2$ copolymer composition of claim 6, wherein the chain ends of formula:

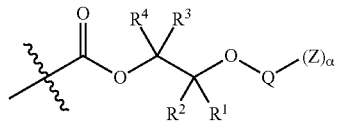

are of formula:

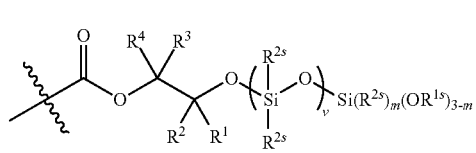

wherein each $R^{2s}$ is independently H, optionally substituted $C_{1-6}$ aliphatic, or optionally substituted phenyl;

each $R^{1s}$ is independently a $C_{1-6}$ aliphatic group or optionally substituted aryl group;

m is 0, 1, 2, or 3; and v is an integer from 1 to 20.

27. The epoxide $CO_2$ copolymer composition of claim 1, wherein the epoxide $CO_2$ copolymer composition is characterized in that, on average in the composition, the percentage of carbonate linkages in epoxide $CO_2$ copolymer chains is 95% or greater.

28. The epoxide $CO_2$ copolymer composition of claim 1, wherein the epoxide $CO_2$ copolymer composition is characterized in that, on average in the composition, the percentage of carbonate linkages in epoxide $CO_2$ copolymer chains is 99% or greater.

29. The epoxide $CO_2$ copolymer composition of claim 11, wherein the epoxide $CO_2$ copolymer composition is characterized in that, on average in the composition, the percentage of carbonate linkages in epoxide $CO_2$ copolymer chains is 99% or greater.

* * * * *